US011599938B2

(12) United States Patent
Tateishi et al.

(10) Patent No.: US 11,599,938 B2
(45) Date of Patent: Mar. 7, 2023

(54) INFORMATION PROCESSING APPARATUS, INFORMATION PROCESSING METHOD

(71) Applicant: SONY CORPORATION, Tokyo (JP)

(72) Inventors: Chikako Tateishi, Tokyo (JP); Kazuki Nakamura, Tokyo (JP); Morio Omata, Tokyo (JP); Motoki Higashide, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/250,630

(22) PCT Filed: Aug. 8, 2019

(86) PCT No.: PCT/JP2019/031338
§ 371 (c)(1),
(2) Date: Feb. 12, 2021

(87) PCT Pub. No.: WO2020/039957
PCT Pub. Date: Feb. 27, 2020

(65) Prior Publication Data
US 2021/0166305 A1 Jun. 3, 2021

(30) Foreign Application Priority Data

Aug. 22, 2018 (JP) .............................. JP2018-155483

(51) Int. Cl.
*G06Q 40/02* (2012.01)
*G06F 3/14* (2006.01)

(52) U.S. Cl.
CPC ............... *G06Q 40/02* (2013.01); *G06F 3/14* (2013.01)

(58) Field of Classification Search
CPC .......... G06Q 40/02; G06Q 50/10; G06F 3/14
(Continued)

(56) References Cited

U.S. PATENT DOCUMENTS

| 2002/0016764 A1* | 2/2002 | Hoffman ............... G06Q 40/02 705/39 |
| 2013/0124376 A1 | 5/2013 | Lefebvre et al. |
| 2013/0262294 A1* | 10/2013 | Green ................. G06Q 20/023 705/39 |
| 2014/0195924 A1 | 7/2014 | Curtis et al. |

(Continued)

FOREIGN PATENT DOCUMENTS

| JP | 2003-30449 A | 1/2003 |
| JP | 2013-254279 A | 12/2013 |

(Continued)

OTHER PUBLICATIONS

T. Nakatsuru, K. Murakami and H. Sakai, "Context-Aware Information Provision to the Mobile Phone Standby Screen," 7th International Conference on Mobile Data Management (MDM'06), 2006, pp. 43-43, doi: 10.1109/MDM.2006.54. (Year: 2006).*

(Continued)

*Primary Examiner* — Mike Anderson
*Assistant Examiner* — John O Preston
(74) *Attorney, Agent, or Firm* — Chip Law Group

(57) ABSTRACT

Provided is an information processing apparatus and an information processing method, which allow a user to recall content of an event more easily along with an amount of spent money. The information processing apparatus includes a display control unit that performs control to display deposit and withdrawal information regarding a deposit and a withdrawal at an event and related information relating to the deposit and the withdrawal in chronological order for each event on the basis of savings and settlement information regarding savings or settlement of a user and behavior history information in accordance with behavior of the user.

21 Claims, 49 Drawing Sheets

(58) Field of Classification Search
USPC .......................................................... 705/39
See application file for complete search history.

(56) References Cited

U.S. PATENT DOCUMENTS

| | | | |
|---|---|---|---|
| 2016/0027124 A1* | 1/2016 | Rojas | G06Q 40/02 |
| | | | 705/30 |
| 2017/0083832 A1 | 3/2017 | Williams | |
| 2019/0213690 A1* | 7/2019 | Nichols | G06T 11/60 |

FOREIGN PATENT DOCUMENTS

| | | |
|---|---|---|
| JP | 2018-77567 A | 5/2018 |
| JP | 2018-116519 A | 7/2018 |

OTHER PUBLICATIONS

J Christopher Westland; Theordore H. Clark, "Redefining the Geography of Space, Time, and Money," in Global Electronic Commerce: Theory and Case Studies , MIT Press, 1999, pp. 53-139. (Year: 1999).*

Jaap-Henk Hoepman, "2 You Have Zero Privacy Anyway—Get Over It," in Privacy is Hard and Seven Other Myths: Achieving Privacy through Careful Design , MIT Press, 2021, pp. 30-67. (Year: 2021)*

International Search Report and Written Opinion of PCT Application No. PCT/JP2019/031338, dated Oct. 29, 2019, 09 pages of ISRWO.

Yamamoto, et al., "Money-Benefit hotline, The 18th remarkable new product of this month + Lock on to new service, Hot Line: Information that there is a money app that can be used by married couples and parent and child", Net Money, vol. 12, No. 07, May 20, 2017, p. 88.

Yamamoto,et al., "Money-Benefit Hotline, The 10th remarkable new product of this month + new service + Lock on to healthy companies, Hot Line: There is information that a bank application that can be used like SNS appears", Net Money, vol. 11, No. 10, Aug. 20, 2016, p. 62.

\* cited by examiner

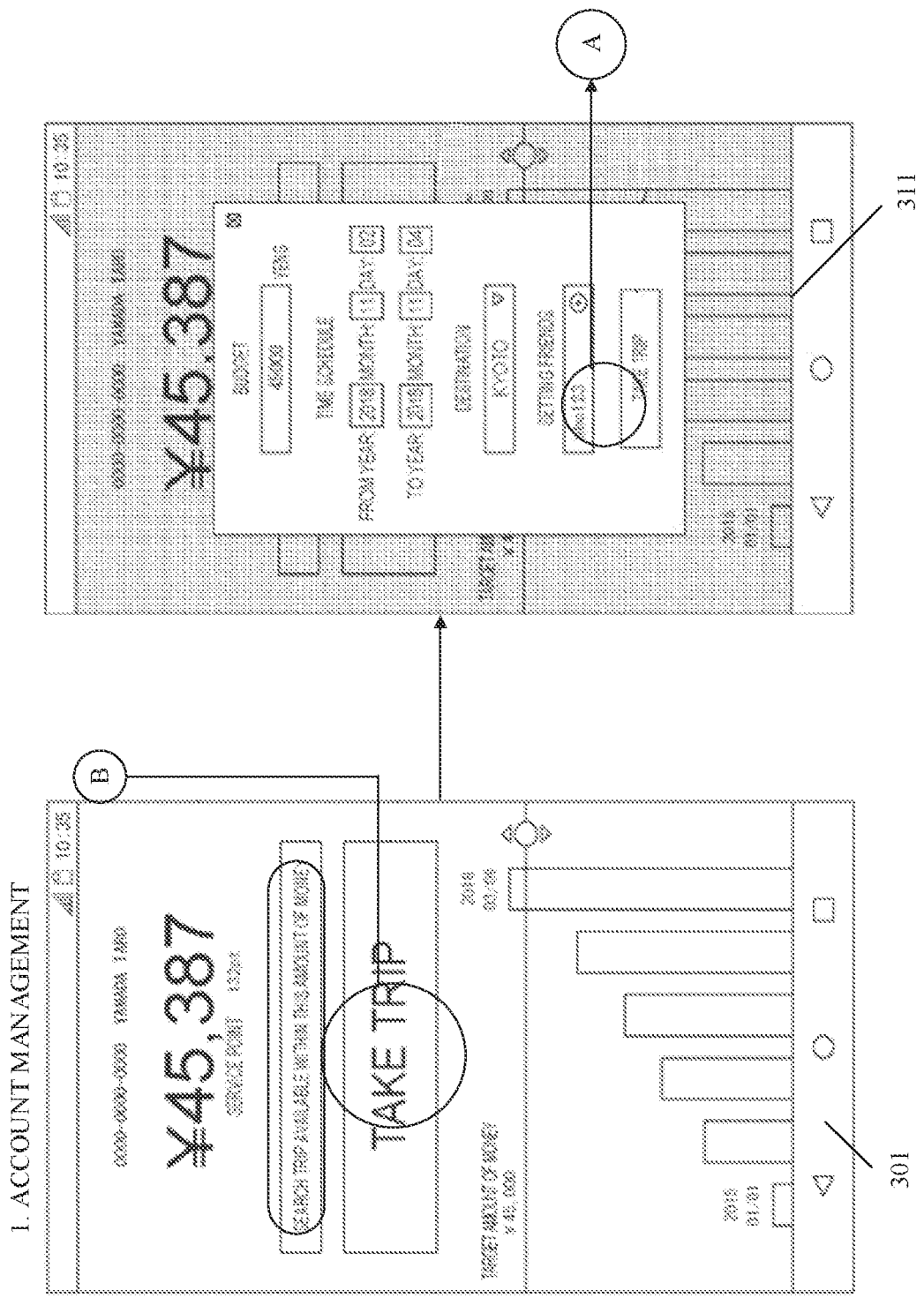

INFORMATION PROCESSING APPARATUS, INFORMATION PROCESSING METHOD

CROSS REFERENCE TO RELATED APPLICATIONS

This application is a U.S. National Phase of International Patent Application No. PCT/JP2019/031338 filed on Aug. 8, 2019, which claims priority benefit of Japanese Patent Application No. 2018-155483 filed in the Japan Patent Office on Aug. 22, 2018. Each of the above-referenced applications is hereby incorporated herein by reference in its entirety.

TECHNICAL FIELD

The present technology relates to an information processing apparatus, an information processing method, and a program and, more particularly, to an information processing apparatus, an information processing method, and a program which allow a user to recall content of an event more easily along with an amount of spent money.

BACKGROUND ART

In recent years, a system which combines financial service and an information and communication technology (ICT) has been actively developed. For example, systems disclosed in Patent Document 1 and Patent Document 2 are known as this type of system.

Patent Document 1 discloses a system which, to set a target and a target amount of money to manage assets to achieve the target, presents respective sections of balance of a bank account, in a case where there is an amount of money which can be deposited to one of the sections or an amount of money which can be withdrawn from one of the sections, presents the amount of money and sorts the amount of money into one of the sections.

Patent Document 2 discloses a technology in which, in a behavior information collecting system which collects information relating to behavior of a user, a conversation based on a scenario is held through display of a message on a mobile terminal and input of a response from the user, and behavior grasped on the basis of the response is recorded in association with the user.

CITATION LIST

Patent Document

Patent Document 1: Japanese Patent Application Laid-Open No. 2003-30449
Patent Document 2: Japanese Patent Application Laid-Open No. 2018-77567

SUMMARY OF THE INVENTION

Problems to be Solved by the Invention

By the way, while various systems which combine financial service and an information and communication technology have been proposed, a technology for allowing a user to recall content of an event in accordance with deposits and withdrawals at the event such as a personal event has not been established in the present state, and it is desired to propose a technology for allowing a user to recall content of an event more easily along with an amount of spent money.

The present technology has been made in view of such circumstances and is directed to allowing a user to recall content of an event more easily along with an amount of spent money.

Solutions to Problems

An information processing apparatus according to an aspect of the present technology includes a display control unit configured to perform control to display deposit and withdrawal information regarding a deposit and a withdrawal at an event and related information relating to the deposit and the withdrawal in chronological order for each event on the basis of savings and settlement information regarding savings or settlement of a user and behavior history information in accordance with behavior of the user.

An information processing method and a program according to one aspect of the present technology are an information processing method and a program corresponding to the above-described information processing apparatus according to one aspect of the present technology.

According to an aspect of the present technology, an information processing apparatus and an information processing method perform control to display deposit and withdrawal information regarding a deposit and a withdrawal at an event and related information relating to the deposit and the withdrawal for each event in chronological order on the basis of savings and settlement information regarding savings or settlement of a user and behavior history information in accordance with behavior of the user.

An information processing apparatus according to an aspect of the present technology includes a generating unit configured to generate display information which displays deposit and withdrawal information regarding a deposit and a withdrawal at an event and related information relating to the deposit and the withdrawal for each event in chronological order on the basis of savings and settlement information regarding savings or settlement of a user and behavior history information in accordance with behavior of the user, and a transmitting unit configured to transmit the generated display information to other information processing apparatuses.

An information processing method and a program according to one aspect of the present technology are an information processing method and a program corresponding to the above-described information processing apparatus according to one aspect of the present technology.

According to an aspect of the present technology, an information processing apparatus and an information processing method generate display information which displays deposit and withdrawal information regarding a deposit and a withdrawal at an event and related information relating to the deposit and the withdrawal for each event in chronological order on the basis of savings and settlement information regarding savings or settlement of a user and behavior history information in accordance with behavior of the user, and transmit the generated display information to other information processing apparatuses.

Note that the information processing apparatus according to the aspect of the present technology may be an independent device or may be an internal block constituting one device.

BRIEF DESCRIPTION OF DRAWINGS

FIGS. 19A-19G are views illustrating an example of screen transition of travel account application.

MODE FOR CARRYING OUT THE INVENTION

Figure 1:
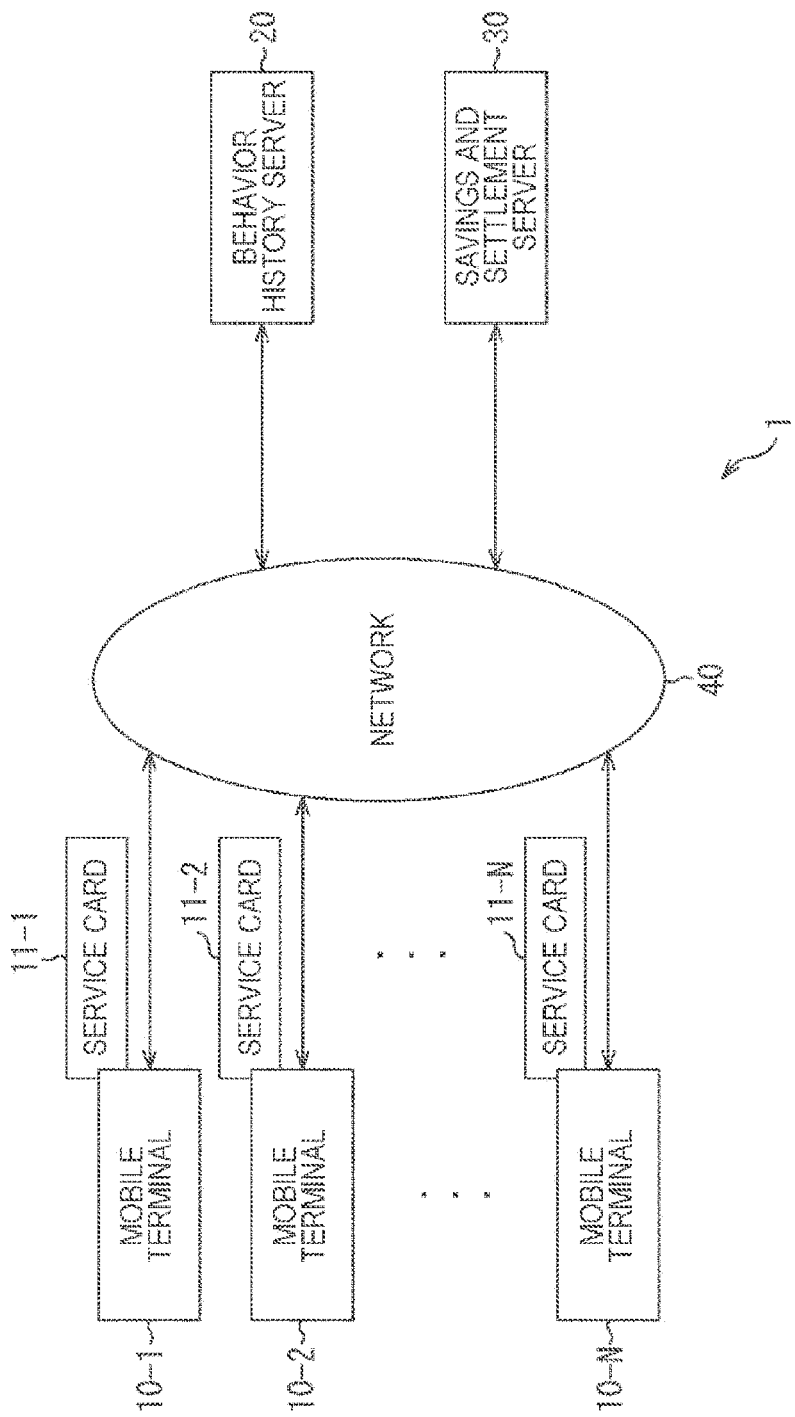
FIG. 1 is a view illustrating an example of a configuration of a service providing system to which the present technology is applied.

Hereinafter, an embodiment of the present technology will be described with reference to the drawings. Note that description will be provided in the following order.

1. First embodiment: travel account service
2. Second embodiment: live account service
3. Third embodiment: rental car account service
4. Fourth embodiment: wedding account service
5. Modified examples
6. Configuration of computer

1. First Embodiment (System Configuration)

FIG. 1 is a view illustrating an example of a configuration of a service providing system to which the present technology is applied.

The service providing system 1 includes mobile terminals 10-1 to 10-N (N is an integer of equal to or greater than 1), a behavior history server 20 and a savings and settlement server 30. In this service providing system, each of the mobile terminals 10-1 to 10-N, the behavior history server 20 and the savings and settlement server 30 are connected to each other via a network 40 including the Internet, a mobile telephone network, and the like, and can exchange various kinds of information.

The mobile terminal 10-1 is, for example, electronic equipment such as a smartphone, a mobile phone, a tablet terminal, game machine, and a wristwatch or spectacle wearable terminal. Note that the mobile terminal 10-1 which is an apparatus processing various kinds of information, can be regarded as an information processing apparatus.

The mobile terminal 10-1 can execute application of various kinds of service to be provided by the service providing system 1. Further, when a user performs various kinds of behavior, the mobile terminal 10-1 transmits information regarding the behavior to the behavior history server 20 via the network 40 or records behavior history information in the mobile terminal 10-1 as edge computing.

A service card 11-1 is a card which is provided for each of various kinds of service and events to be provided by the service providing system 1 and is provided to a user who possesses the mobile terminal 10-1. This service card 11-1 is, for example, a card such as a debit card, which has a settlement function. Note that it is assumed that security measures such as input of a code are taken when the user actually makes settlement.

Note that the settlement function of the service card 11-1 may be incorporated into the mobile terminal 10-1, in which case, the user does not have to possess the service card 11-1 and only requires to possess the mobile terminal 10-1.

The mobile terminals 10-2 to 10-N include electronic equipment such as a smartphone and can execute application of various kinds of service in a similar manner to the mobile terminal 10-1. Note that in the following description, the mobile terminals 10-1 to 10-N will be described as a mobile terminal 10 in a case where it is not necessary to particularly distinguish among the mobile terminals 10-1 to 10-N.

Further, the service cards 11-2 to 11-N are cards which have settlement functions in a similar manner to the service card 11-1, and are possessed by users who respectively possess the mobile terminals 10-2 to 10-N.

The settlement functions of the service cards 11-2 to 11-N may be respectively incorporated into the mobile terminals 10-2 to 10-N in a similar manner to the service card 11-1. Note that in the following description, the service cards 11-1 to 11-N will be described as a service card 11 in a case where it is not necessary to particularly distinguish among the service cards 11-1 to 11-N.

The behavior history server 20 is a server which manages behavior history of the users who use the mobile terminals 10-1 to 10-N. The behavior history server 20 is, for example, provided by a service provider which provides various kinds of service. Note that the behavior history server 20 which is an apparatus processing various kinds of information, can be regarded as an information processing apparatus.

The behavior history server 20 receives information regarding behavior transmitted from the mobile terminals 10-1 to 10-N via the network 40 and manages the information as behavior history information for each user. The behavior history server 20 transmits the behavior history information to the mobile terminal 10 via the network 40 in response to a request from the mobile terminal 10.

The savings and settlement server 30 is a server which manages information regarding savings, settlement, and the like, of the user who uses the mobile terminal 10. The savings and settlement server 30 is, for example, provided by a bank or a service provider which provides various kinds of service.

The savings and settlement server 30 receives information regarding savings, settlement, and the like, via the network 40 and manages the information as savings and settlement information for each user. The savings and settlement server 30 transmits the savings and settlement information to the mobile terminal 10 via the network 40 in response to a request from the mobile terminal 10.

Here, the savings and settlement information managed by the savings and settlement server 30 includes, for example, information (for example, savings information) transacted at automatic teller machine (ATM) or in service such as Internet banking which utilizes a browser opened at a personal computer and mobile banking which utilizes a browser or application opened at the mobile terminal 10 (for example, a smartphone).

Further, the savings and settlement server 30, for example, manages information (for example, settlement information) from the service card 11 or a card reader (for example, a dedicated settlement terminal provided at a store) which has read information of the mobile terminal 10 having a built-in settlement function of the service card 11, as the savings and settlement information.

Note that while the savings and settlement information including the savings information and the settlement information will be described here as being collectively managed by the savings and settlement server 30 to simplify the description, the savings information and the settlement information may be respectively managed by different servers.

(Configuration of Mobile Terminal)

Figure 2:
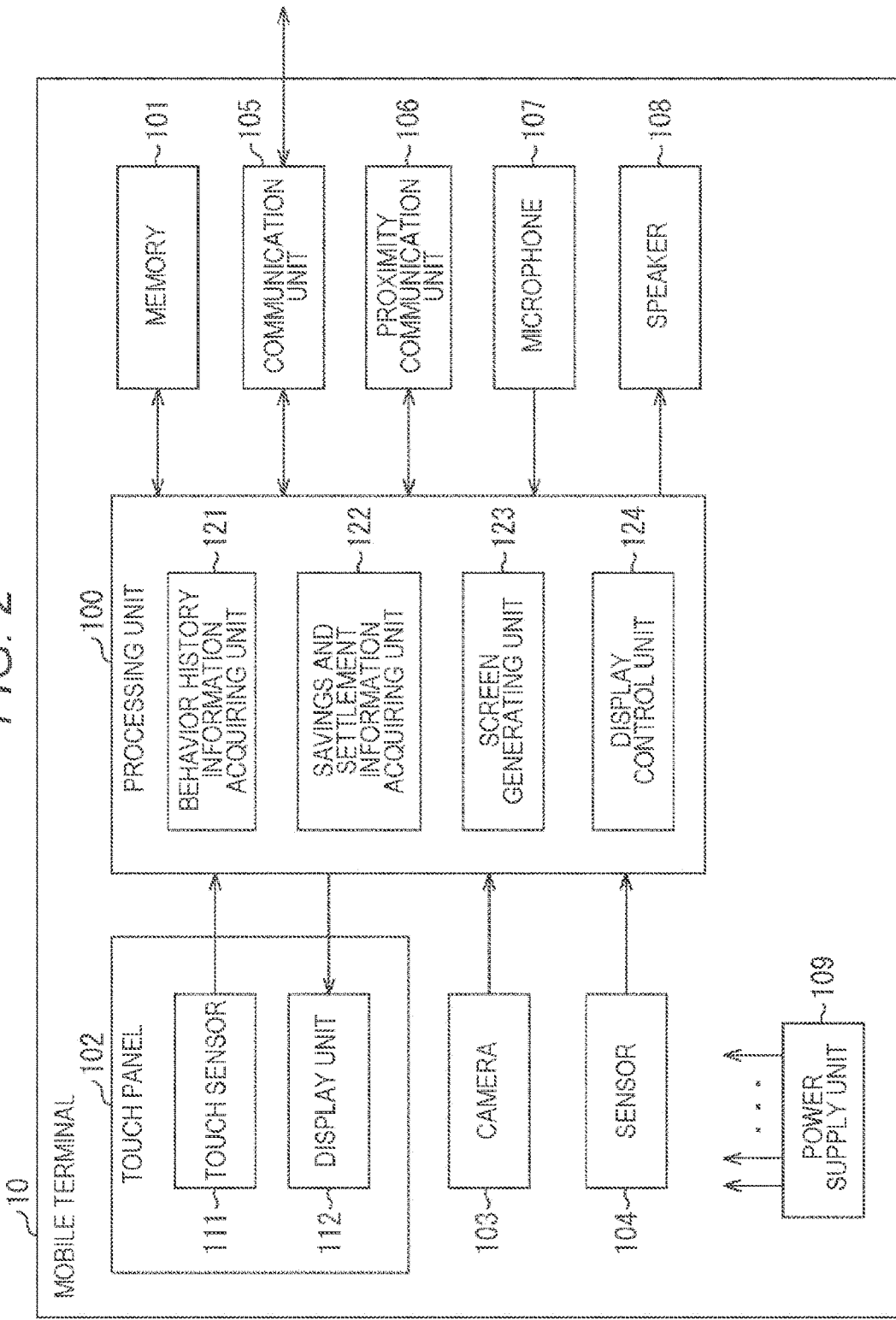
FIG. 2 is a block diagram illustrating an example of a configuration of a mobile terminal.

FIG. 2 is a block diagram illustrating an example of a configuration of a mobile terminal 10 in FIG. 1.

In FIG. 2, the mobile terminal 10 includes a processing unit 100, a memory 101, a touch panel 102, a camera 103, a sensor 104, a communication unit 105, a proximity communication unit 106, a microphone 107, a speaker 108, and a power supply unit 109.

The processing unit 100 includes, for example, a central processing unit (CPU), a microprocessor, and the like. The processing unit 100 which, for example, performs various kinds of computation processing and controls operation of respective parts, operates as a key processing apparatus in the mobile terminal 10.

The memory 101 includes, for example, a semiconductor memory such as a non-volatile memory (such as, for example, a non-volatile RAM (NVRAM)). The memory 101 records various kinds of data in accordance with control by the processing unit 100.

The touch panel 102 includes a touch sensor 111 and a display unit 112. Note that the touch sensor 111 is superimposed on a screen of the display unit 112.

The touch sensor 111 detects input operation (such as, for example, tap operation and flick operation) to be performed on the touch panel 102 by the user along with a position where the operation is performed on the touch panel 102 and supplies the detection signal to the processing unit 100.

The display unit 112 includes, for example, a display such as a liquid crystal display and an organic EL display. The display unit 112 displays various kinds of information including text, an image, a moving image, and the like, in accordance with control by the processing unit 100.

The camera 103 includes an image sensor such as a complementary metal oxide semiconductor (CMOS) image sensor and a charge coupled device (CCD) image sensor, and a signal processing unit such as a camera image signal processor (ISP).

The camera 103 performs processing regarding exposure, focusing, white balance, and the like, as well as correction processing of an optical system such as a lens and correction processing to address variation of the image sensor and the like, on a signal obtained by capturing an image of a subject using the image sensor, and supplies data of the captured image obtained as a result of the processing to the processing unit 100.

The sensor 104 includes various kinds of sensors. The sensor 104 performs sensing to obtain various kinds of information regarding the user and periphery of the user and supplies data of the sensors in accordance with the sensing results to processing unit 100.

For example, the sensor 104 can include various kinds of sensors such as a magnetic sensor which detects a degree and a direction of a magnetic field, an acceleration sensor which detects acceleration, a gyro sensor which detects an angle (attitude), angular velocity and angular acceleration, a position sensor which detects position information calculated from a global positioning system (GPS) signal, and the like, an ambient light sensor which detects ambient brightness, a proximity sensor which detects an object which comes close, and a biosensor which detects biological information such as fingerprint, iris and pulse.

The communication unit 105 includes, for example, a communication module, and the like, which support cellular communication (such as, for example, LTE-Advanced and 5G), wireless communication such as a wireless local area network (LAN) or wired communication such as Ethernet (registered trademark).

The communication unit 105 transmits various kinds of data to the behavior history server 20 or the savings and settlement server 30 via the network 40 in accordance with control by the processing unit 100. Further, the communication unit 105 receives various kinds of data transmitted from the behavior history server 20 or the savings and settlement server 30 via the network 40 in accordance with control by the processing unit 100.

The proximity communication unit 106 includes, for example, a proximity communication module, and the like, which support near field communication such as near field communication (NFC) and Bluetooth (registered trademark). The proximity communication unit 106 transmits and receives various kinds of data by utilizing near field communication such as, for example, NFC in accordance with control by the processing unit 100.

The microphone 107 is equipment (sound collector) which converts sound from outside into an electric signal. The microphone 107 supplies a speech signal obtained by conversion to the processing unit 100.

The speaker 108 outputs sound in accordance with an electric signal such as a speech signal in accordance with control by the processing unit 100. Note that while not illustrated, in a case where earphones or a headphone is connected to the mobile terminal 10 via a predetermined terminal, the earphones or the headphone can output a speech signal via the predetermined terminal in accordance with control by the processing unit 100.

The power supply unit 109 supplies power obtained from a storage battery or an external power supply to respective units of the mobile terminal 10 including the processing unit 100.

Here, the processing unit 100 includes a behavior history information acquiring unit 121, a savings and settlement information acquiring unit 122, a screen generating unit 123, and a display control unit 124 to implement various kinds of service to be provided by the service providing system 1.

The behavior history information acquiring unit 121 requests behavior history information to the behavior history server 20 via the network 40 by controlling the communication unit 105. The behavior history information acquiring unit 121 acquires the behavior history information transmitted from the behavior history server 20 via the network 40 by controlling the communication unit 105. The behavior history information acquiring unit 121 supplies the acquired behavior history information to the screen generating unit 123.

The savings and settlement information acquiring unit 122 requests savings and settlement information to the savings and settlement server 30 via the network 40 by controlling the communication unit 105. The savings and settlement information acquiring unit 122 acquires the savings and settlement information transmitted from the savings and settlement server 30 via the network 40 by controlling the communication unit 105. The savings and settlement information acquiring unit 122 supplies the acquired savings and settlement information to the screen generating unit 123.

The screen generating unit 123 generates screens regarding various kinds of service and supplies the screens to the display control unit 124. The display control unit 124 performs control to display the screens supplied from the screen generating unit 123 at the display unit 112 of the touch panel 102.

Further, the screen generating unit 123 generates a predetermined screen on which deposit and withdrawal information regarding deposits and withdrawals at an event and related information of the deposit and withdrawal information are displayed in chronological order for each event on the basis of the behavior history information supplied from the behavior history information acquiring unit 121 and the savings and settlement information supplied from the savings and settlement information acquiring unit 122. The display control unit 124 displays the predetermined screen generated by the screen generating unit 123 at the display unit 112. While the event includes various kinds of events, it is assumed here that the event is, particularly, a personal event such as a travel (for example, a travel to Hokkaido or a travel to Kyoto).

Note that the behavior history information acquiring unit 121 to the display control unit 124 can be implemented by, for example, the processing unit 100 such as a CPU executing programs of application of various kinds of service recorded in the memory 101. This application may be recorded in the memory 101 in advance or may be downloaded from an application server (not illustrated) on the network 40.

Further, as described above, in a case where the mobile terminal 10 has a built-in settlement function of the service card 11, the mobile terminal 10 can utilize the proximity communication unit 106 which supports near field communication such as NFC. In other words, for example, when a user who purchases an item waves the mobile terminal 10 over a dedicated settlement terminal, data is transmitted and received by utilizing near field communication such as NFC, so that so-called mobile payment (electronic payment) can be implemented.

The mobile terminal 10 has a configuration as described above.

(Configuration of Behavior History Server)

Figure 3:
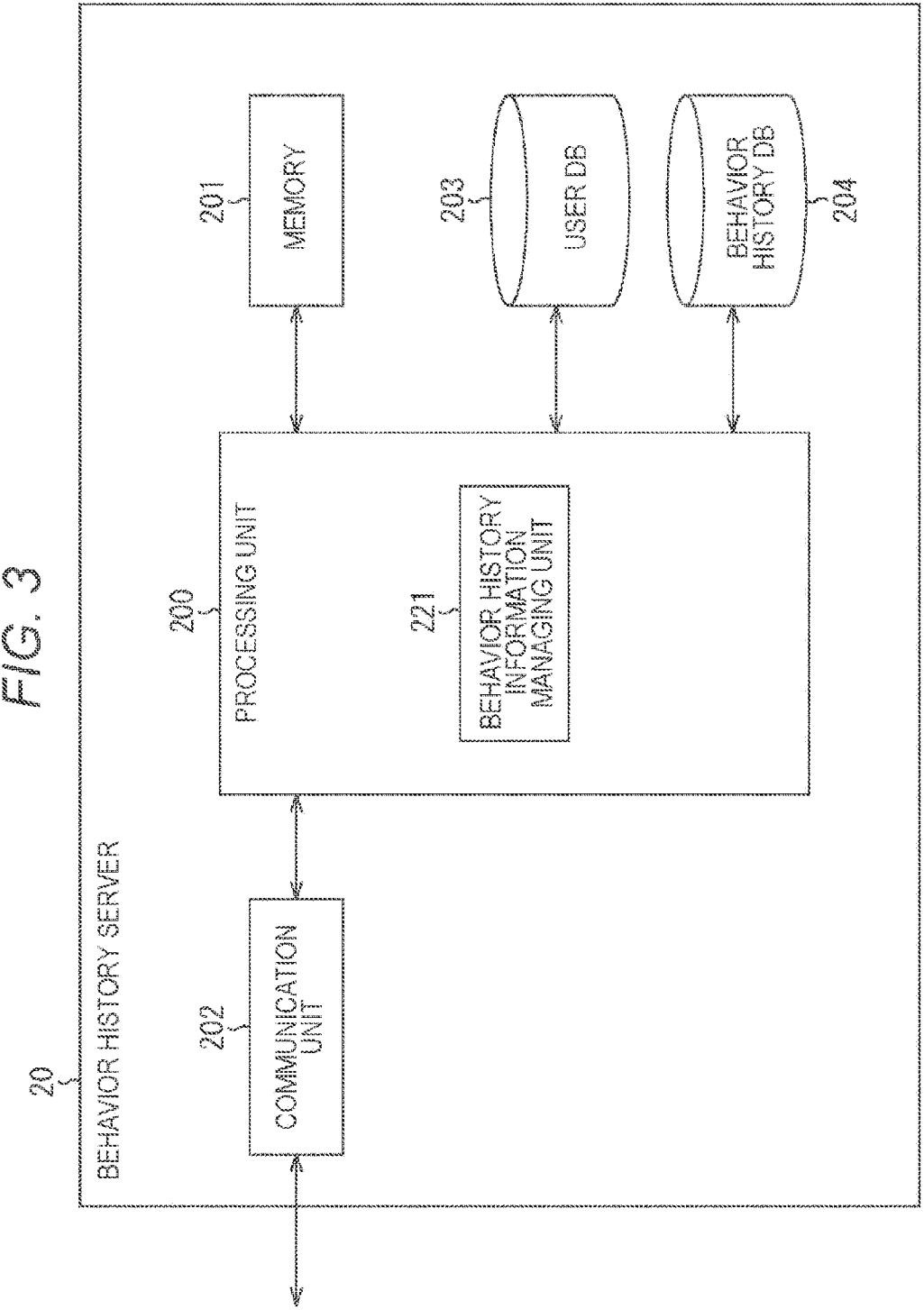
FIG. 3 is a block diagram illustrating an example of a configuration of a behavior history server.

FIG. 3 is a block diagram illustrating an example of a configuration of a behavior history server 20 in FIG. 1.

In FIG. 3, the behavior history server 20 includes a processing unit 200, a memory 201, a communication unit 202, a user DB 203, and a behavior history DB 204.

The processing unit 200 includes, for example, a CPU, a microprocessor, and the like. The processing unit 200 which, for example, performs various kinds of computation processing and controls operation of respective parts, operates as a key processing apparatus in the behavior history server 20.

The memory 201 includes, for example, a semiconductor memory such as a non-volatile memory (such as, for example, an NVRAM). The memory 201 records various kinds of data in accordance with control by the processing unit 200.

The communication unit 202 includes a communication module, and the like, which support wireless communication or wired communication. The communication unit 202 receives various kinds of data transmitted from the mobile terminals 10-1 to 10-N via the network 40 in accordance with control by the processing unit 200. Further, the communication unit 202 transmits various kinds of data to the mobile terminals 10-1 to 10-N via the network 40 in accordance with control by the processing unit 200.

The user DB 203 and the behavior history DB 204 are recorded in a large-capacity storage apparatus such as a hard disk. The user DB 203 stores user information regarding users who utilize various kinds of service. The behavior history DB 204 stores behavior history information for each user.

Here, the processing unit 200 includes a behavior history information managing unit 221 to manage the behavior history information for each user.

The behavior history information managing unit 221 stores information regarding behavior of users transmitted from the mobile terminal 10 in the behavior history DB 204 for each user by referring to user information stored in the user DB 203 and manages the behavior history information for each user.

Here, the behavior history information is information in accordance with behavior of users and includes various kinds of information regarding behavior of the users. For example, the behavior history information can include information regarding behavior of users which can be obtained from various kinds of data such as input data to the touch sensor 111 of the touch panel 102 at the mobile terminal 10, data of captured images captured with the camera 103, data of various kinds of sensors detected by the sensor 104, data of communication to be performed by the communication unit 105 and the proximity communication unit 106, and data of speech to be processed at the microphone 107 and the speaker 108.

Note that as described above, here, the mobile terminals 10 of the respective users may individually manage the own behavior history information as well as the behavior history server 20 having centralized management on the behavior history information of a plurality of users. More specifically, for example, a captured image captured at the mobile terminal 10 which is one of the behavior history information, may be managed on the behavior history server 20 side (stored in a large-capacity storage apparatus on a cloud) or may be managed on the mobile terminal 10 side (stored in the local memory 101).

Further, part of information among all the information may be managed on the mobile terminal 10 side while the remaining part of information may be managed on the behavior history server 20 side for each user. Still further, the behavior history information may include other information (for example, information obtained from data processed at an external apparatus) as well as information obtained from data processed at the mobile terminal 10.

The behavior history server 20 has a configuration as described above.

(Outline of Travel Account Service)

By the way, service which can be provided by the service providing system 1 in FIG. 1 includes travel account service. This travel account service is service for managing various matters regarding money in a preparation stage before the travel, during the travel and after the travel.

Note that in the following description, application of the travel account service will be referred to as travel account application, and the service card 11 of the travel account service will be referred to as a travel account service card 11. Further, in the following description, there is a case where each travel of the user will be expressed as a travel bag.

Figure 4:
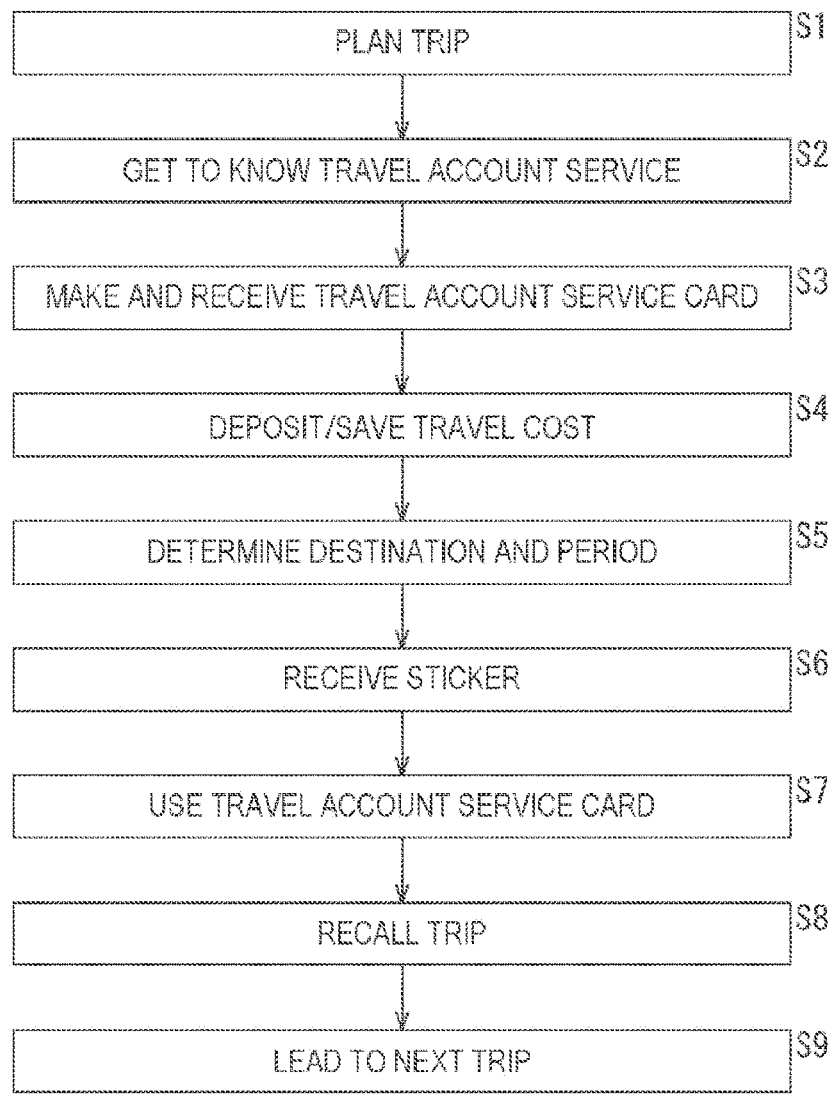
FIG. 4 is a flowchart for explaining flow when travel account service is utilized.

The flowchart in FIG. 4 indicates flow when the travel account service is utilized.

First, the user plans a travel with friends, or the like (S1) and collects information of a destination, and the like. It is assumed that the user gets to know the travel account service from, for example, an advertisement and the like while the user collects the information (S2).

Note that a medium of the advertisement described here includes, for example, an advertisement on a travel magazine, a web advertisement (for example, on a site of a railroad company, on a travel related site, on a site of a bank, or the like), a brochure (for example, a leaflet put at an express ticket office of the station, a travel agency, a bank, or the like), an official website, campaign, promotion, or the like, of the travel account service.

Then, in a case where the user utilizes the travel account service, the user opens a dedicated account and decides a material of the travel account service card 11 (S3).

Here, for example, there can be the following ways to open an account. That is, it is possible to download the travel account application by reading a two-dimensional code (for example, a QR code (registered trademark)), a barcode, or the like, on a web advertisement or a brochure with (the camera 103 of) the mobile terminal 10 or download the travel account application by accessing a site of content distribution service with (the communication unit 105 of) the mobile terminal 10.

The user can open an account by starting the downloaded travel account application, filling in a form for opening an account, causing an identification card such as, for example, a driver license and a student identification card to be read, and transmitting these kinds of data to the server at the mobile terminal 10.

Further, here, the user is allowed to select design of the travel account service 11 to be provided to a subscriber of the travel account service by operating the travel account application which is running at the mobile terminal 10. By this means, an account is open for each user who subscribes the travel account service, and the travel account service card 11 is issued and delivered to the user at a later date (S3). This travel account service card 11 is assumed to be a card such as, for example, a debit card and a cash card, which has a settlement function.

After the account is opened, the user deposits travel cost into the account and saves the money (S4). Here, the user prepares funds for go traveling. The following patterns can be assumed as a way to prepare the funds, that is, the funds are deposited into the account in a case where the funds have already been prepared, or money is deposited or accumulated in a case where the funds have not been prepared.

Note that money can be deposited into the account, for example, by starting a browser or application to utilize a function of mobile banking or by utilizing a function of the travel account application at the mobile terminal 10 as well as by utilizing automatic teller machine (ATM). Further, here, information of the account can be managed by utilizing the travel account application.

Further, the user finally determines a destination and time schedule of the travel by operating the travel account application which is running at the mobile terminal 10 (S5). Note that, in this event, information regarding discount information, a bonus, and the like, at the travel destination may be added in the travel account application. Further, the mobile terminal 10 may have a function of bookmarking information which the user is curious about among the information of the travel destination.

Thereafter, a sticker in accordance with the determined destination is delivered to the user (S6). This sticker has design different for each travel destination and is effective during the travel. Further, for example, information regarding the destination (for example, Hokkaido), a period (for example, Mar. 3 to Mar. 4, 2015), and the like, is printed on this sticker. For example, the user can put himself/herself into a mode in which the user will spend money which has been saved on his/her own at the travel destination and can get excited before the travel by pasting the delivered sticker on his/her travel account service card 11.

Then, when the user arrives at the destination (for example, Hokkaido) on the date (for example, Mar. 3, 2015) of the travel, the settlement function of the travel account service card 11 becomes effective. By this means, the user can make settlement (S7) at the travel destination by utilizing (the settlement function of) the travel account service card 11, which may include, for example, the following scenes.

In other words, the scenes can include, for example, a scene in which admission fees of playgrounds such as a zoo and an amusement park are discounted as special discount for playgrounds as well as the user paying for items, meals, and the like, by utilizing the settlement function of the travel account service card 11, a scene in which, in a case where the user travels with his/her friends, a bill is automatically divided upon checkout by the travel account service cards 11 of all of them being handed over to a clerk, a scene in which a clerk judges the user as a traveler who possesses the travel account service card 11 inside a store and speaks to the user, and the like.

Note that balance of the account during the travel can be confirmed using the travel account application (for example, balance is displayed on a top screen) which is running at the mobile terminal 10, so that the user can immediately confirm the balance when the user is concerned about spending and balance at the present moment. Further, for example, while airplane tickets, hotels, and the like, during the travel are often reserved in advance, by selecting settlement on the date of the travel in the travel account service as fees for airplane tickets and hotels upon application of the airplane tickets and the hotels, the settlement is made upon utilization of the airplanes and the hotels. Note that in a case where the settlement on the date of the travel is selected in the travel account service, the fees for the airplane tickets, the hotels, and the like, may be discounted at a predetermined discount rate.

During the period (for example, Mar. 3 to Mar. 4, 2015) of the travel, payment for items, meals, and the like, by utilizing the travel account service card 11 is recorded, and after the period of the travel ends, recording of payment is finished. The user can recall the time schedule of the travel such as where and how much money he/she has spent by browsing information regarding his/her travel (for example, deposit and withdrawal information and related information displayed on a user's trip detail screen 351 (FIG. 11 and FIG. 12) which will be described later) using the travel account application which is running at the mobile terminal 10 after the user has come back from the travel (S8).

Note that the information regarding his/her travel can be shared with other users. Further, it is possible to browse the shared information from a predetermined screen and perform search in detail by adding hashtags. Still further, here, it is possible to select whether to release information which can be shared. Further, the user can browse information regarding travels of other users.

In this manner, the user can browse information regarding travels of other users as well as the information regarding his/her travel by utilizing the travel account application which is running at the mobile terminal 10, so that the user can be motivated to go traveling next by these kinds of information (S9). Further, here, user's mind to desire to collect stickers having different design for each travel destination (for example, for each prefecture) or desire to increase points (service points) provided from the travel account service by going traveling, for example, can trigger the next travel.

(Detailed Operation of Travel Account Application)

Detailed operation of the travel account application to be executed at the mobile terminal 10 will be described next with reference to FIG. 5 to FIG. 26. This travel account application mainly has an account management function, a user's trip list function, and an others' trip list function.

(A) Account Management Function

First, the account management function of the travel account application will be described with reference to FIG. 5 and FIG. 6. Note that, here, a case will be described as an example where the user who has subscribed the travel account service has already opened an account and has deposited travel cost into the account before the user utilizes the account management function of the travel account application.

Figure 5:
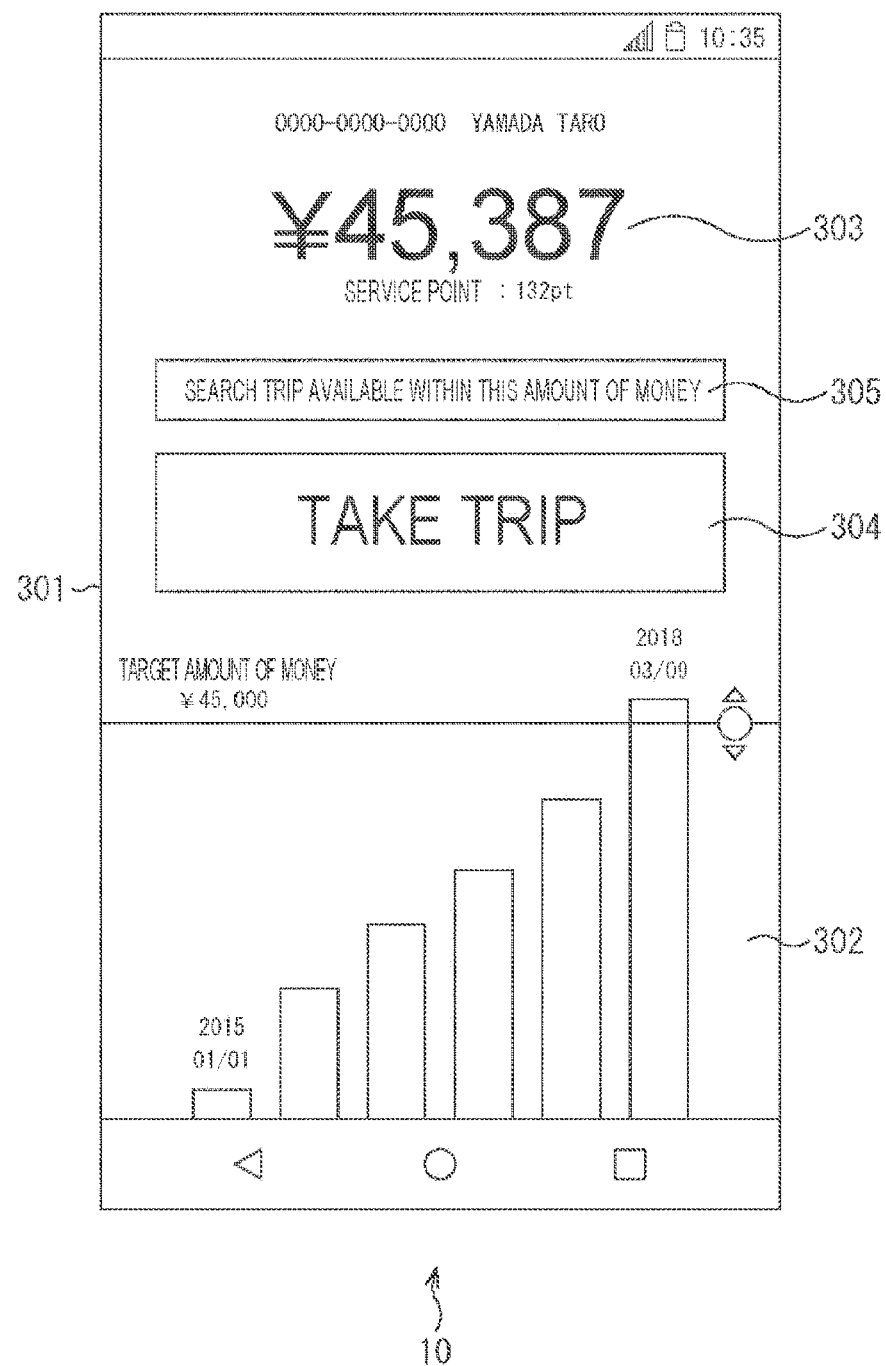
FIG. 5 is a view illustrating an example of an account management screen.

FIG. 5 illustrates an example of an account management screen 301 to be displayed at (the display unit 112 of) the touch panel 102 of the mobile terminal 10.

On the account management screen 301, a bar chart displayed in a savings history display region 302 represents a savings amount (yen) for each predetermined date, and indicates that a target amount of money is achieved at a time point of Mar. 9, 2018 in a case where the target amount of money for the travel is set at 45,000 yens, the money for the travel is started to be saved from Jan. 1, 2015, and the money is gradually saved thereafter.

It is indicated in a savings amount display region 303 that 45,387 yens are saved as the savings amount at the present moment. Here, 132 points which are obtained by utilizing the travel account service are indicated along with the savings amount.

Further, on the account management screen 301, an application button 304 is a button for applying a travel destination in accordance with the savings amount. In a case where the application button 304 is tapped, an application screen 311 illustrated in FIG. 6 is displayed while being superimposed on the account management screen 301.

Figure 6:
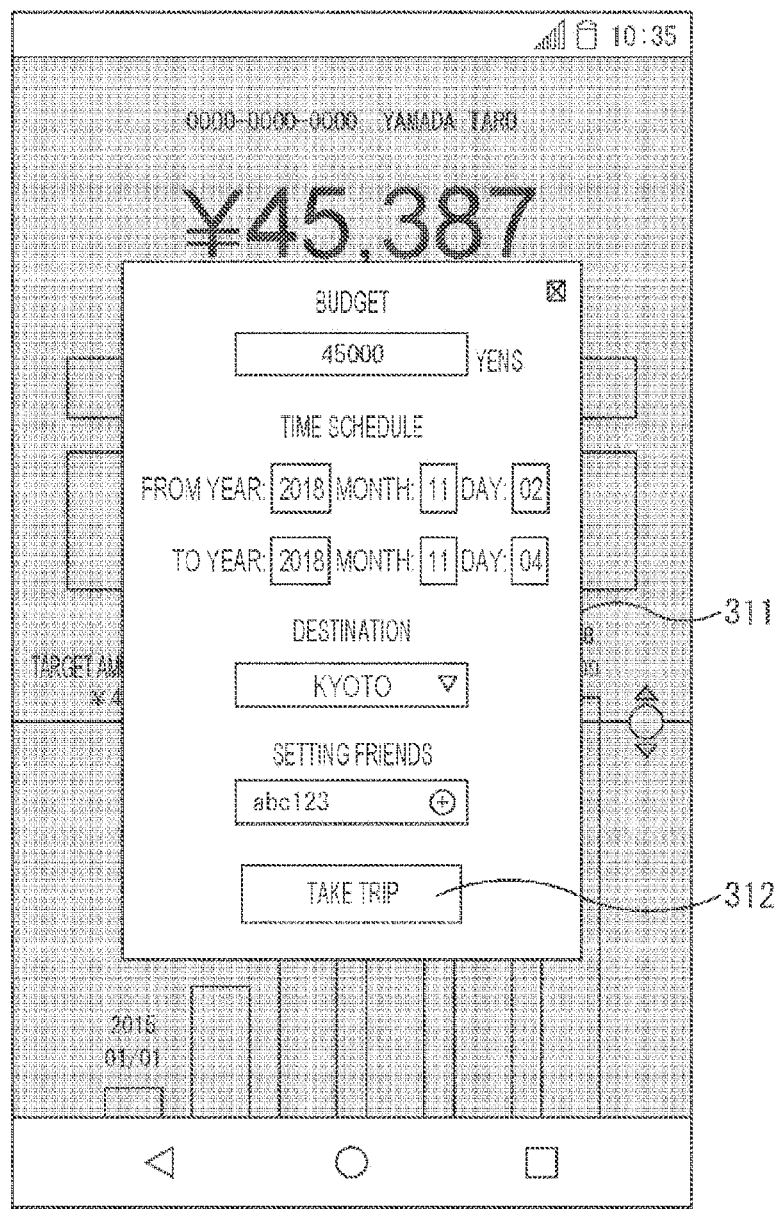
FIG. 6 is a view illustrating an example of an application screen.

In FIG. 6, items regarding friends with whom the user goes traveling are provided on the application screen 311 as well as items of a budget, time schedule and a destination, and these kinds of information regarding application are input by the user. For example, in FIG. 6, a budget of 45,000 yens, time schedule of a period from Nov. 2, 2018 to Nov. 4, 2018, a destination of Kyoto, and "abc123" who is a friend are input.

Note that "abc123" represents nickname of a friend registered on a system, for example. Further, here, it is possible to register two or more friends by operating a button provided in an input field for setting friends. In a case where the user goes traveling alone, it is not necessary to register friends.

Then, in a case where the user taps a registration button 312 after the user inputs information of the plan, the time schedule, the destination, the friends, and the like, on the application screen 311, the application information is transmitted to the behavior history server 20 via the network 40 and registered.

In this manner, with the travel account application, it is possible to manage the account of the user to, for example, save money toward a target amount of money and apply for a travel using the saved amount of money as money for the travel in a case where the target amount of money is achieved, by utilizing the account management function.

(B) User's Trip List Function

The user's trip list function of the travel account application will be described next with reference to FIG. 7 to FIG. 16.

Figure 7:
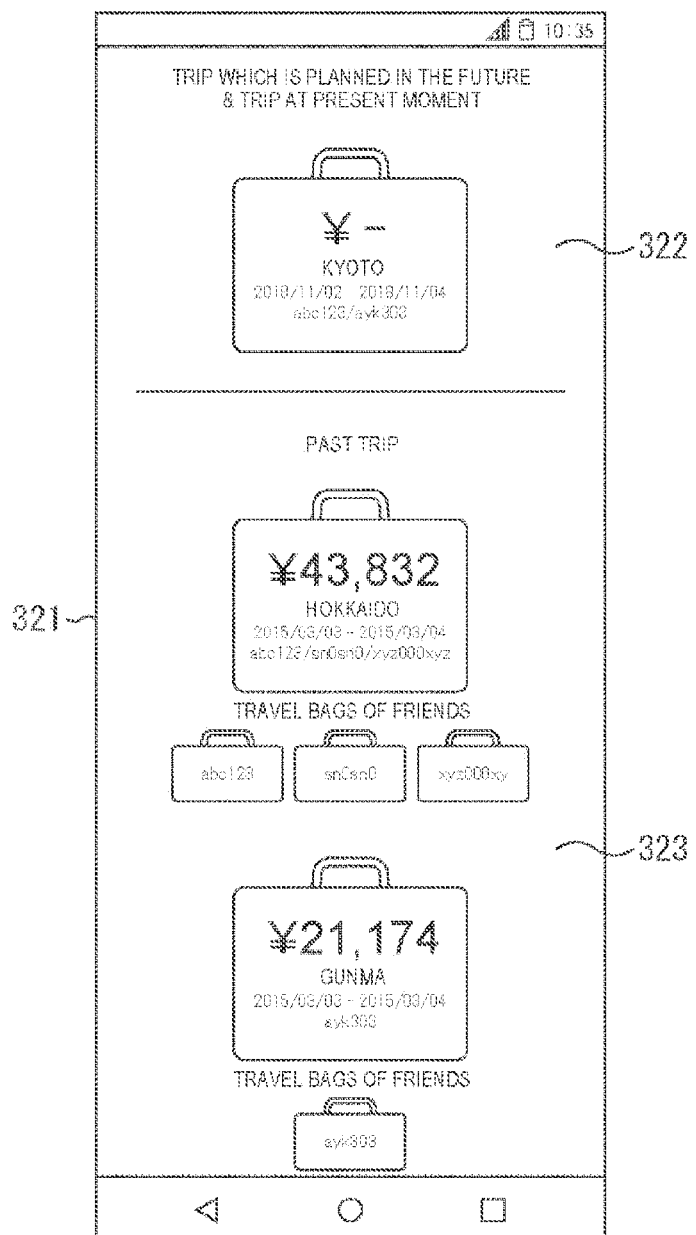
FIG. 7 is a view illustrating a first example of a trip list screen.

FIG. 7 illustrates an example of a trip list screen 321 to be displayed at (the display unit 112 of) the touch panel 102 of the mobile terminal 10.

This trip list screen 321 is displayed, for example, in a case where the registration button 312 is tapped after application information is input on the application screen 311 in FIG. 6. In FIG. 7, the trip list screen 321 includes two regions of a present and future trip display region 322 and a past trip display region 323.

In the present and future trip display region 322, information regarding a trip which is planned in the future, and a trip at the present moment. For example, in FIG. 7, information regarding a travel to Kyoto (time schedule: Nov. 2, 2018 to Nov. 4, 2018, friends: abc123, ayk303) registered in the application screen 311 in FIG. 6 is displayed on an icon of a travel bag. Note that this travel to Kyoto is a trip which is planned in the future, and cost of the travel is not fixed at the present moment, so that it can be said that the travel bag is incomplete.

Further, in the past trip display region 323, information regarding trips in the past is presented. For example, in FIG. 7, information regarding a travel to Hokkaido and information regarding a travel to Gunma in the past are respectively displayed on icons of travel bags.

For example, concerning the travel to Hokkaido, the time schedule is from Mar. 3, 2015 to Mar. 4, 2015, it has costed the user 43,832 yens, and the user has gone traveling with three friends of abc123, an0sn0 and xyz000xyz. Further, here, icons of travel bags corresponding to these three friends are displayed, and detailed information regarding the trip of a target friend is presented by, for example, tapping the icon.

Figure 8:
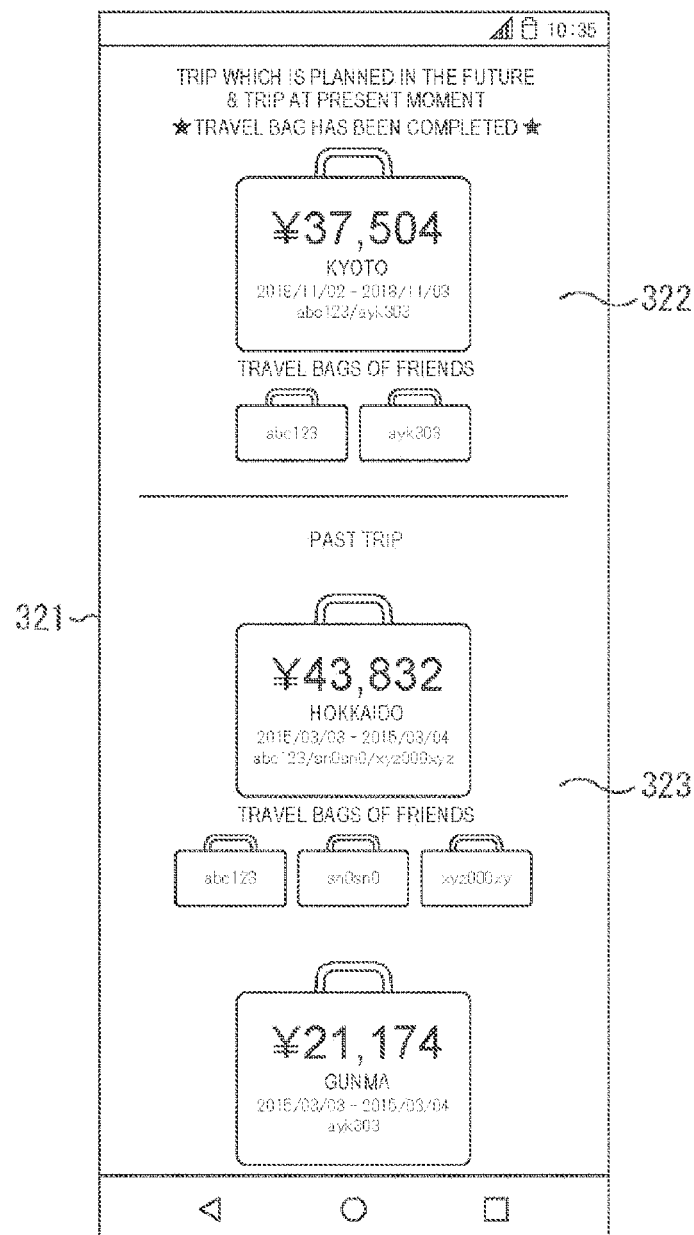
FIG. 8 is a view illustrating a second example of a trip list screen.

Thereafter, in a case where the user actually goes traveling to Kyoto with two friends (abc123 and ayk303) in the planned time schedule (Nov. 2, 2018 to Nov. 4, 2018) and cost of the travel (information regarding deposits and withdrawals) is fixed, the travel bag displayed in the present and future trip display region 322 on the trip list screen 321 is completed, and displayed on the trip list screen 321 illustrated in FIG. 8.

In other words, it is fixed that it costs the user 37,504 yens to go traveling to Kyoto, and thus, an amount of 37,504 yens is displayed on the icon of the travel bag in the present and future trip display region 322 on the trip list screen 321 in FIG. 8.

Note that while details will be described later, during this travel to Kyoto, behavior history information is held in (the memory 101 of) the mobile terminal 10 or the behavior history server 20, and the savings and settlement information is held in the savings and settlement server 30 in accordance with behavior of the user and the friends.

Figure 9:
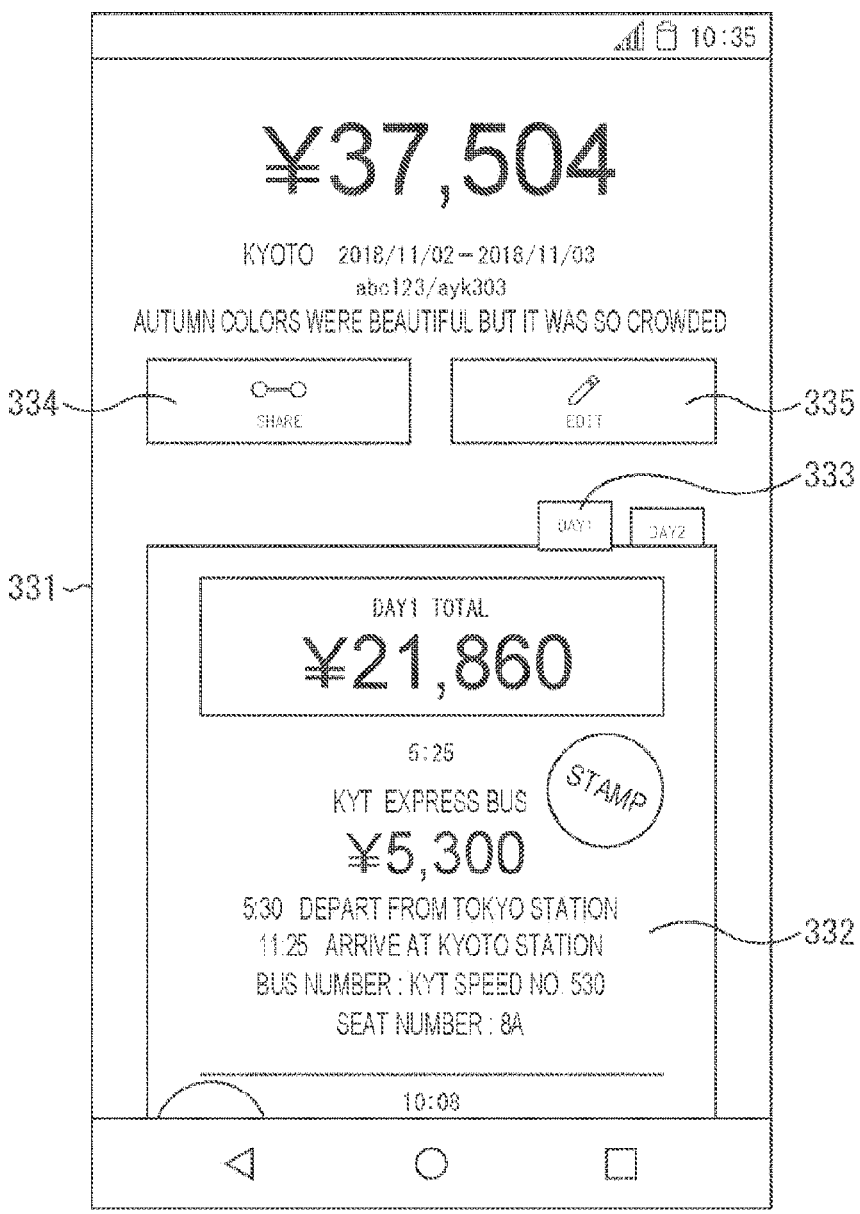
FIG. 9 is a view illustrating an example of a user's trip detail screen.

Here, in a case where the travel bag of the user displayed in the present and future trip display region 322 is tapped, the user's trip detail screen 331 illustrated in FIG. 9 is displayed, so that the user can refer to detailed information regarding the travel of the user. More specifically, deposit and withdrawal information (such as, for example, information of settlement) regarding deposits and withdrawals of the user during the travel to Kyoto and related information (such as, for example, text and an image) relating to the deposit and withdrawal information are displayed on the user's trip detail screen 331.

For example, on the user's trip detail screen 331, along with deposit and withdrawal information of, for example, a fee for an express bus (5,300 yens) on the way, related information thereof such as settlement time, departure and arrival time, departure and arrival place, bus number and seat number is displayed in the trip information display region 332 as a total amount (21,860 yens) of money spent on the first day of the travel and breakdown thereof.

Further, while not illustrated, by the whole of the screen being scrolled in a vertical direction in response to flick operation in a vertical direction, deposit and withdrawal information (such as, for example, admission fees for temples and meal charges) other than the fee for the express bus on the way and related information thereof (such as, for example, images of temples and a lunch) are displayed in a form of a strip in the trip information display region 332 as the amount of money spent on the first day of the travel and breakdown thereof. Such display in a form of a receipt can be regarded as so-called presentation of a detailed receipt regarding an amount of money spent by the user on the first day of the travel.

Note that it is possible to switch information between information of the first day and information of the second day by tapping a time schedule tab 333. Further, a share button 334 for sharing the information with other users such as friends and an edit button 335 for editing the information are displayed in the user's trip detail screen 331.

Returning to description of FIG. 8, in a case where travel bags of the friends (abc123, ayk303) who has gone traveling with the user are completed, the travel bags of the friends are displayed on the trip list screen 321 along with the travel bag of the user displayed in the present and future trip display region 322. Then, for example, in a case where the travel bag of the friend who is abc123 is tapped, the friend's trip detail screen 341 illustrated in FIG. 10 is displayed, and detailed information regarding the trip of the selected friend (abc123) can be referred to.

Figure 10:
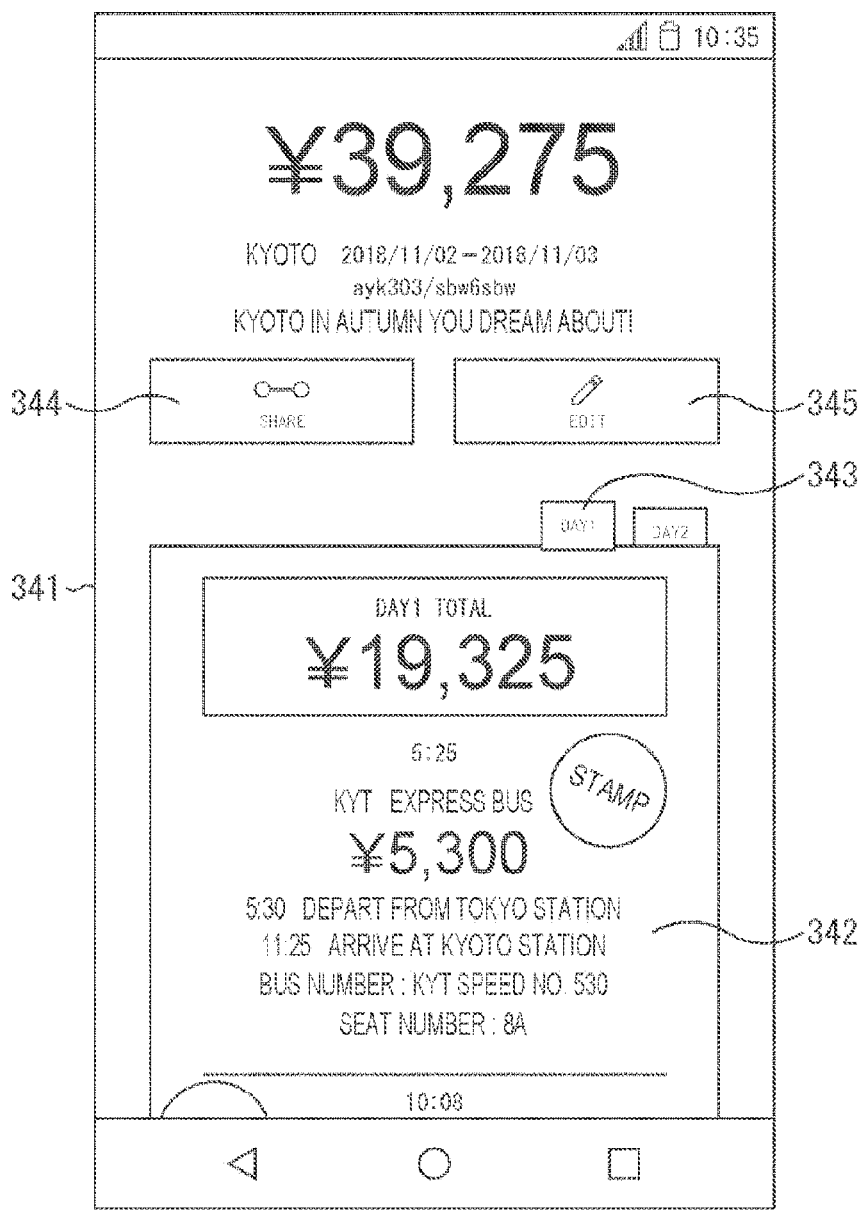
FIG. 10 is a view illustrating an example of a friend's trip detail screen.

For example, while the friend's trip detail screen 341 in FIG. 10 has a screen configuration similar to that of the user's trip detail screen 331 in FIG. 9, a total amount of money (for example, 19,325 yens) spent on the first day, breakdown thereof, and the like, as well as a total amount (39,275 yens) of cost of travel are different from those of the user, because an amount of money spent at each place is different between the user and the friend (abc123) although the user and the friend have gone around together.

In other words, comparing information displayed in the trip information display region 342 on the friend's trip detail screen 341 (FIG. 10) with information displayed in the trip information display region 332 in the user's trip detail screen 331 (FIG. 9), while expenses of transportation cost such as the express bus, cost of the hotel, and admission fees such as admission fees for temples are the same among the respective users, expenses of, for example, cost of meals, cost of souvenirs, and the like are unique to each user.

In this manner, a plurality of users (the user and friends) belonging to the same group (friend group) can participate in a travel (event) such as a travel to Kyoto, and deposit and withdrawal information and related information thereof are displayed in chronological order for each of the plurality of users (the user and friends). Further, the deposit and withdrawal information include common withdrawal information which is common among the plurality of users (the user and friends) and unique withdrawal information which is unique to each of the plurality of users. Note that the common withdrawal information includes bill sharing information regarding an amount of money shared by dividing a total amount by the number of users.

Note that a time schedule tab 343, a share button 344 and an edit button 345 are displayed on the friend's trip detail screen 341 (FIG. 10) in a similar manner to the user's trip detail screen 331 (FIG. 9).

Figure 11:
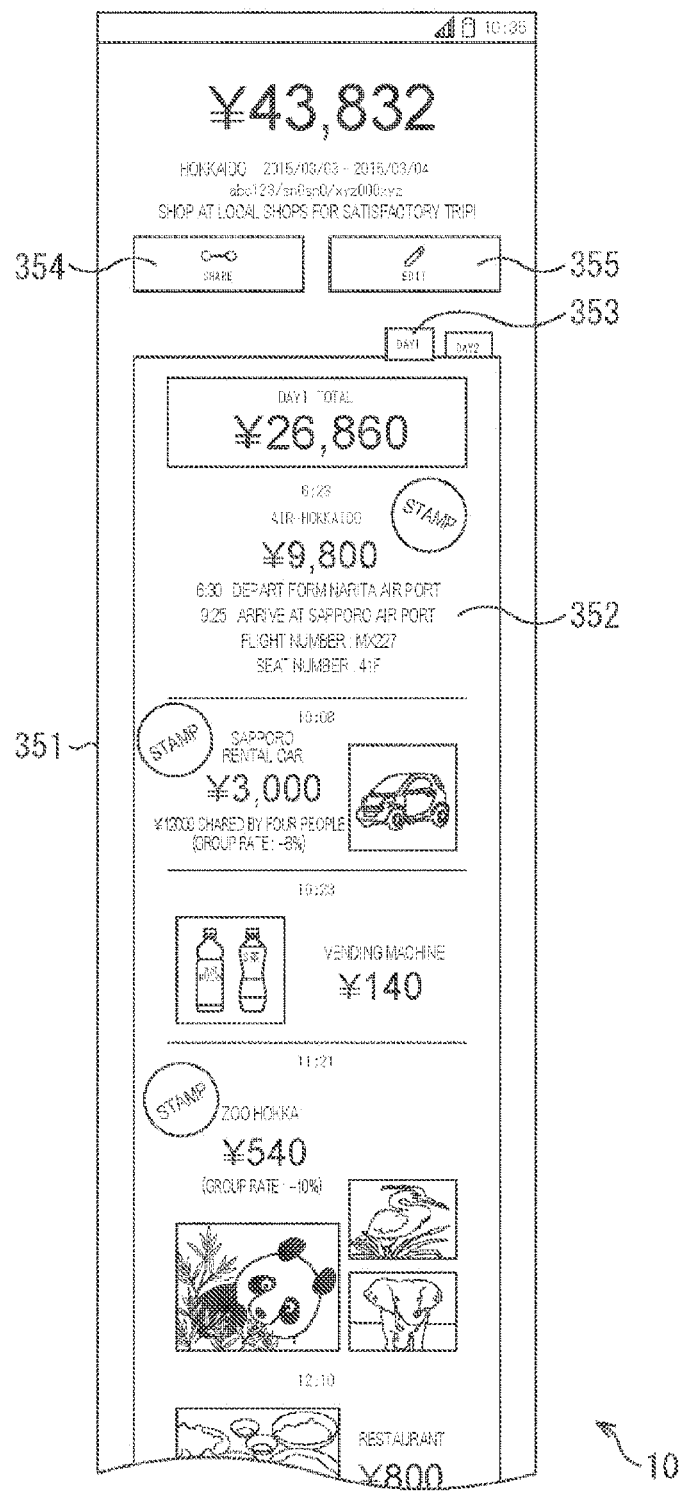
FIG. 11 is a view illustrating a first example of the user's trip detail screen.
Figure 12:
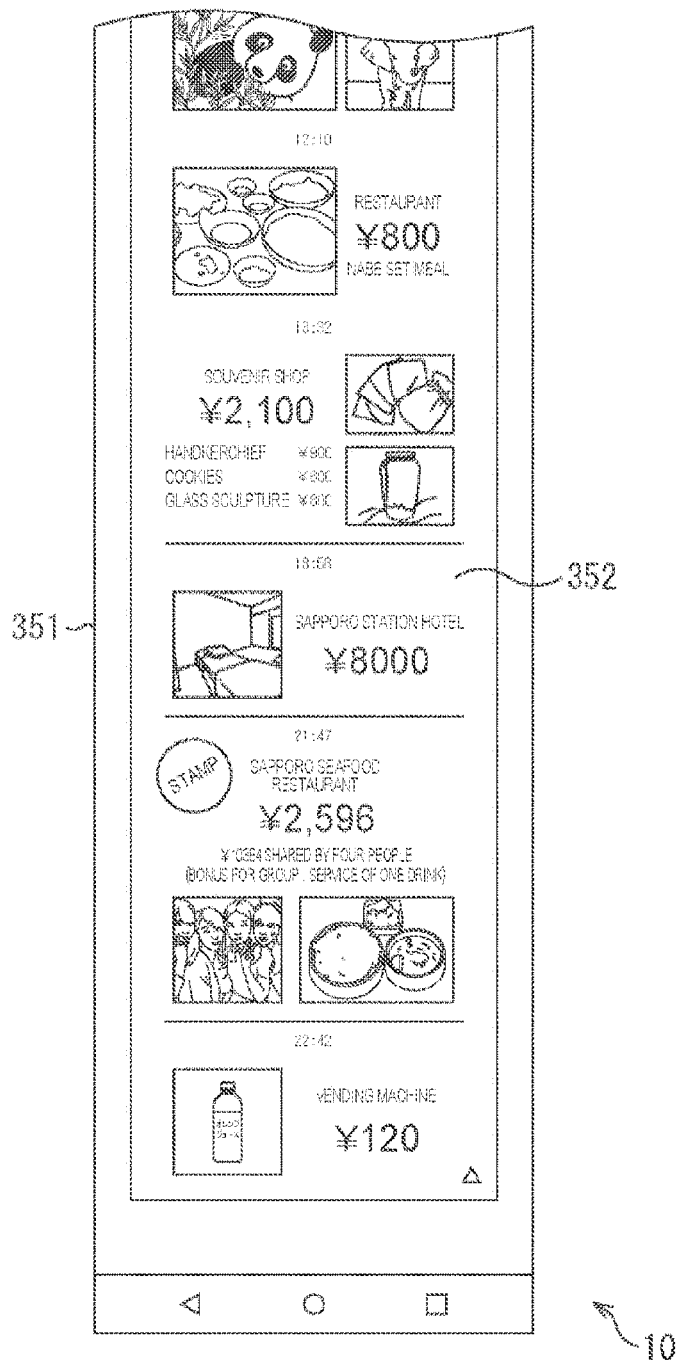
FIG. 12 is a view illustrating a second example of the user's trip detail screen.

Returning to description in FIG. 8, in a case where the travel bag of the user displayed in the past trip display region 323 is tapped on the trip list screen 321, the user's trip detail screen 351 illustrated in FIG. 11 and FIG. 12 is displayed, and detailed information regarding the past trip of the user can be referred to.

More specifically, in a case where the user has gone traveling to Hokkaido with three friends (abc123, an0sn0, xyz000xyz) from Mar. 3, 2015 to Mar. 4, 2015, deposit and withdrawal information of the user during the travel to Hokkaido and related information are displayed on the user's trip detail screen 351 in FIG. 11 and FIG. 12 in a form of a receipt (in a form of a strip) for each date. Note that in FIG. 11 and FIG. 12, the trip information display region 352 continues like a long receipt, and all the information can be displayed by the whole of the screen being scrolled in response to flick operation in a vertical direction.

For example, in the trip information display region 352, deposit and withdrawal information which includes cost of an airplane ticket on the way (9,800 yens), cost of a rental car (3,000 yens), cost of a drink (140 yens), an admission fee for a zoo (540 yens), cost of a lunch (800 yens), cost of souvenirs (2,100 yens), cost of a hotel (8,000 yens), cost of a dinner (2,596 yens) and cost of a drink (120 yens) is displayed in chronological order along with related information as a total amount (26,860 yens) of money spent on the first day of the travel and breakdown thereof.

Specifically, in the trip information display region 352 in a form of a receipt (in a form of a strip), along with deposit and withdrawal information which includes cost of the airplane ticket on the way (9,800 yens), related information such as airline company (AIR-HOKKAIDO), departure and arrival time (depart from Narita at 6:30, arrive at Sapporo at 9:25), flight number (MX227), seat number (41F) and a stamp is displayed in, for example, a region corresponding to time (6:23) at which the user boarded the airplane at the airport.

Note that the stamp is displayed when the user utilizes an airplane of the airline company in a case where the travel account service makes an alliance with the airline company, and, for example, a logo of the airline company, design limited to the travel account service, or the like, can be employed as the stamp.

Subsequently, along with deposit and withdrawal information of the cost of the rental car (3,000 yens), related information such as name of a car rental company, an image of the rental car, information regarding bill sharing and discount service, and a stamp is displayed, for example, in a region corresponding to time (10:08) at which the user rented a car after arriving at a destination in the trip information display region 352 in a form of a receipt.

Here, as the information regarding bill sharing, for example, information indicating that while the cost of the rental car is actually 12,000 yens, the cost is shared among four persons who have gone traveling together, and thus the cost becomes 3,000 yens per person is displayed. Further, as the information regarding discount service, for example, information indicating that a discount rate of 8% is applied as a group rate because the rental car is utilized by four persons, is displayed.

Note that the image of the rental car may be, for example, an image which is publicly available from a site on the Internet as well as an image captured with the mobile terminal 10 of the user or the friends. Further, a moving image may be displayed in place of or along with the image. The moving image can include, for example, a moving image captured by the user, or the like, a moving image which is publicly available, and the like. Further, the stamp is displayed when the user uses a rental car of the car rental company which makes an alliance with the travel account service, and, for example, a logo of the car rental company is used.

Further, along with deposit and withdrawal information of the cost of the drink (140 yens), related information such as an image of the purchased drink (such as, for example, a captured image, an image which is publicly available and a moving image) is displayed, for example, in a region corresponding to time (10:23) at which the user has purchased the drink at vending machine before getting on the rental car in the trip information display region 352 in a form of a receipt.

Subsequently, along with deposit and withdrawal information of the admission fee (540 yens) of the zoo, related information such as name of the zoo (Zoo Hokkai), images of animals, information relating to discount service and a stamp is displayed, for example, in a region corresponding to time (11:21) at which the user has moved by the rental car and has arrived at the zoo in the trip information display region 352 in a form of a receipt.

Here, the images of animals include, for example, captured images, images which are publicly available, moving images (captured moving images or moving images which are publicly available), and the like. Further, the information relating to discount service includes, for example, information indicating that a discount rate of 10% is applied as a group rate because four persons visit the zoo. Still further, the stamp is displayed when the user utilizes the zoo which makes an alliance with the travel account service, and, for example, a logo of the zoo is used.

Further, along with deposit and withdrawal information of the cost of the lunch (800 yens), related information such as name of the ordered dish (Nabe set meal) and an image of the ordered dish (such as, for example, a captured image, an image which is publicly available and a moving image) is displayed in a region corresponding to time (12:10) of the lunch at a restaurant inside the zoo in the trip information display region 352 in a form of a receipt.

Still further, along with deposit and withdrawal information of the cost of the souvenirs (2,100 yens), related information such as information of purchased souvenirs (a handkerchief (900 yens), cookies (600 yens), a glass sculpture (600 yens)) and images of the purchased souvenirs (such as, for example, captured images, images which are publicly available and moving images) is displayed in a region corresponding to time (13:32) at which the user has purchased the souvenirs at a souvenir shop inside the zoo in the trip information display region 352 in a form of a receipt.

Subsequently, along with deposit and withdrawal information of the cost of the hotel (8,000 yens), related information such as name of the hotel (Sapporo station hotel) and an image of the hotel (such as, for example, a captured image, an image which is publicly available and a moving image) is displayed, for example, in a region corresponding to time (18:58) at which the user has moved to the hotel by the rental car and has checked in the hotel in the trip information display region 352 in a form of a receipt.

Subsequently, along with deposit and withdrawal information of the cost of the dinner (2,596 yens), related information such as name of a restaurant (Sapporo seafood restaurant), images of dishes and the restaurant (such as, for example, captured images, images which are publicly available and moving images), information relating to bill sharing and a bonus for a group, and a stamp is displayed in a region corresponding to time (21:47) of the dinner in a downtown area in front of the station in the trip information display region 352 in a form of a receipt.

Here, the information relating to bill sharing includes, for example, information indicating that a total amount of meals for four persons of 10,384 yens is divided by four persons, and thus becomes 2,596 yens per person. Further, the information relating to a bonus for a group includes, for example, information indicating that service of one drink is applied. Still further, the stamp is displayed when the user utilizes a restaurant which makes an alliance with the travel account service, and, for example, a logo of the restaurant is used.

Subsequently, along with deposit and withdrawal information of the cost of the drink (120 yens), related information such as an image of the purchased drink (such as, for example, a captured image, an image which is publicly available and a moving image) is displayed, for example, in a region corresponding to time (22:42) at which the user has purchased the drink at vending machine after returned to the hotel in the trip information display region 352 in a form of a receipt.

In this manner, the related information is displayed in chronological order in a form of a receipt along with the deposit and withdrawal information in the trip information display region 352 in the user's trip detail screen 351 (FIG. 11 and FIG. 12) as a total amount of money spent on the first day of the travel and breakdown thereof, so that the user can recall activity of the user on the first day by scrolling the whole of the screen of the mobile terminal 10 in a vertical direction, that is, through payment history of the user summarized in a form of a receipt.

Figure 13:
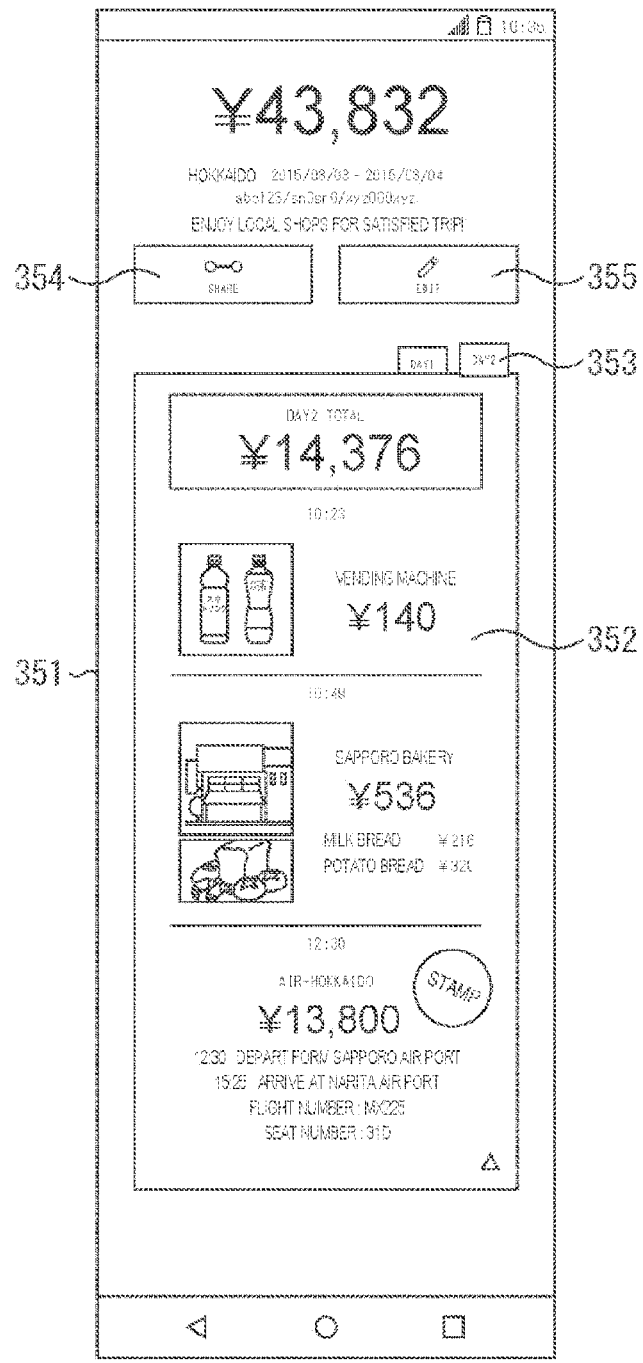
FIG. 13 is a view illustrating a third example of the user's trip detail screen.

Here, in a case where the information is switched from the information of the first day to the information of the second day by ("DAY 2" of) the time schedule tab 353 being tapped on the user's trip detail screen 351 (FIG. 11), the user's trip detail screen 351 illustrated in FIG. 13 is displayed, and deposit and withdrawal information including cost of a drink (140 yens), cost of foods (536 yens) and cost of an airplane ticket back home (13,800 yens) is displayed in chronological order along with related information in the trip information display region 352 as a total amount (14,376 yens) of money spent on the second day of the travel and breakdown thereof.

Specifically, along with deposit and withdrawal information of the cost of the drink (140 yens), related information such as an image of the purchased drink (such as, for example, a captured image, an image which is publicly available and a moving image) is displayed, for example, in a region corresponding to time (10:23) at which the user has purchased the drink at vending machine while going to a destination after checking out the hotel in the trip information display region 352 in a form of a receipt.

Subsequently, along with deposit and withdrawal information of the cost of foods (536 yens), related information such as name of a bread factory (Sapporo Bakery), information of purchased bread (milk bread 216 yens, potato bread 320 yens) and images of the purchased bread and the bread factory (such as, for example, captured images, images which are publicly available and moving images) is displayed in a region corresponding to time (10:49) at which the user arrived at the bread factory which is a destination in the trip information display region 352 in a form of a receipt.

Subsequently, along with deposit and withdrawal information of the cost of the airplane ticket back home (13,800 yens), related information such as an airline company (AIR-HOKKAIDO), departure and arrival time (depart from Sapporo at 12:30, arrive at Narita 15:25), flight number (MX225), seat number (31D) and a stamp (such as, for example, a logo of the airline company) is displayed in a region corresponding to time (12:30) at which the user has moved to the airport and has boarded the airplane in the trip information display region 352 in a form of a receipt.

In this manner, the related information is displayed in chronological order in a form of a receipt along with the deposit and withdrawal information in the trip information display region 352 in the user's trip detail screen 351 (FIG. 13) as a total amount of money spent on the second day of the travel and breakdown thereof, so that the user can recall activity of the user on the second day through payment history of the user summarized in a form of a receipt.

As described above, the user who has subscribed the travel account service can make settlement by utilizing the travel account service card 11 during the travel, and can recall the travel on the first day and on the second day through the deposit and withdrawal information and related information thereof of the user summarized in a form of a receipt by starting the travel account application at the mobile terminal 10 to display the user's trip detail screen 351 after the travel.

Further, a share button 354 for sharing the information with other users such as the friends and an edit button 355 for editing the information are displayed on the user's trip detail screen 351 (FIG. 11 and FIG. 13).

Here, in a case where the share button 354 is tapped on the user's trip detail screen 351 (FIG. 13, and the like), the user's information regarding the travel to Hokkaido (the deposit and withdrawal information and the related information) can be shared with other users (released to other users).

Figure 14:
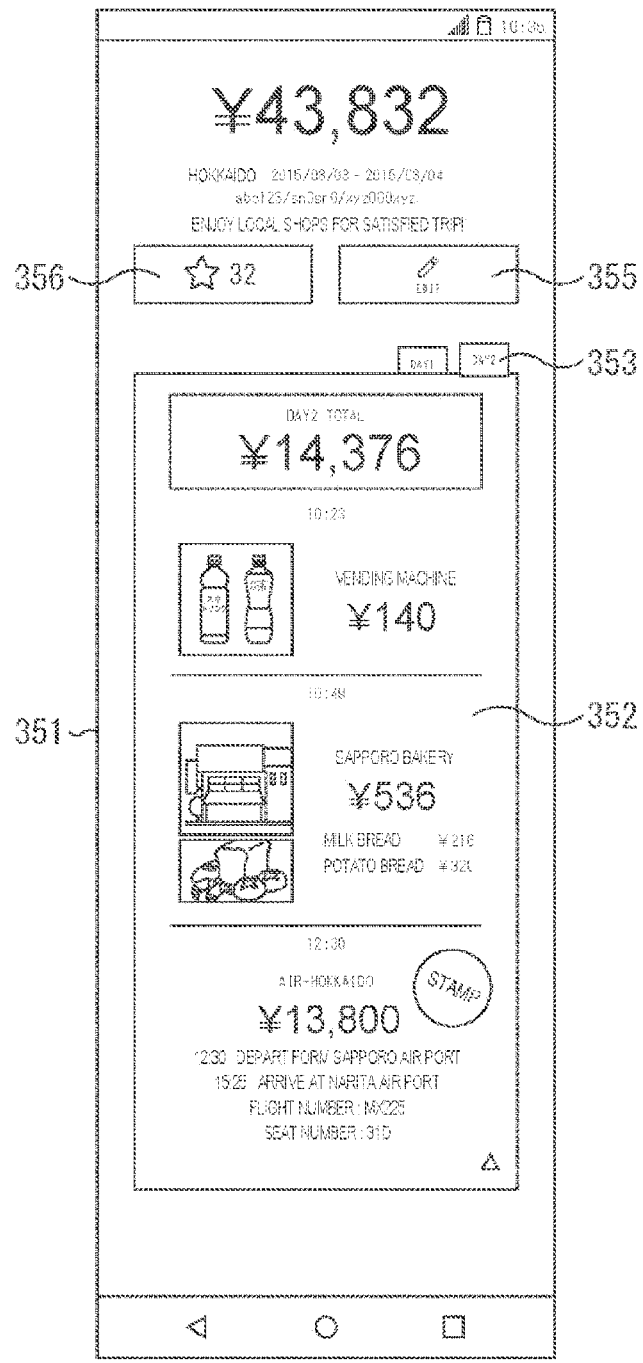
FIG. 14 is a view illustrating a fourth example of the user's trip detail screen.

For example, the user's trip detail screen 351 illustrated in FIG. 14 indicates a screen after the share button 354 is tapped and the information is shared with (released to) other users, and a bookmark 356 is displayed in place of the share button 354 (FIG. 13, and the like). The bookmark 356 indicates how many other users register the information as a bookmark, and, in this example, 32 other users have registered the user's travel bag of the travel to Hokkaido.

Figure 15:
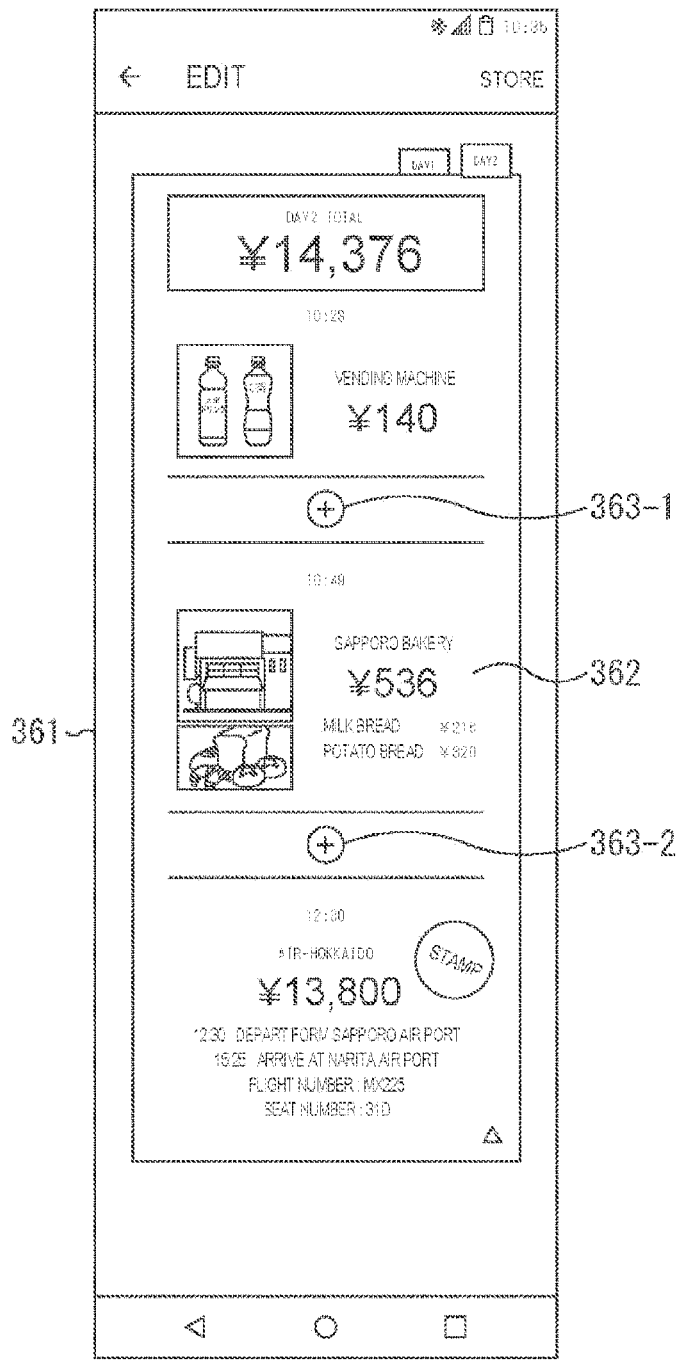
FIG. 15 is a view illustrating a first example of a user's trip editing screen.

Further, in a case where the edit button 355 is tapped on the user's trip detail screen 351 (FIG. 11, FIG. 13, FIG. 14), a user's trip editing screen 361 illustrated in FIG. 15 is displayed, and the user can edit the user's information (the deposit and withdrawal information and the related information) of the travel to Hokkaido.

For example, an add button 363-1 and an add button 363-2 for adding deposit and withdrawal information and related information are displayed between regions in which the registered information is displayed in the trip information display region 362 on the user's trip editing screen 361.

Figure 16:
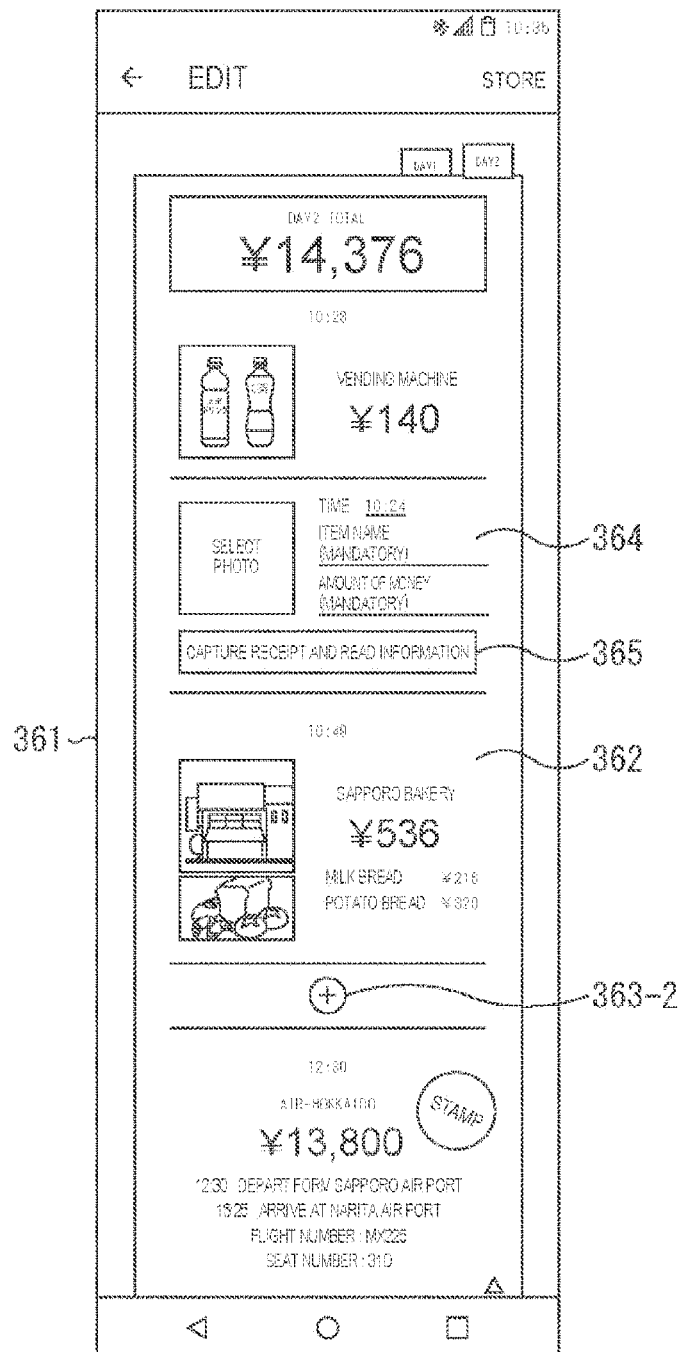
FIG. 16 is a view illustrating a second example of a user's trip editing screen.

Here, for example, in a case where the user taps the add button 363-1 displayed in a region corresponding to time to which information should be added, the user's trip editing screen 361 illustrated in FIG. 16 is displayed, and an information adding region 364 is displayed in a region corresponding to the add button 363-1 in the trip information display region 362. In this information adding region 364, for example, information such as time, item name, an amount of money and an image is input or selected by the user and registered as the user's information (the deposit and withdrawal information and the related information) of the travel to Hokkaido.

Note that in a case where a receipt when the user has purchased an item is kept, by a read button 365 being tapped, it is possible to recognize information described on the receipt by capturing an image of the receipt by utilizing a camera function of the mobile terminal 10 and register information in accordance with the recognition result as the user's information (the deposit and withdrawal information and the related information) of the travel to Hokkaido. Further, for example, it is also possible to provide a mechanism of providing more service points to a user who posts items (for example, local goods) sold at that area on the user's trip list, by cooperating with retail stores at the area in the travel account service. Such service is advantageous for the retail stores at the area because the items are advertised.

By utilizing the user's trip list function in the travel account application in this manner, the user can, for example, recall the trip of the user or the friends with whom the user has gone traveling, and share the information of the trip with other users. Further, by utilizing the editing function in the travel account application, the user can edit the user's information of the trip.

Note that while the travel bag immediately after completed is displayed in the present and future trip display region 322 in FIG. 8, the travel bag is moved to the past trip display region 323 after predetermined operation is performed or a predetermined period has elapsed.

(C) Others' Trip List Function

Others' trip list function of the travel account application will be described next with reference to FIG. 17 and FIG. 18.

Figure 17:
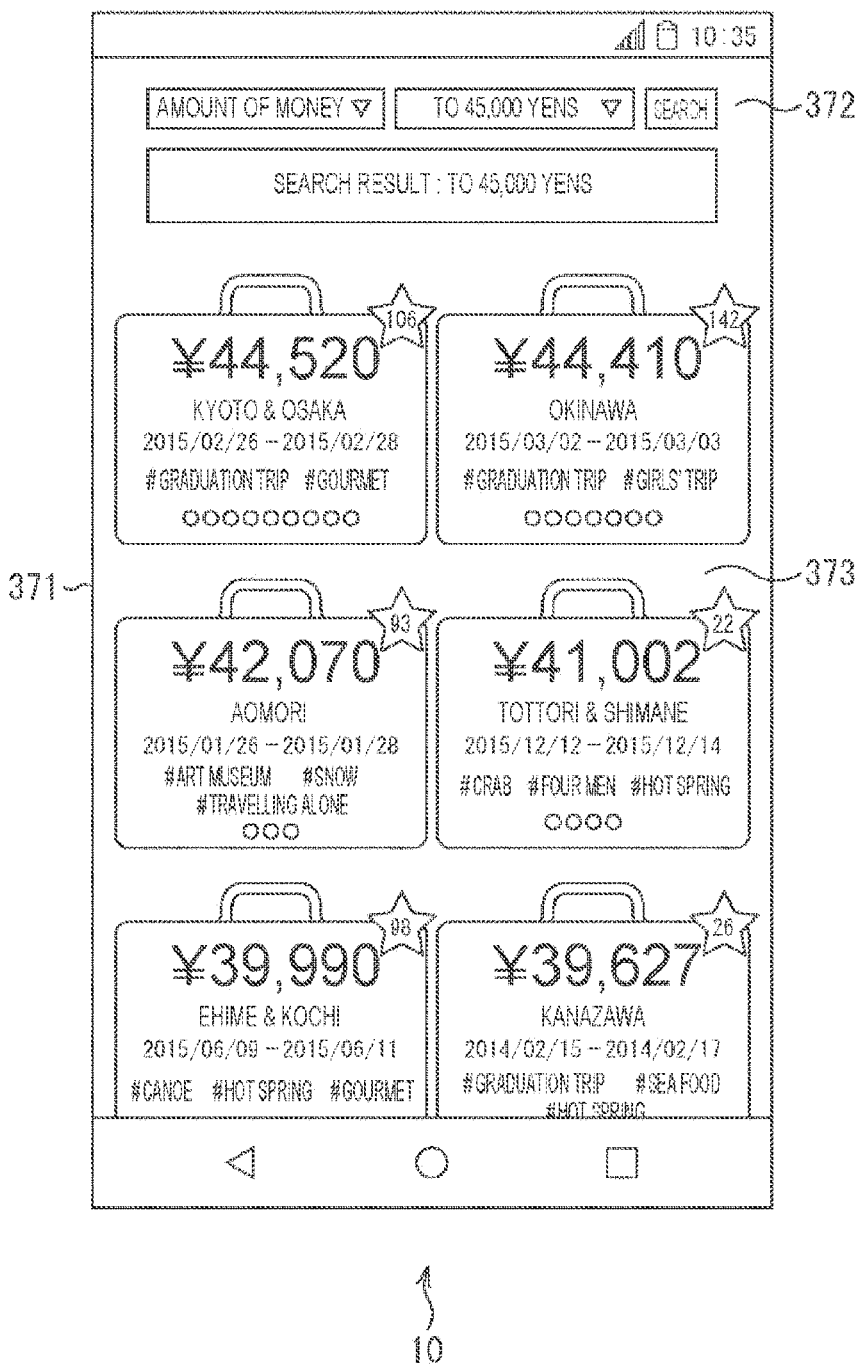
FIG. 17 is a view illustrating an example of a trip list search screen.

FIG. 17 illustrates an example of a trip list search screen 371 to be displayed at (the display unit 112 of) the touch panel 102 of the mobile terminal 10.

This trip list search screen 371 is displayed, for example, in a case where a trip search button 305 is tapped on the account management screen 301 in FIG. 5. In FIG. 17, the trip list search screen 371 includes two regions of a search condition input region 372 and a search result display region 373.

The search condition input region 372 is a region for inputting a search condition for searching others' trip lists. For example, in a case where an amount of money equal to or less than 45,000 yens which is a target amount of money for travel funds of the user is input or selected as the search condition and a search button is tapped, a search result in accordance with the search condition is displayed in the search result display region 373.

In FIG. 17, a plurality of icons of travel bags corresponding to others' trip lists is displayed in the search result display region 373 as the search result in accordance with the search condition of equal to or less than 45,000 yens. On these others' travel bags, information such as hashtags to be utilized for collecting information of trips as well as cost and time schedule of the travels and the destinations, is displayed. Further, bookmarks are superimposed on the travel bags, and a larger number on a star-shaped mark indicates that the travel is more popular.

For example, an upper right travel bag in the search result display region 373 indicates a travel to Okinawa from Mar. 2, 2015 to Mar. 3, 2015, which has costed 44,410 yens, and "graduation trip" and "girls' trip" are added as hashtags. Further, this travel bag is registered as bookmarks by 142 users.

Figure 18:
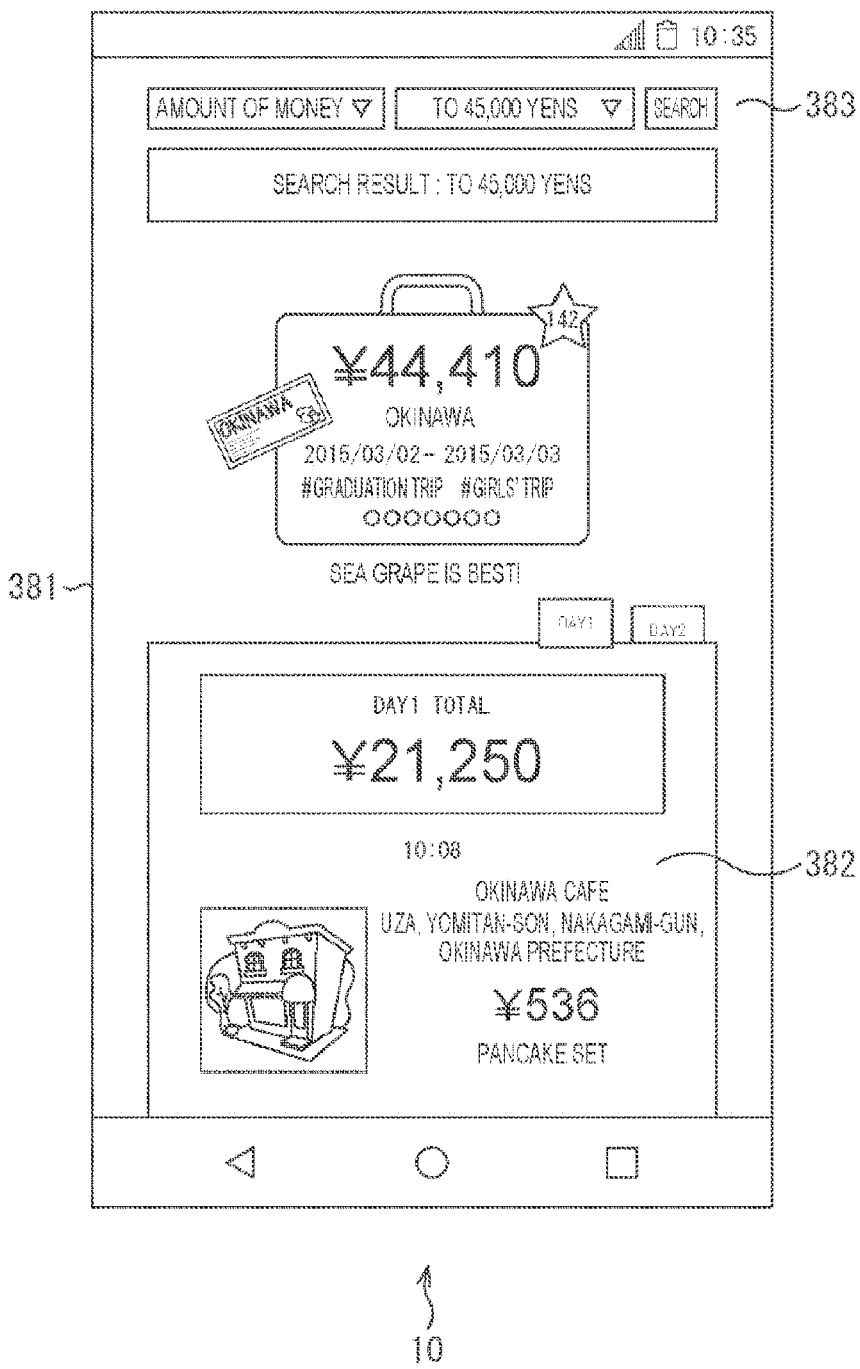
FIG. 18 is a view illustrating an example of an other's trip detail screen.
Figure 19B:
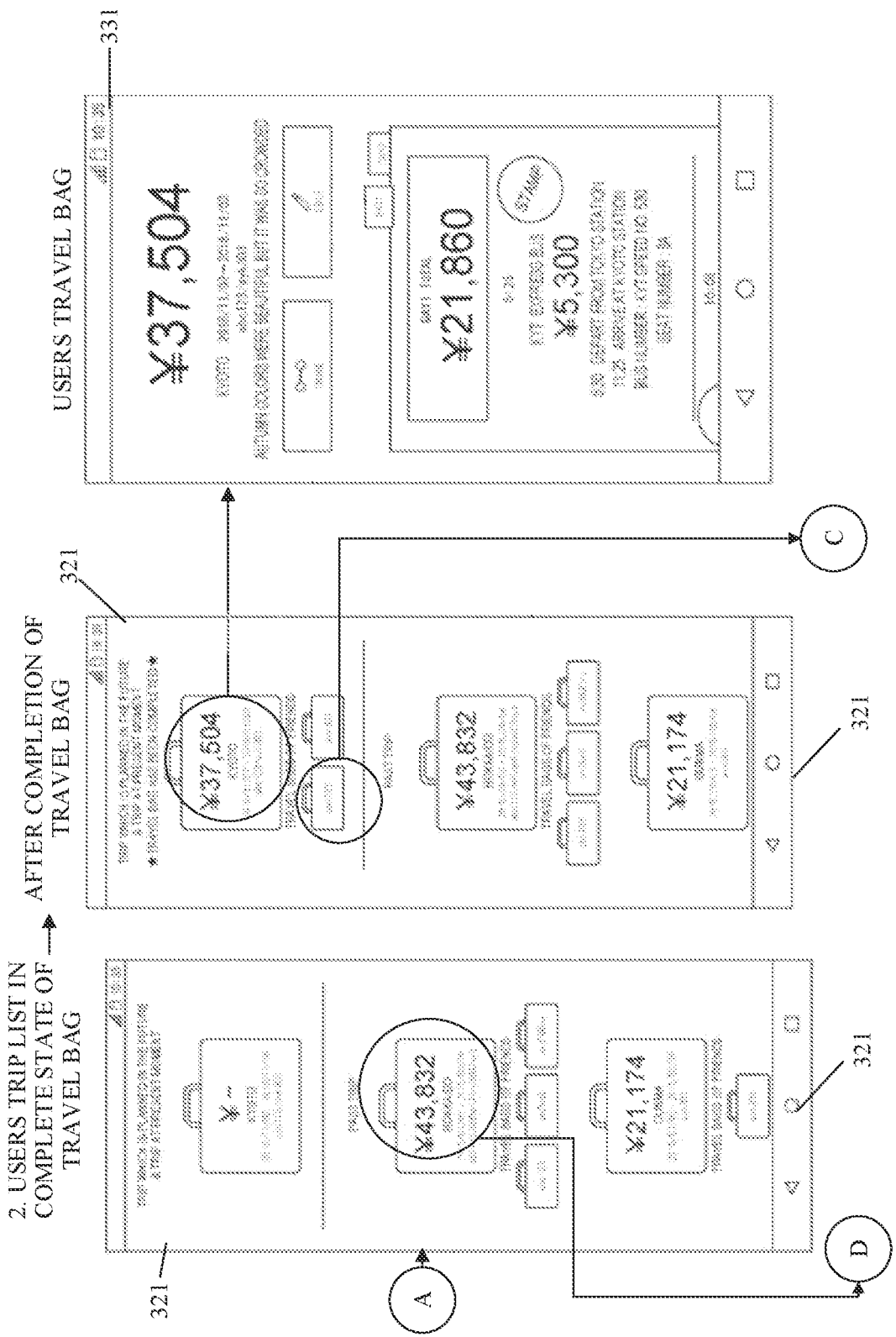
Figure 19C:
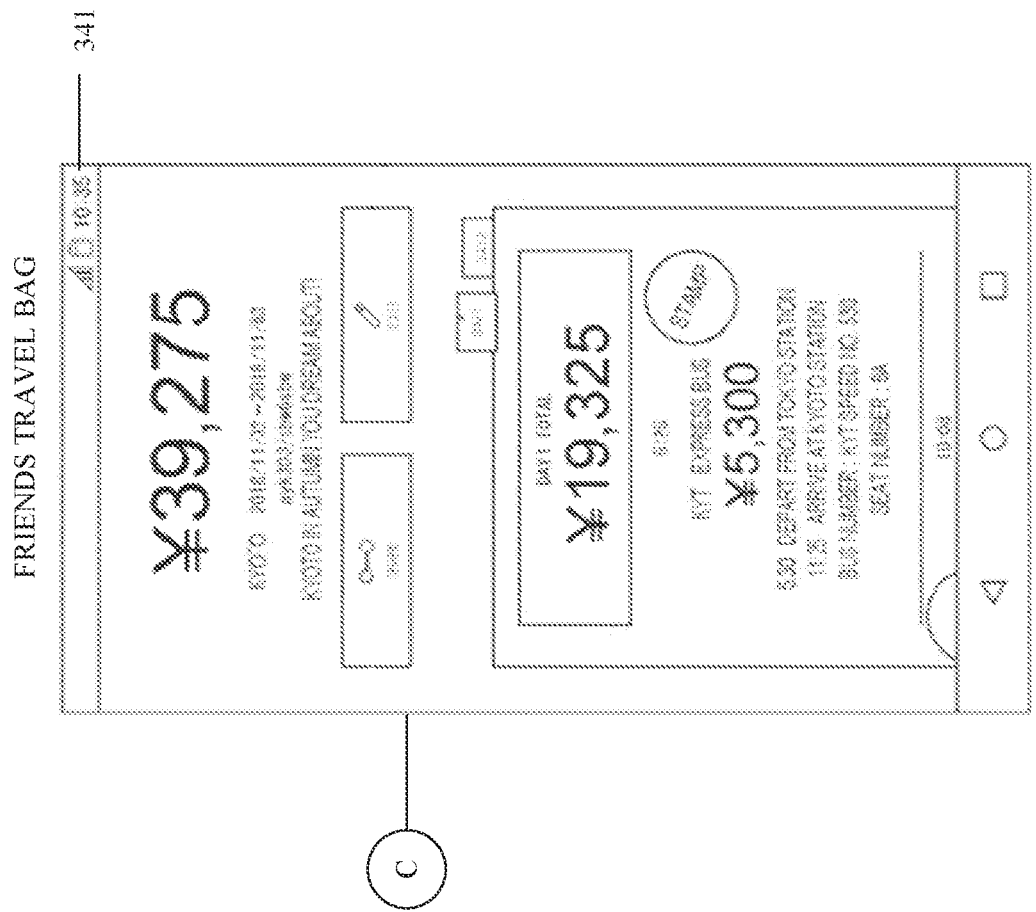
Figure 19D:
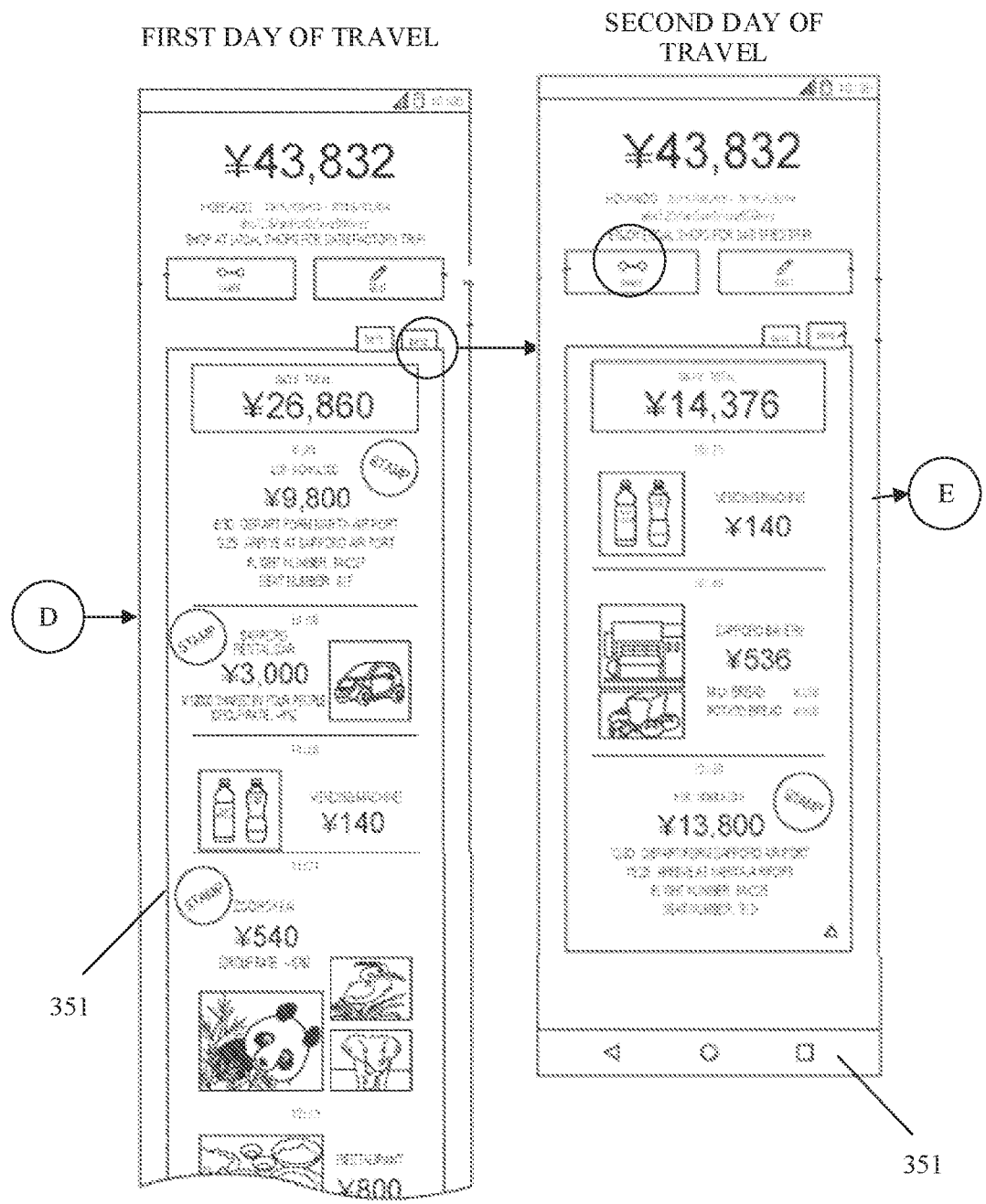
Figure 19E:
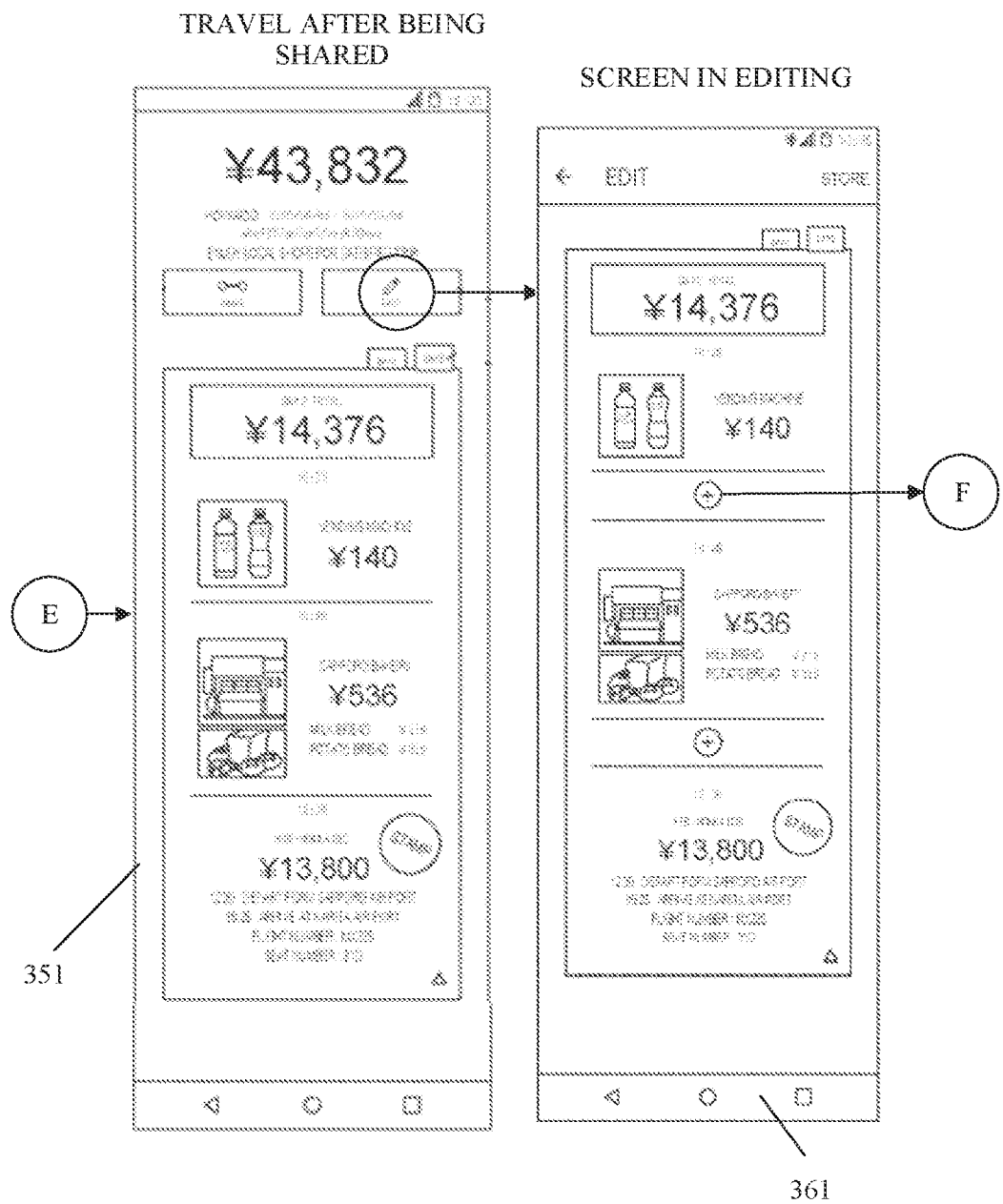
Figure 19F:
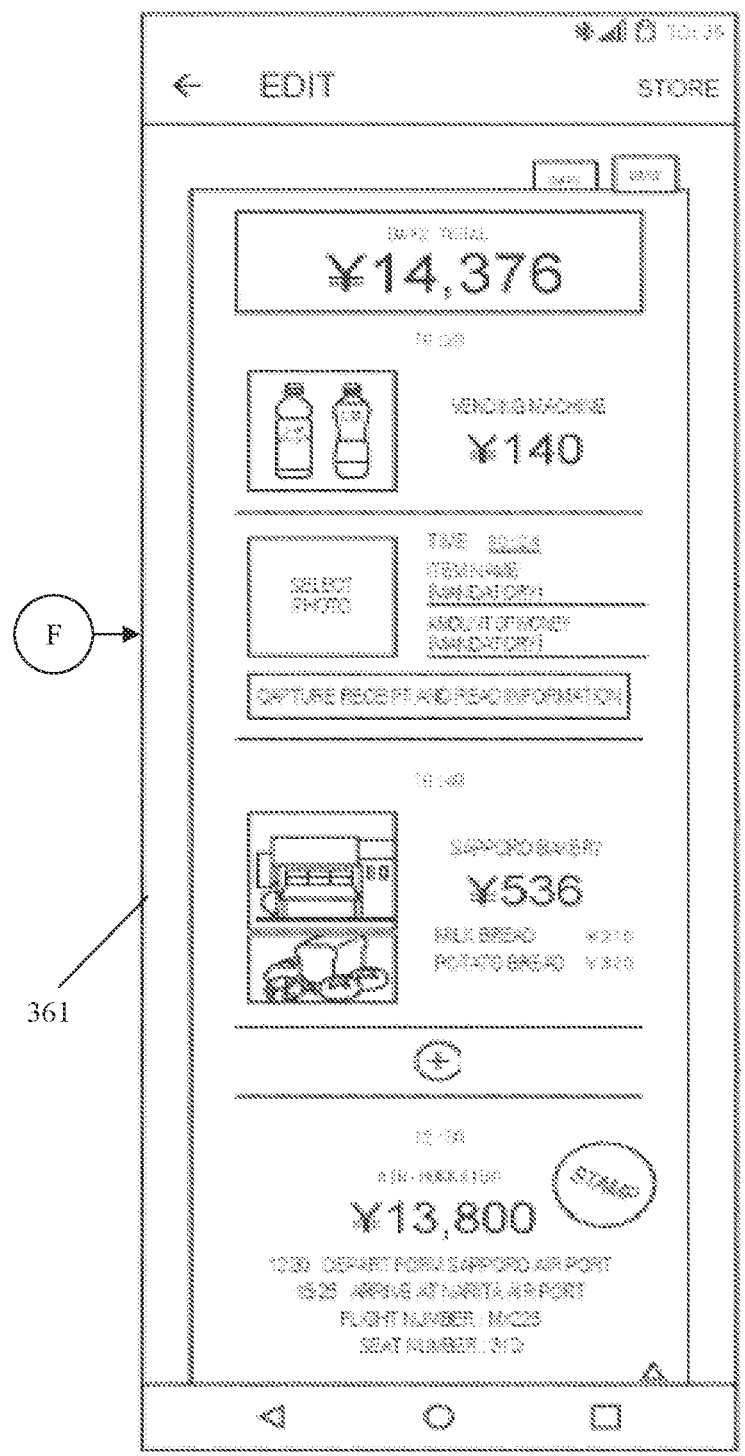
Figure 19G:
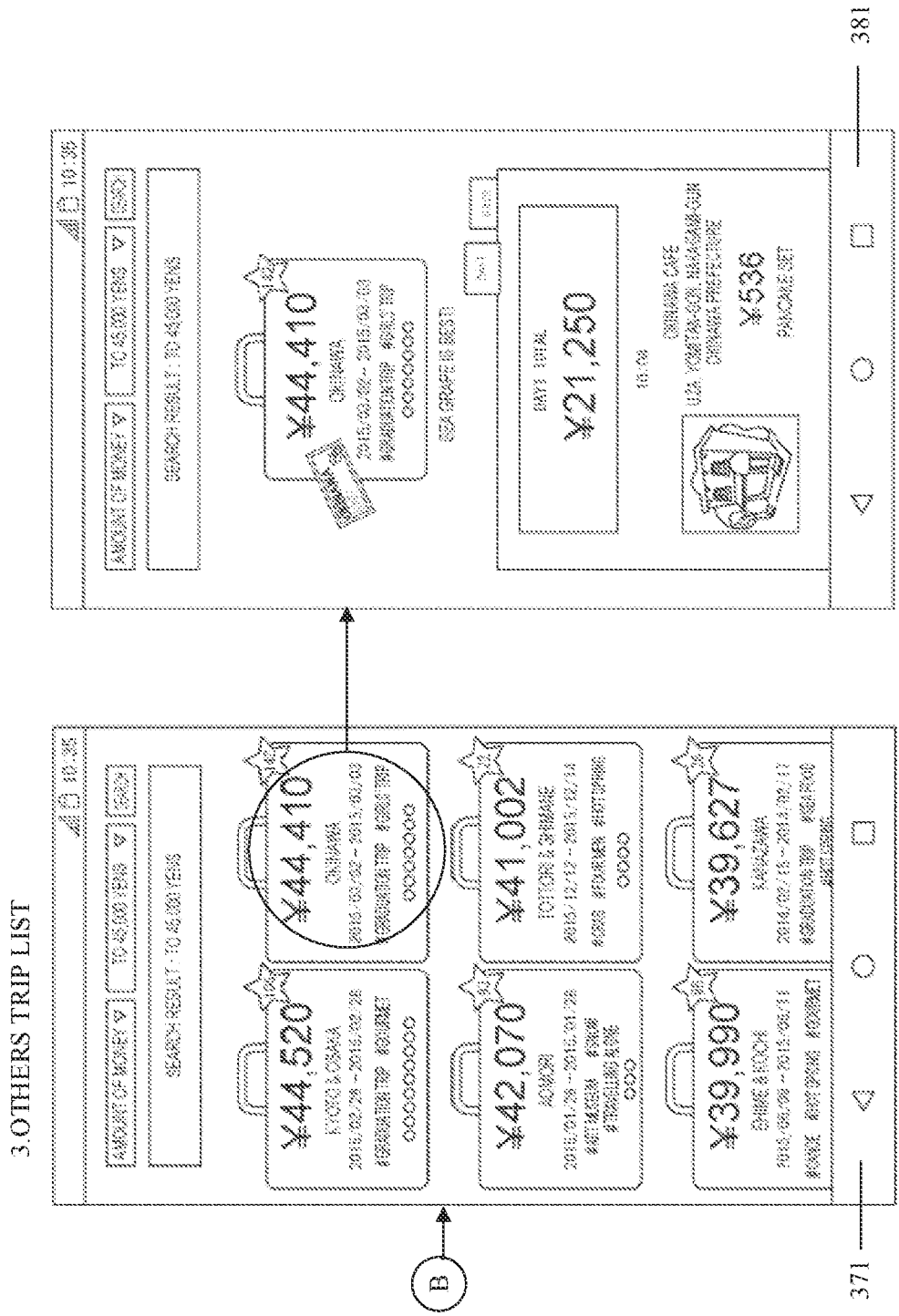

In this event, in a case where one travel bag (for example, the upper right travel bag) is selected and tapped from a plurality of travel bags displayed in the search result display region 373, an other's trip detail screen 381 illustrated in FIG. 18 is displayed, and detailed information regarding the other's trip can be referred to. More specifically, deposit and withdrawal information (such as, for example, information of settlement) regarding deposits and withdrawals of the other during the travel to Okinawa and related information (such as, for example, text, images and moving images) relating to the deposit and withdrawal information are displayed in a form of a receipt on the other's trip detail screen 381.

For example, along with deposit and withdrawal information of cost of foods and drink (536 yens), related information such as name (Okinawa Cafe) and a location (Uza, Yomitan-son, Nakagami-gun, Okinawa prefecture) of a store, ordered menu (pancake set) and an image of the store (such as, for example, a captured image and an image which is publicly available) is displayed in the trip information display region 382 on the other's trip detail screen 381 as a total amount (21,250 yens) of money spent on the first day of the travel and breakdown thereof.

Further, while not illustrated, the deposit and withdrawal information and the related information thereof are displayed in a form of a receipt in the trip information display region 382 as breakdown of the money spent on the first day of the travel by the whole of the screen being scrolled in a vertical direction in response to flick operation in a vertical direction in a similar manner to the case described above. Further, it is possible to switch information between information of the first day and information of the second day with tabs. It can be said, so to speak, that a detailed receipt regarding money paid by the other during the other's travel to Okinawa is presented through such display in a form of a receipt.

Note that in a case where the travel of the other's travel is not the one the user desires to refer to after confirming the content of the travel, the user can search desired others' trip lists again by inputting a desired search condition again in the search condition input region 383 and tapping the search button.

In this manner, by utilizing the others' trip list function in the travel account application, the user can, for example, review the others' trips and use the information of the others' trips as a reference for the user's travel.

Here, the related information which is displayed along with the deposit and withdrawal information by the user's trip list function and the others' trip list function described above can be summarized as follows. In other words, the related information includes at least one of settlement related information relating to settlement, event related information relating to an event, date and time related information relating to date and time, location related information relating to a location or transportation related information relating to transportation, and is displayed with text, an image, a moving image or combination thereof.

More specifically, the settlement related information includes information of purchased item name (such as, for example, glass sculpture, a mug and an aloha shirt), foods and drink (such as, for example, Japanese omelet, Atka mackerel grilled with salt and a curry lunch set), and service name and course name (such as, for example, diving half-day course and electric potter's wheel course). Further, the event related information includes, for example, information regarding a travel to Hokkaido (first day, second day), and the like.

Further, the date and time related information includes information such as time of settlement (such as, for example, 6:23 and 10:08). The location related information includes information such as name of a facility or a store (such as, for example, Zoo Hokkai, Sapporo station hotel and Sapporo seafood restaurant). Still further, the transportation related information includes information such as, for example, train name (such as, for example, No. XYZ10), flight number (such as, for example, MX225) and seat number (such as, for example, 31D and Car No. 5, 11A).

(Screen Transition of Travel Account Application)

While the examples of the screens displayed at (the display unit 112 of) the touch panel 102 at the mobile terminal 10 which executes the travel account application have been described above with reference to FIG. 5 to FIG. 18, transition of these screens can be summarized, for example, as indicated in FIGS. 19A-19G.

In other words, in a case where the application button 304 is tapped on the account management screen 301 (FIG. 5), the application screen 311 (FIG. 6) is displayed. In a case where the registration button 312 is tapped on this application screen 311 (FIG. 6), the trip list screen 321 (FIG. 7) is displayed.

While the user's travel bag indicated in the present and future trip display region 322 is in an incomplete state on the trip list screen 321 (FIG. 7), in a case where recording of the travel is finished and the user's travel bag is completed, the user's travel bag displayed on the trip list screen 321 is updated from the incomplete state illustrated in FIG. 7 to a complete state illustrated in FIG. 8.

In a case where the user's travel bag indicated in the present and future trip display region 322 is tapped on the trip list screen 321 (FIG. 8), the user's trip detail screen 331 (FIG. 9) is displayed. Meanwhile, in a case where the travel bag of the friend displayed in the present and future trip display region 322 is tapped on the trip list screen 321 (FIG. 8), the friend's trip detail screen 341 (FIG. 10) is displayed.

Further, in a case where the icon of the user's travel bag displayed in the past trip display region 323 is tapped on the trip list screen 321 (FIG. 7), the user's trip detail screen 351 of the first day (FIG. 11, FIG. 12) is displayed. In a case where the information is switched from the information of the first day to the information of the second day by ("DAY 2" of) the time schedule tab 353 being tapped on the user's trip detail screen 351 of the first day (FIG. 11), the user's trip detail screen 351 of the second day (FIG. 13) is displayed.

Here, in a case where the share button 354 is tapped on the user's trip detail screen 351 (FIG. 11, FIG. 13), the user's trip detail screen 351 is updated from a state before the information is shared illustrated in FIG. 11 and FIG. 13 to a state after the information is shared illustrated in FIG. 14.

Further, in a case where the edit button 355 is tapped on the user's trip detail screen 351 (FIG. 11, FIG. 13, FIG. 14), the user's trip editing screen 361 (FIG. 15) is displayed. In a case where the add button 363 is tapped on this user's trip editing screen 361 (FIG. 15), the user's trip editing screen 361 is updated from a state before the information adding region 364 is added illustrated in FIG. 15 to a state after the information adding region 364 is added illustrated in FIG. 16.

Note that in a case where the trip search button 305 is tapped on the account management screen 301 (FIG. 5), the trip list search screen 371 (FIG. 17) is displayed. In a case where the other's travel bag displayed in the search result display region 373 is tapped on this trip list search screen 371 (FIG. 17), the other's trip detail screen 381 (FIG. 18) is displayed.

(Operation of Travel Account Application)

Figure 20:
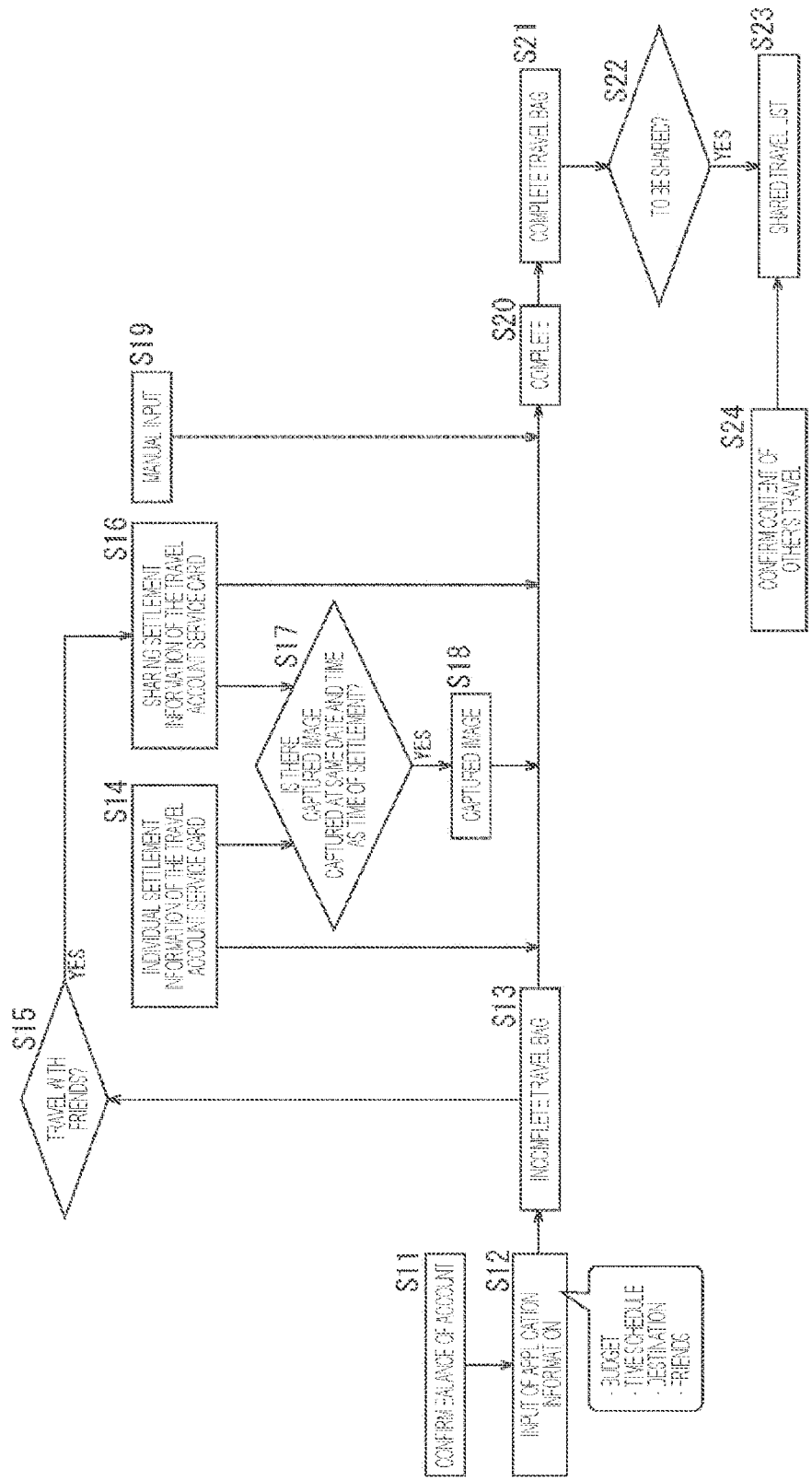
FIG. 20 is a flowchart for explaining flow of operation of the travel account application.

Here, flow from when an incomplete travel bag is generated until when the travel bag is completed will be described as operation of the travel account application with reference to the flowchart in FIG. 20.

The travel account application confirms balance of the account and displays information of the balance of the account by acquiring savings information from the savings and settlement server 30 (S11) in a case where the account management screen 301 (FIG. 5) is displayed. Further, the travel account application accepts user input of application information including a budget, time schedule, a destination, friends, and the like, (S12) on the application screen 311 (FIG. 6) which is displayed, and generates an incomplete travel bag (S13).

Then, the travel account application executes various kinds of processing (S14 to S19) on the incomplete travel bag and completes the travel bag at a timing at which recording of the trip is finished (S20), and thereby, the travel bag is completed (S21).

In other words, the travel account application acquires individual settlement information of the travel account service card 11 of the user from the savings and settlement server 30 (S14). Further, the travel account application acquires settlement information regarding bill sharing as the settlement information of the travel account service card 11 (S16) in a case where the user goes traveling with friends (S15: Yes). By this means, the settlement information is included in the incomplete travel bag.

Further, in a case where the captured images recorded in the memory 101 (or the behavior history server 20) include a captured image captured at substantially the same date and time (or within a certain period including time of the settlement) as the time of the settlement on the basis of (time information of) the acquired settlement information (S17: Yes), the travel account application acquires the captured image (S18). By this means, the captured image associated with the settlement information is included in the incomplete travel bag.

Still further, the travel account application accepts additional information manually input by the user (S19) when the user's trip editing screen 361 (FIG. 15, FIG. 16) is displayed. By this means, the additional information is included in the incomplete travel bag.

Various kinds of information (the deposit and withdrawal information and the related information thereof) are included in the incomplete travel bag in this manner, and thereby, the travel bag is completed. Here, a timing when, for example, the user operates a finish button which is provided at a predetermined position on a predetermined screen when the user thinks that the user finishes recording of the trip including post edit (S19) can be set as a timing of completion (S20) in the travel account application. This operation triggers completion of the travel bag. Then, the completed travel bag is displayed in the past trip display region 323 on the trip list screen 321 (FIG. 7).

In other words, for example, during periods while the settlement information of the travel account service card 11 can be received, and while the user can edit information of the trip, the travel bag is in an incomplete state, and the state transitions to a complete state by the finish button is operated after these periods. Note that the timing of completion is not limited to the timing when the user operates the finish button, and an arbitrary timing can be set as the timing of completion, for example, when date and time set in advance has elapsed.

Note that a case has been described here as an example where the settlement information, the captured image and the additional information are included in the incomplete travel bag by various kinds of processing (S14 to S19) being executed, other related information relating to the settlement information (deposit and withdrawal information) may be included in the incomplete travel bag.

While content of the completed travel bag can be confirmed on the user's trip detail screen 351 (FIG. 11, FIG. 13) thereafter, in a case where the share button 354 is operated (S22: Yes), the user's travel bag is included in the trip lists to be searched on the trip list search screen 371 (FIG. 17) and shared with (released to) other users (S23). Meanwhile, the user can display the other's trip detail screen 381 (FIG. 18) among the trip lists which are released and which are to be searched on the trip list search screen 371 (FIG. 17) and can confirm content of the other's travel bag (S24).

(Other Examples of Screen)

A display form of screens of the travel account application has been described above as an example. The mobile terminal 10 can provide various functions by employing other display forms as the screen of the travel account application.

Figure 21:
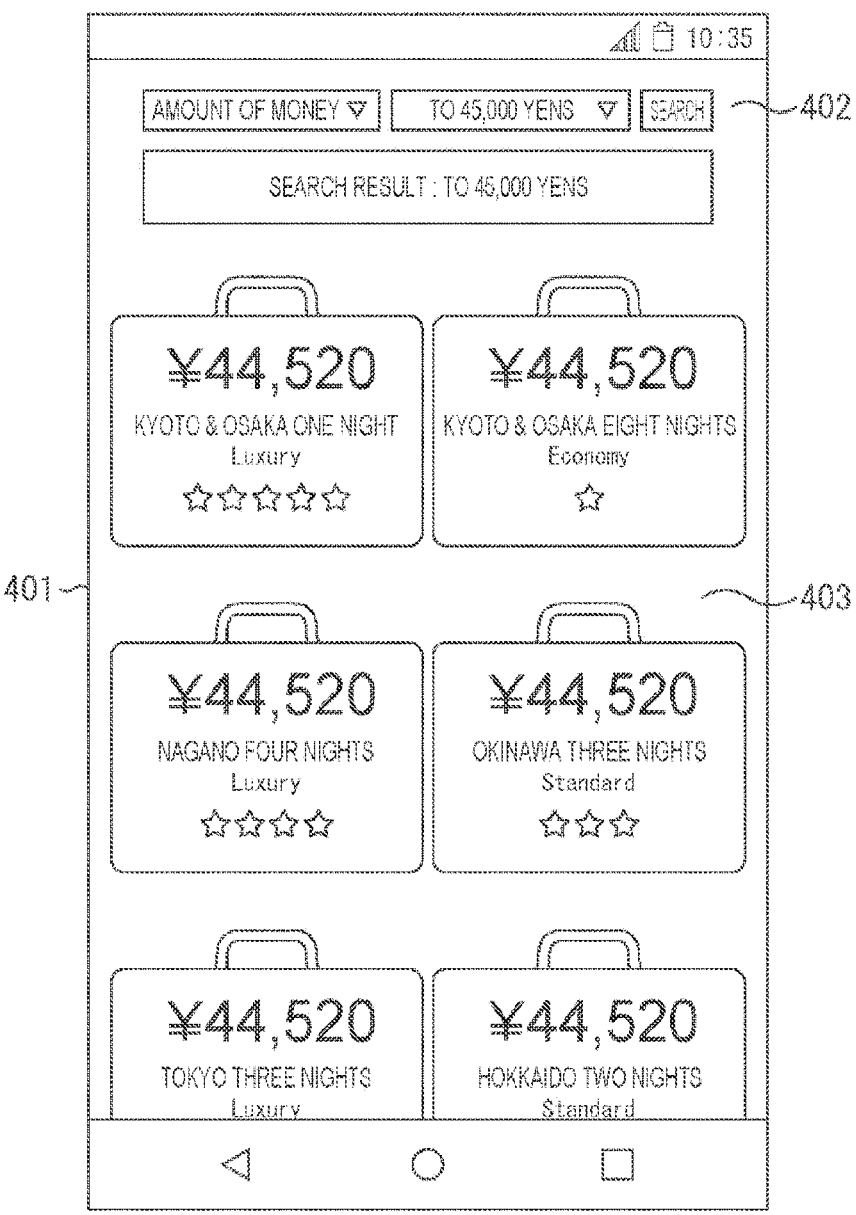
FIG. 21 is a view illustrating a first example of the trip list search screen.
Figure 22:
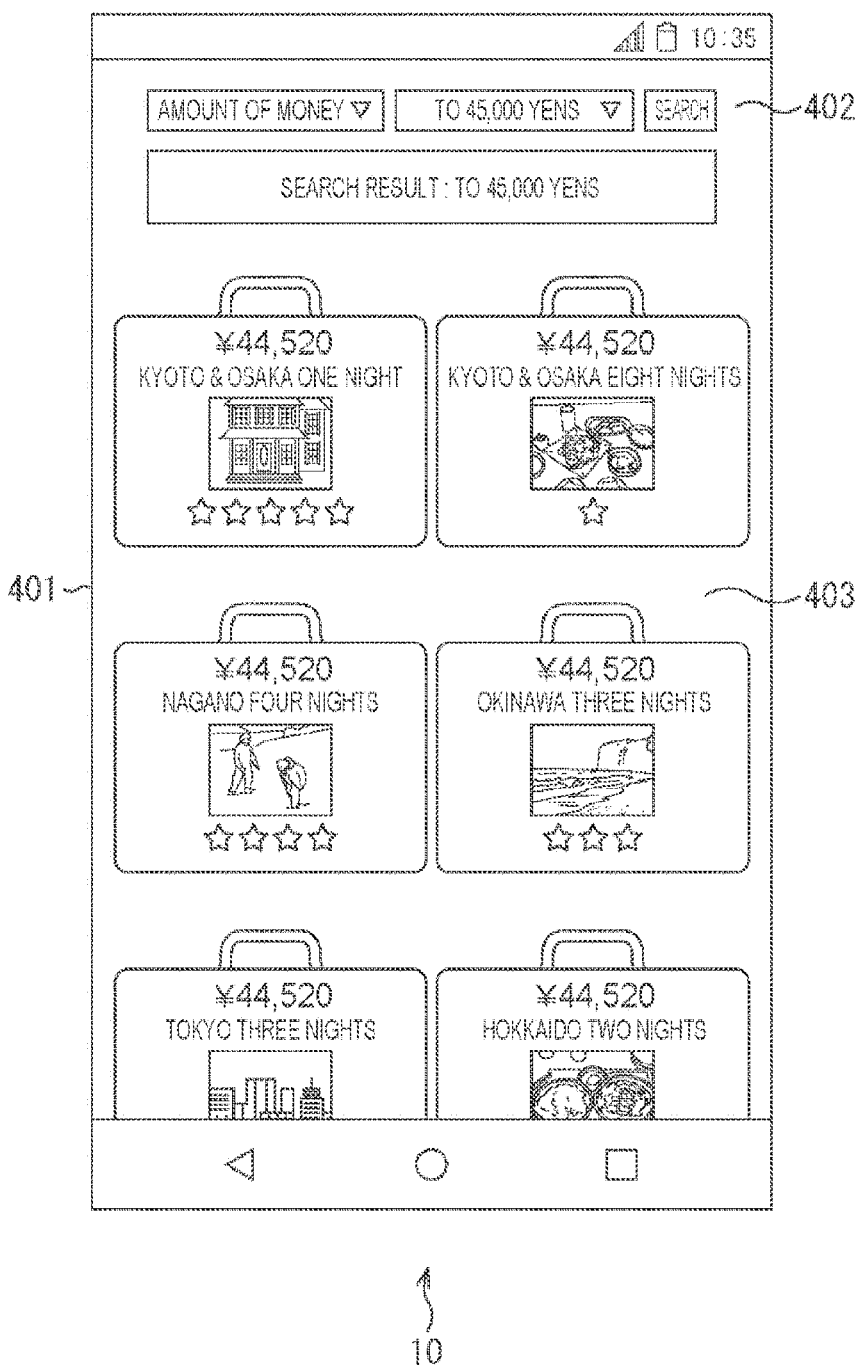
FIG. 22 is a view illustrating a second example of the trip list search screen.

FIG. 21 illustrates an example of a trip list search screen 401 to be displayed at (the display unit 112 of) the touch panel 102 of the mobile terminal 10.

This trip list search screen 401 is displayed, for example, in a case where a trip search button 305 is tapped on the account management screen 301 in FIG. 5. In FIG. 21, the trip list search screen 401 includes two regions of a search condition input region 402 and a search result display region 403 in a similar manner to the trip list search screen 371 (FIG. 17) described-above.

In FIG. 21, an amount of money equal to or less than 45,000 yens is input in the search condition input region 402 as the search condition, and thus, icons of travel bags corresponding to others' trip lists which satisfy the search condition of equal to or less than 45,000 yens are displayed in the search result display region 403. Grade information as well as cost of travels, destinations and the number of days is displayed on these others' travel bags.

This grade information is, for example, information in accordance with a statistical value (such as, for example, an average value and a median value) of grades of visited stores and purchased items, and a mark (such as, for example, a star mark) in accordance with this statistical value is displayed on the icon of the travel bag. For example, a larger number of star marks indicates a higher grade using a five-level star mark, which makes it possible to indicate whether the hotel is a five-star hotel or a hostel, or whether the restaurant is an upscale restaurant or a local restaurant.

For example, while an upper left travel bag and an upper right travel bag in the search result display region 403 are both travels to Kyoto and Osaka which has costed 44,520 yens, the upper left travel bag is a travel of overnight stay, and the upper right travel bag is a travel of stay for eight nights. In other words, while the upper left travel bag is a luxury high-grade travel displayed with five-star mark, the upper right travel bag is an economy low-grade travel displayed with one-star mark.

Further, while a case has been described in FIG. 21 where the cost of the travels, the destinations and the grade information are displayed on the icons of the travel bags, for example, other information such as images may be displayed. For example, an image (such as, for example, a captured image and an image which is publicly available) of a scene in which the user spent most money is displayed in the search result display region 403 on the trip list search screen 401 in FIG. 22 as an image regarding the travel. Note that it is possible to display images in various scenes as the image displayed here, such as, for example, an image of a scene in which the user spent least money in a case of a low-grade travel.

Further, here, it is also possible to calculate a coefficient such as a luxury coefficient using a predetermined calculation expression and display the coefficient on the icon of the travel bag. For example, it is possible to define a ratio of cost except transportation cost among a total amount of cost of the travel as the luxury coefficient and judge a level of the travel as higher as a value of the luxury coefficient is higher.

Such inclusion of the grades of the travels in search results for a desired search condition increases information for making a decision when the user uses information of the others' travels as a reference and makes it possible to propose a more appropriate travel.

Figure 23:
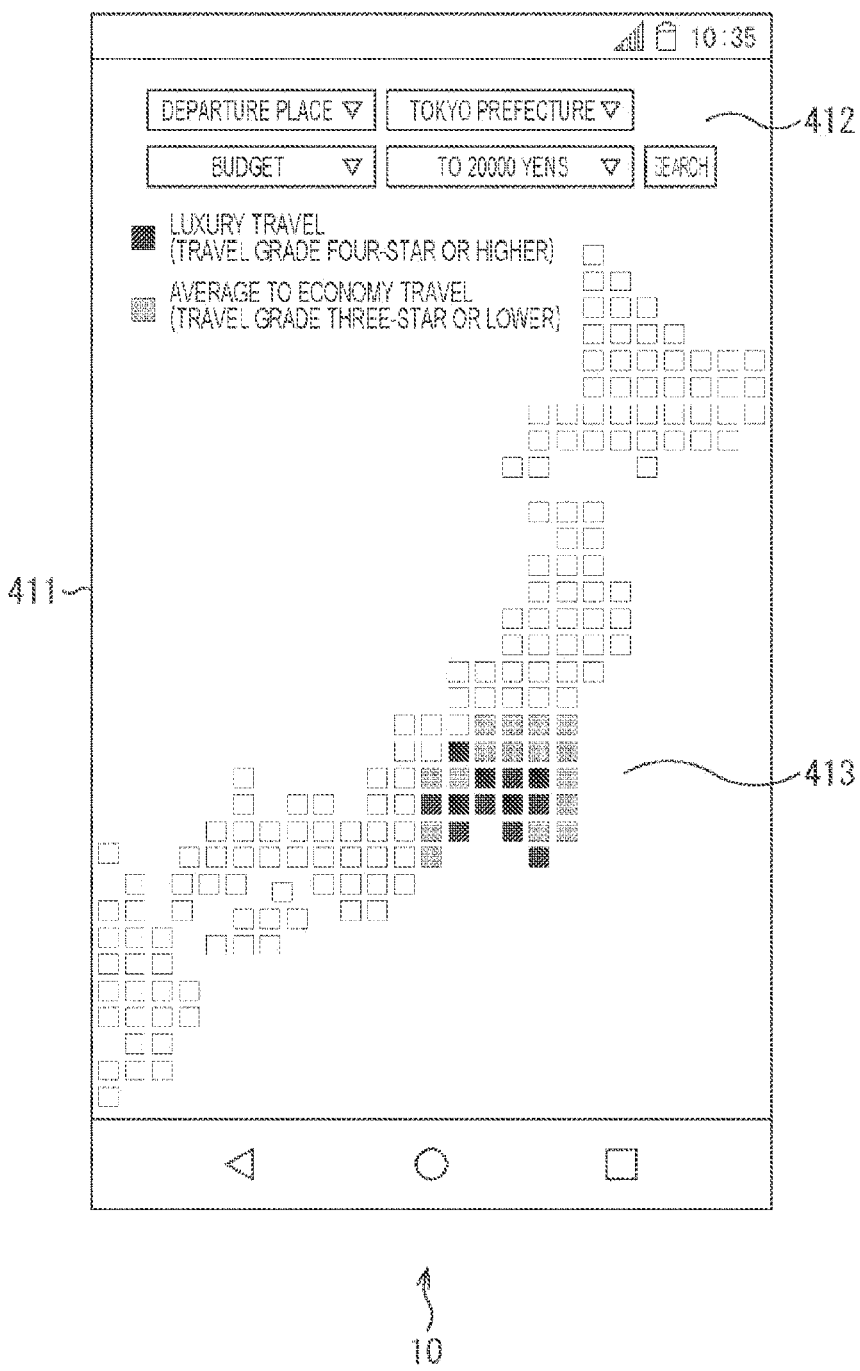
FIG. 23 is a view illustrating a first example of a trip area search screen.
Figure 24:
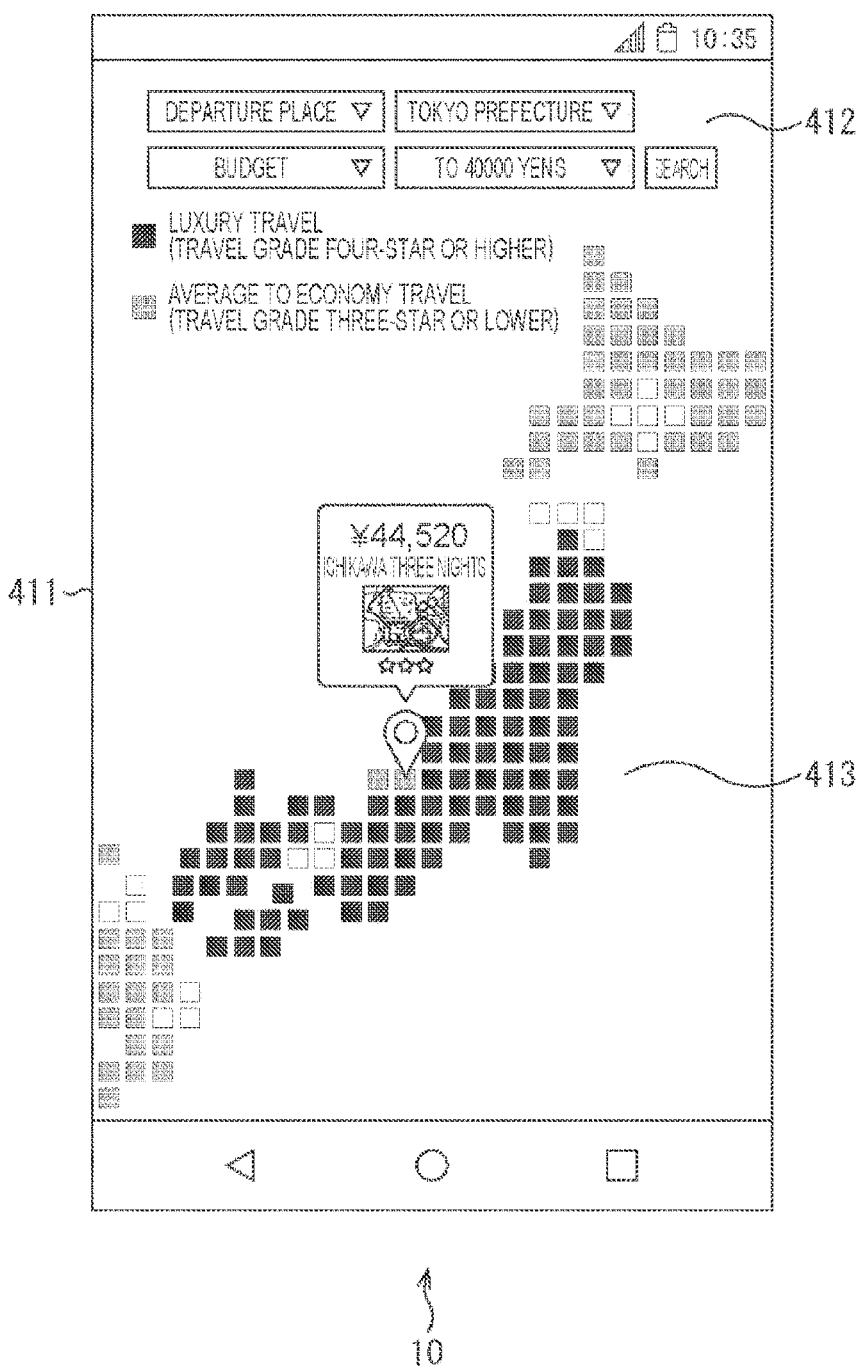
FIG. 24 is a view illustrating a second example of a trip area search screen.

FIG. 23 illustrates an example of a trip area search screen 411 to be displayed at (the display unit 112 of) the touch panel 102 of the mobile terminal 10.

This trip area search screen 411 is displayed, for example, in a case where a trip search button 305 is tapped on the account management screen 301 in FIG. 5. In FIG. 23, the trip area search screen 411 includes two regions of a search condition input region 412 and a search result display region 413.

The search condition input region 412 is a region for inputting a search condition for searching for a destination of a travel within a budget, and, for example, in a case where search conditions that a departure place is Tokyo and an amount of money is equal to or less than 20,000 yens are input or selected, and the search button is tapped, search results in accordance with the search conditions are displayed on a map in the search result display region 413. Here, for example, by the map of Japan being divided for each predetermined area, the search results can be displayed while a grade (such as, for example, a luxury travel, an average travel and an economy travel) is indicated for each divided area.

For example, in a case where the map of Japan is displayed in accordance with the search results, an area of a four-star or higher mark whose grade is a luxury travel is filled with first color such as red, and an area of three-star or lower mark whose grade is an average travel or an economy travel is filled with second color such as blue. More specifically, if the departure place is Tokyo, it can be predicted that there are many red areas around Tokyo, and blue areas radially increase.

Further, while a case has been described in FIG. 23 where the search results are displayed while grades are indicated for respective divided areas of the map of Japan, for example, other information such as detailed information regarding a specific divided area may be displayed. For example, when search is performed on the trip area search screen 411 in FIG. 24 using search conditions that the departure place is Tokyo and the budget is equal to or less than 40,000 yens input in the search condition input region 412, search results in accordance with the search conditions are displayed on the map in the search result display region 413, while summary information of a travel to Ishikawa can be displayed in a divided area corresponding to Ishikawa prefecture.

Here, the summary information of the travel is information corresponding to the other's travel bag, and information such as, for example, cost of the travel, the destination, the number of days, the grade information and images is displayed. Note that the summary information of a divided area may be displayed at a timing, for example, in a case where the user selects the desired divided area, or the summary information of a recommended divided area which is picked up by a system may be displayed. Note that in a case where the summary information of the travel is tapped, detailed information of the travel may be displayed.

In this manner, for example, in a case where the user desires to go traveling anywhere within 40,000 yens, inclusion of the grades, summary information, and the like, of the travels in search results for the search conditions for respective divided areas of the map of Japan increases information for making a decision when the user uses information of other users' travels as a reference and makes it possible to propose a more intuitive and more appropriate travel.

Figure 25:
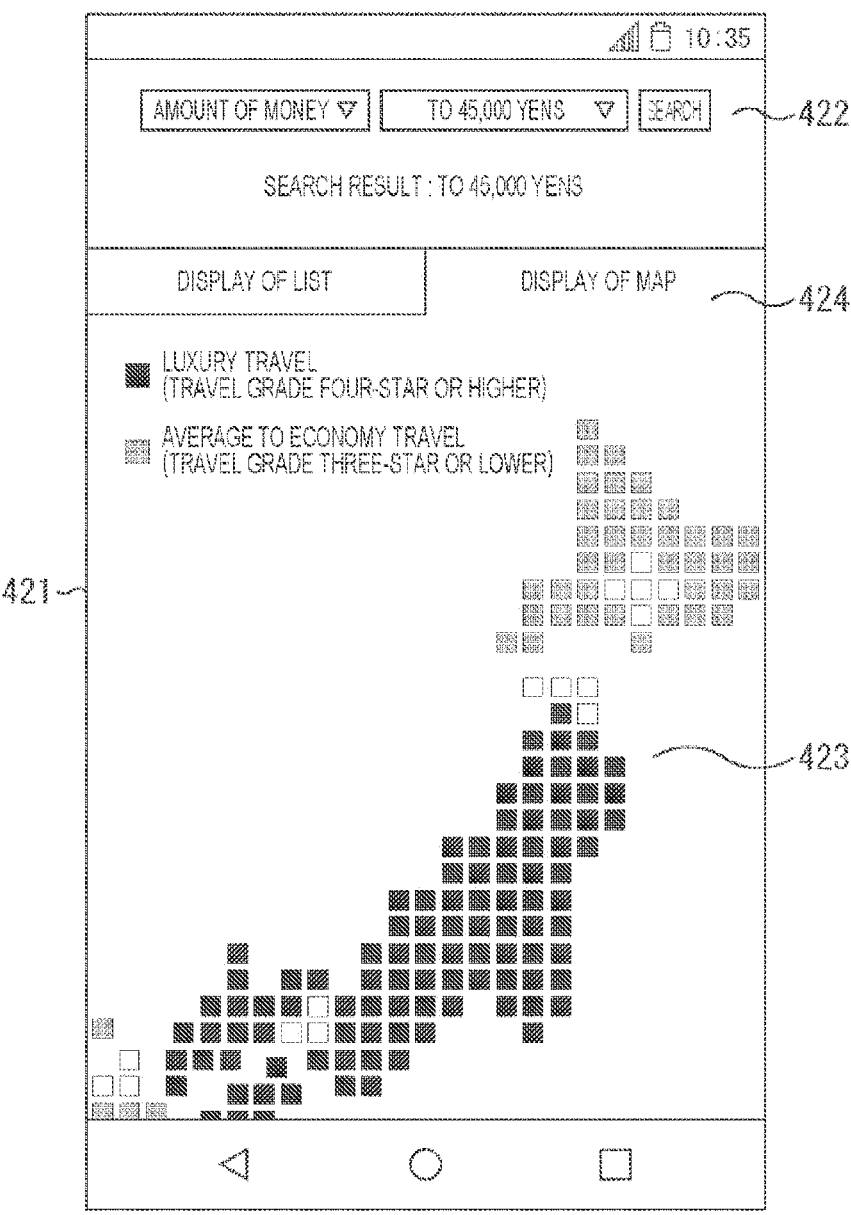
FIG. 25 is a view illustrating a first example of a trip search screen.
Figure 26:
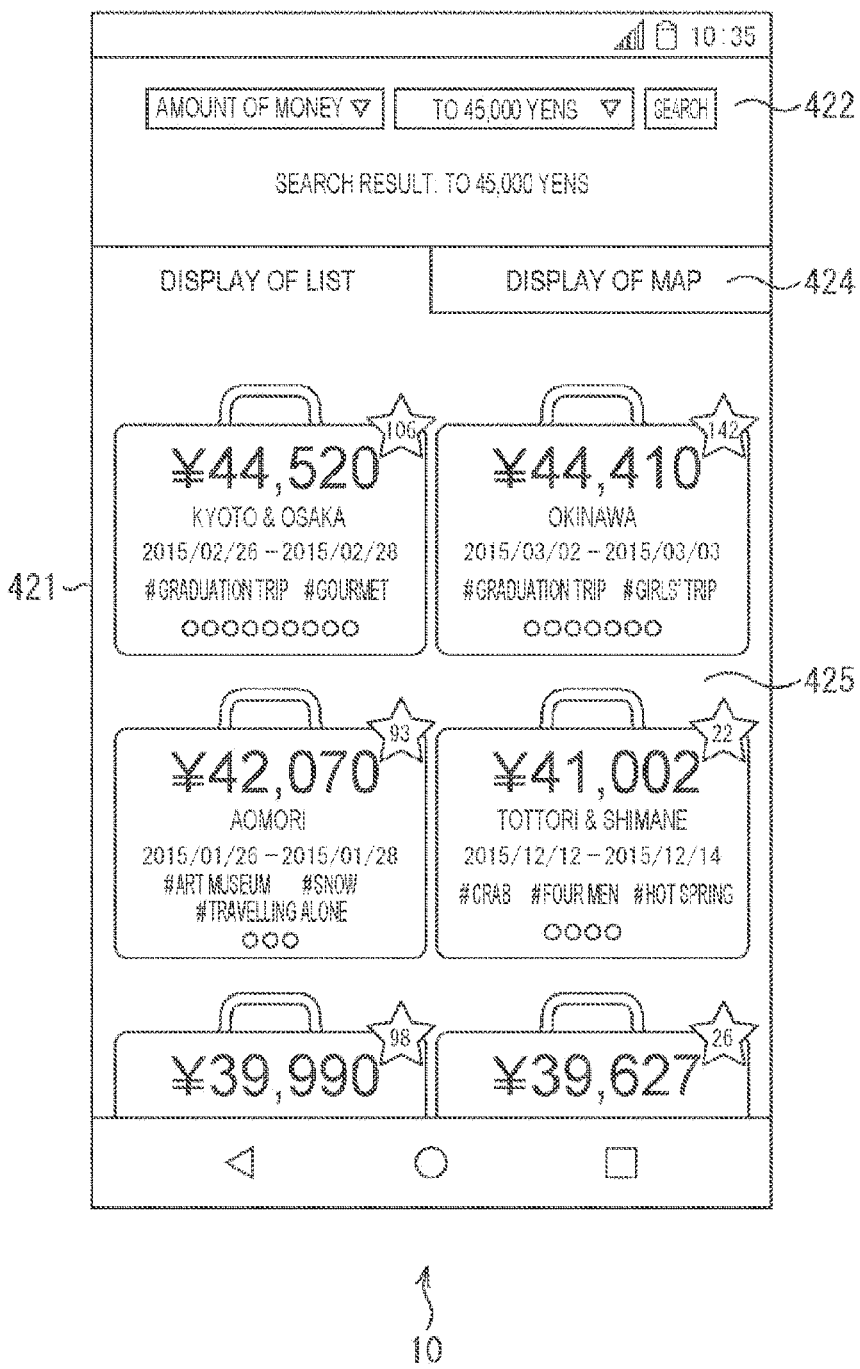
FIG. 26 is a view illustrating a second example of a trip search screen.

Note that while a case has been described above where the trip area search screen 411 is displayed alone, display may be switched between display of the map and display of lists using tabs. FIG. 25 and FIG. 26 illustrate examples of a trip search screen 421 displayed at (the display unit 112 of) the touch panel 102 of the mobile terminal 10. In FIG. 25, the trip search screen 421 includes two regions of a search condition input region 422 and a search result display region 423.

The search condition input region 422 is a region for inputting a search condition for searching for a destination of a travel within a budget, and, for example, in a case where search conditions that an amount of money is equal to or less than 45,000 yens are input, and the search button is tapped, search results in accordance with the search conditions are displayed in the search result display region 423. In this event, in a case where display of the map is selected as a display tab 424, search results in accordance with the search conditions are displayed on the map of Japan in the search result display region 423 (FIG. 25), while in a case where display of lists is selected, search results in accordance with the search conditions are displayed on others' travel bags in the search result display region 425 (FIG. 26).

In this manner, it is possible to switch display between display of the map and display of lists using the display tab 424 on the trip area search screen 411, so that the user can find an optimal travel for the user while switching the display between display of the map and display of lists.

The first embodiment has been described above. The first embodiment has proposed a system which allows the user to manage various matters regarding money in a preparation stage before the travel, during the travel and after the travel by utilizing the travel account service.

By utilizing this travel account service, the user can save the trouble regarding money during the travel and after the travel as well as can enjoy extraordinary experiences which are a fun of the travel. Meanwhile, a bank at which the user opens an account dedicated for the travel account service, also has advantages of increasing touchpoints between the user and the bank by the travel utilizing the travel account service, acquiring new customers and keeping long-term customers, for example.

Further, the user starts application of predetermined service (for example, the travel account application) at the mobile terminal 10 for the purpose of arranging a travel, purchasing items, and the like, other than the purpose of opening an account at a bank, and unconsciously opens an account at a bank during the process of processing of the application, which can lower a barrier for opening a new account. In addition, the mobile terminal 10 records behavior history information (log information) of the user such as time schedule of the travel and purchase of items and can display the behavior history information in chronological order, so that it is possible to increase the number of times of start of the application (for example, the travel account application) by releasing a series of behavior samples while allowing evaluation points to be recorded on social networking service (SNS) for a series of behavior which is compiled together.

2. Second Embodiment

By the way, other service which can be provided by the service providing system 1 in FIG. 1 can include live account service. This live account service is service which allows the user to recall a live later by recording deposits and withdrawals and experiences regarding the live such as, for example, purchase of a ticket and purchase of goods of a live (music live) along with information such as images.

Thus, detailed operation of application of the live account service (hereinafter, referred to as live account application) to be executed at the mobile terminal 10 will be described next with reference to FIG. 27 to FIG. 31. This live account application mainly has an account management function, a user's live list function and an others' live list function, among which the user's live list function will be mainly described in the following description.

Figure 27:
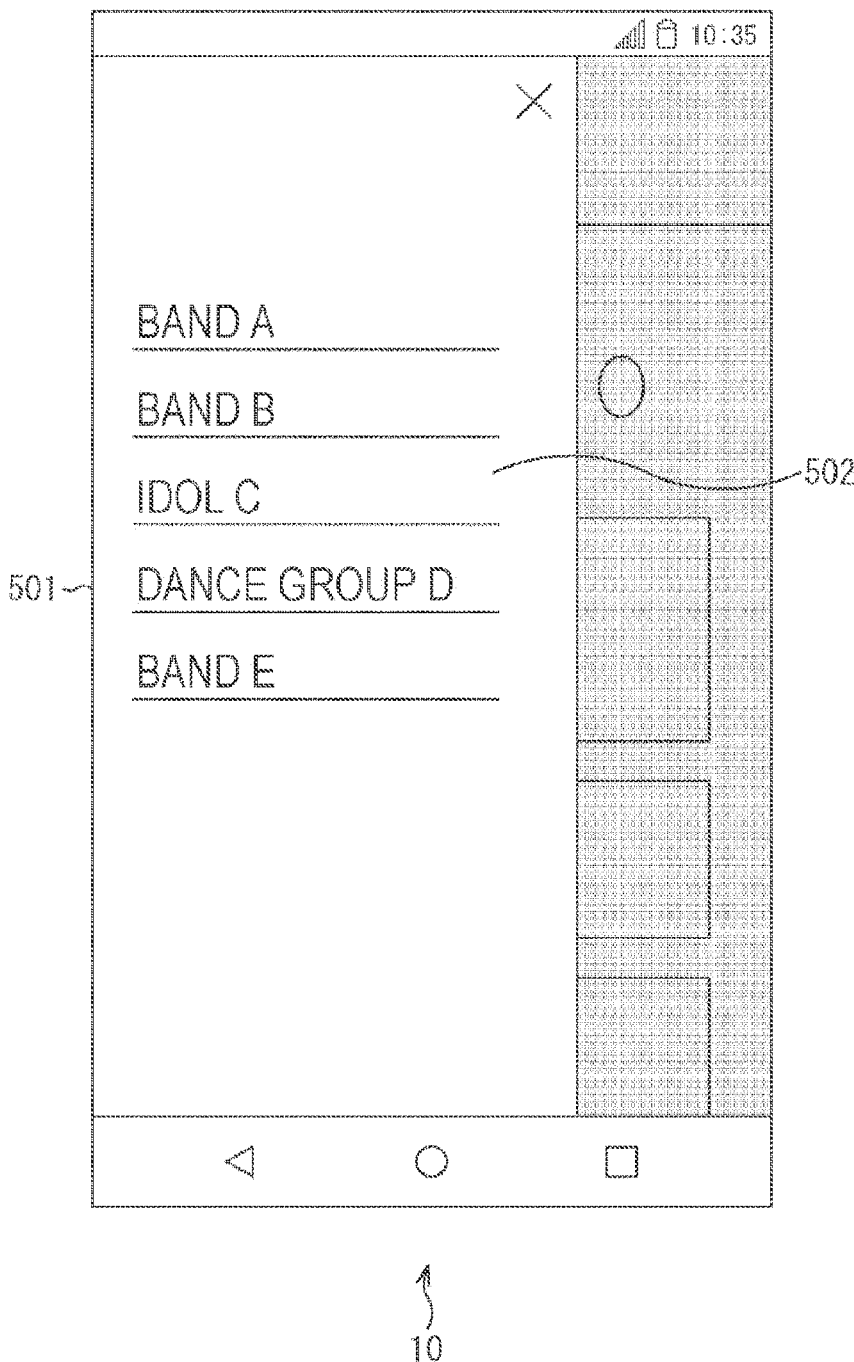
FIG. 27 is a view illustrating an example of an artist selection screen.

FIG. 27 illustrates an example of an artist selection screen 501 to be displayed at (the display unit 112 of) the touch panel 102 of the mobile terminal 10.

In FIG. 27, the artist selection screen 501 includes an artist list region 502. A list of artists for which the user has purchased tickets and has gone to lives is displayed in the artist list region 502, and, in a case where the user selects and taps a desired artist, a user's live detail screen 511 illustrated in FIG. 28 to FIG. 30 is displayed, so that the user can refer to detailed information regarding lives the user has gone to in the past.

Figure 28:
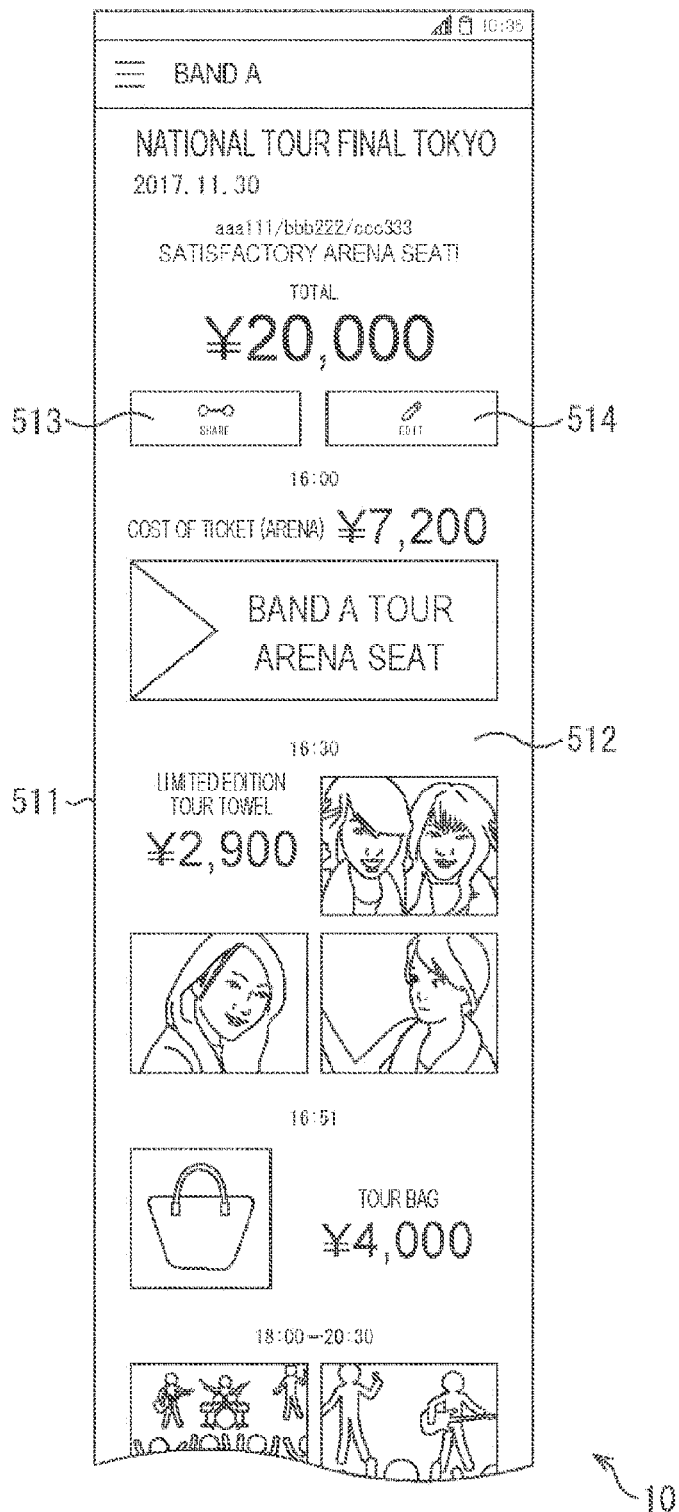
FIG. 28 is a view illustrating a first example of a user's live detail screen.
Figure 29:
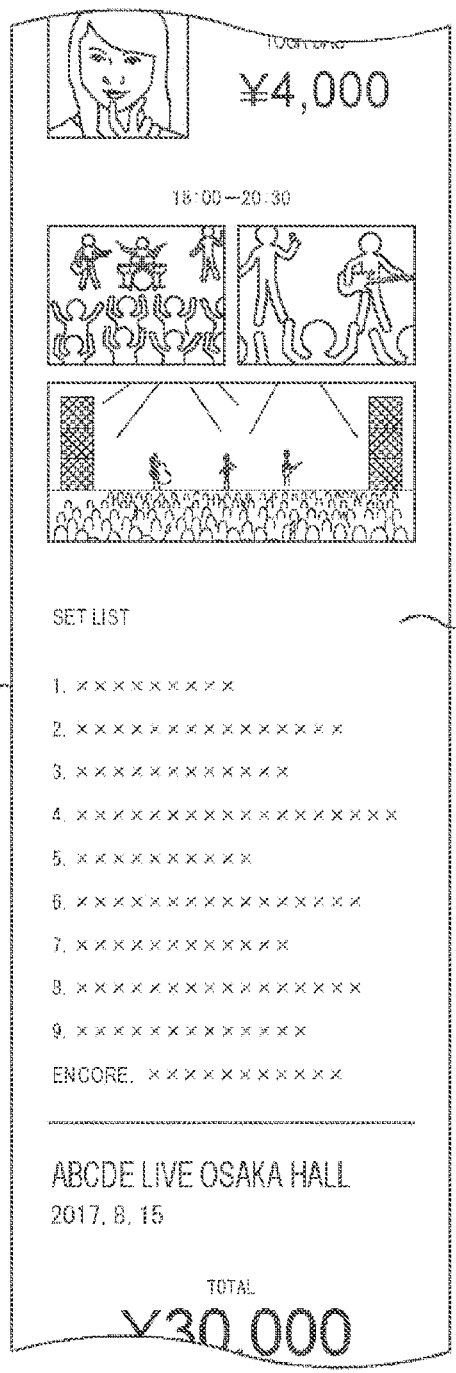
FIG. 29 is a view illustrating a second example of a user's live detail screen.
Figure 30:
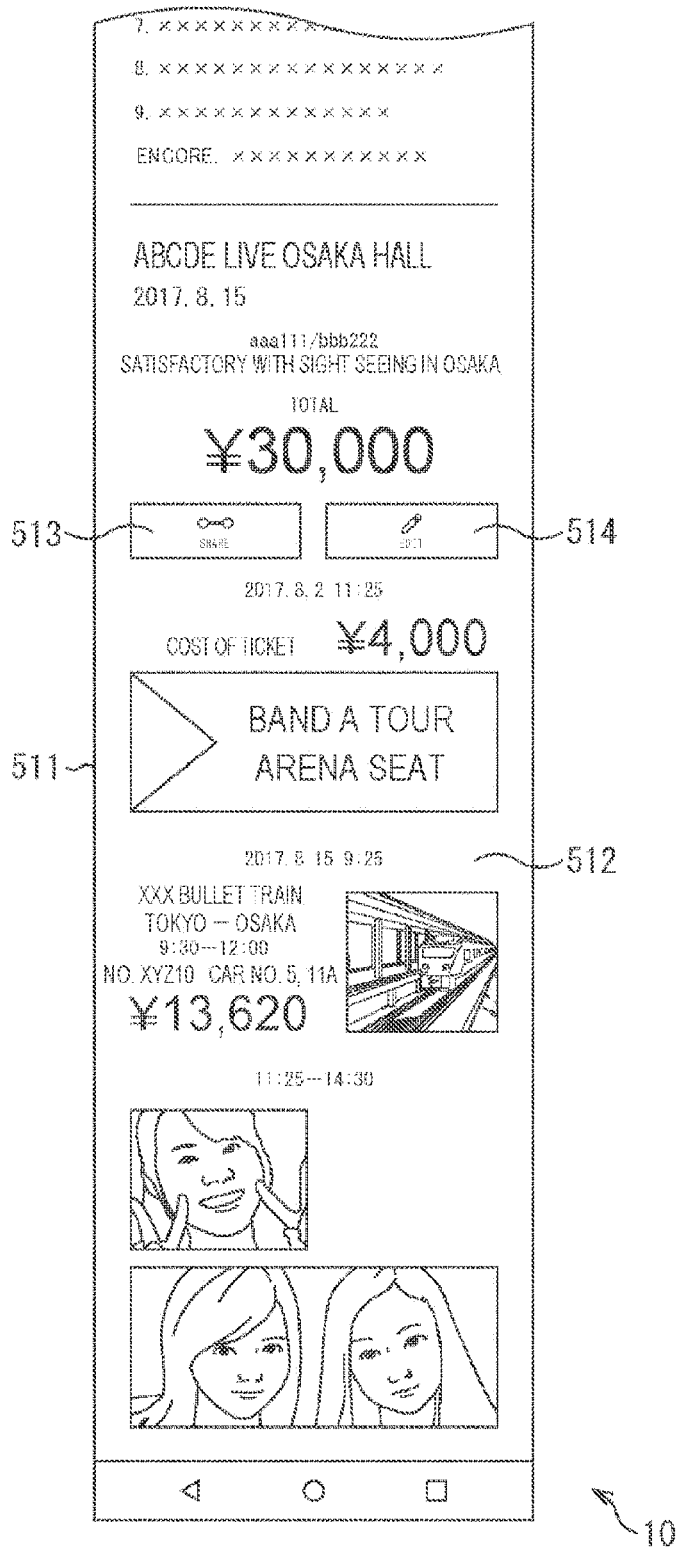
FIG. 30 is a view illustrating a third example of a user's live detail screen.

More specifically, deposit and withdrawal information of the user at a live of a band A to which the user has gone in the past and related information are displayed in a form of a receipt in the user's live detail screen 511 (FIG. 28 to FIG. 30). Note that in FIG. 28 to FIG. 30, a live information display region 512 continues like a long receipt, and all the information can be displayed by the whole of the screen being scrolled in response to flick operation in a vertical direction.

For example, deposit and withdrawal information such as cost of a ticket (7,200 yens) and cost of goods such as a limited edition tour towel and a tour bag (2,900 yens, 4,000 yens) is displayed in chronological order along with related information such as a captured image of a stub of the ticket, an image of the live and information of a set list in the live information display region 512 as a total amount (20,000 yens) of money spent at the live of a national tour final of band A on Nov. 30, 2017 and breakdown thereof.

Here, it is possible to display the deposit and withdrawal information of the purchased goods in association with the image captured at a live site. Further, while there is normally no image corresponding to the ticket issued at a convenience store, or the like, this live experience application displays an original image of a stub of a ticket. Still further, for example, it is possible to display related information such as a set list fixed after the live is finished and images (for example, images which are publicly available) released after the live is finished.

Further, for example, deposit and withdrawal information such as cost of a ticket (4,000 yens) and transportation cost (13,620 yens) is displayed in chronological order along with related information such as an image of a stub of the ticket, departure and arrival time of a bullet train (depart from Tokyo at 9:30, arrive at Osaka at 12:00), train name (No.

XYZ10), seat number (Car No. 5, 11A) and images of friends who have gone together in the live information display region 512 as a total amount (30,000 yens) of money spent at the live of ABCDE live Osaka Hall of band A on Aug. 15, 2017 and breakdown thereof.

Note that a share button 513 for sharing information with other users such as friends, and an edit button 514 for editing the information are displayed in the user's live detail screen 511, so that it is possible to share and edit information of the user, for example, in unit of a live.

Figure 31:
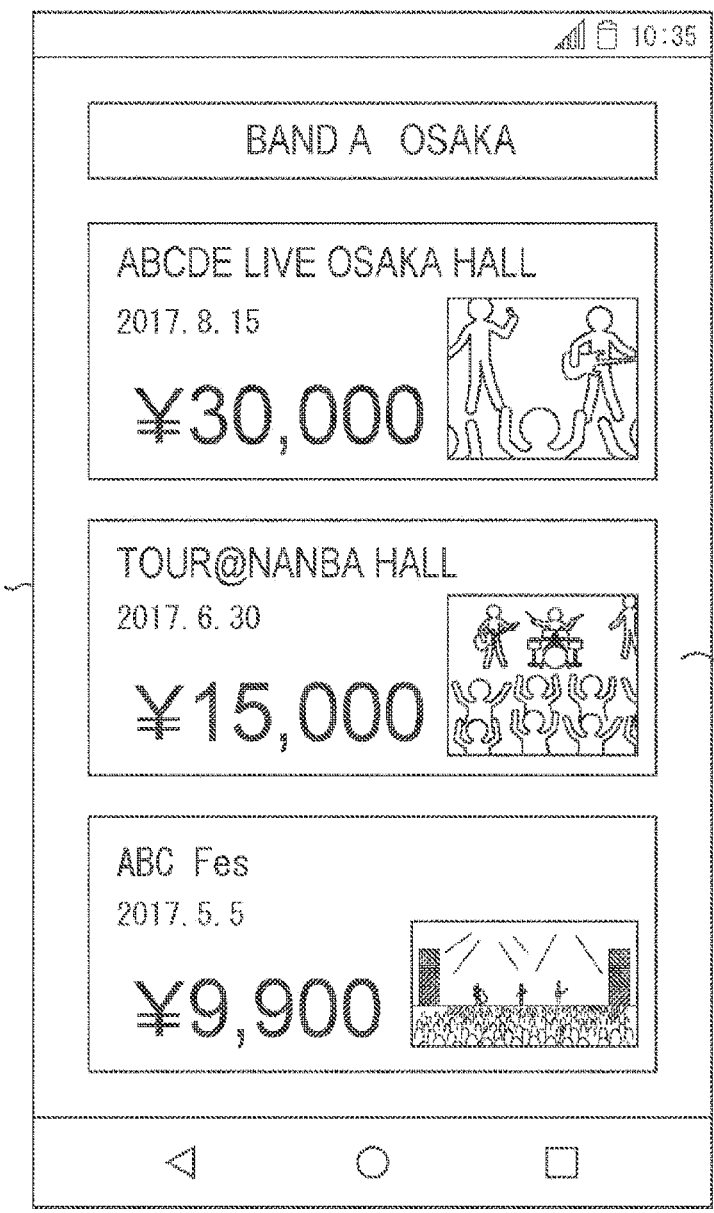
FIG. 31 is a view illustrating an example of an others' live shared screen.

Further, the user can refer to information such as a funds plan of a live shared by others and information such as images related to the funds plan by causing the others' live shared screen 521 illustrated in FIG. 31 to be displayed. Three pieces of shared information regarding a live of band A are displayed in the shared list region 522 on the others' live shared screen 521, and the detailed information can be displayed by desired shared information being tapped.

The second embodiment has been described above. The second embodiment has proposed a system which allows the user to recall a live later by recording deposits and withdrawals and experiences of the live such as purchase of the ticket of the live and purchase of goods along with images by utilizing the live account service.

Note that while the user's live list function has been mainly described above among the main functions of the live account application, the live account application has the account management function in a similar manner to the travel account service described above. Thus, the user opens a dedicated account and receives issuance of a live account service card 11 which is a service card 11 of the live account service to utilize the live account service.

The user then, for example, saves cost necessary for the live in the account until the day of the live, and makes settlement for various kinds of cost using the live account service card 11 on the day of the live. Note that also here, the mobile terminal 10 possessed by the user may have a built-in settlement function of the live account service card 11.

3. Third Embodiment

By the way, other service which can be provided by the service providing system 1 in FIG. 1 further includes rental car account service. This rental car account service is service which allows the user to recall a rental car later by recording deposits and withdrawals and experiences regarding the rental car such as, for example, cost of the rental car and expenses during rental along with information such as images.

Thus, detailed operation of application of the rental car account service (hereinafter, referred to as rental car account application) to be executed at the mobile terminal 10 will be described next with reference to FIG. 32 to FIG. 35. This rental car account application mainly has an account management function, a user's rental car hiring list function and an others' rental car hiring list function, among which the user's rental car hiring list function will be mainly described in the following description.

Figure 32:
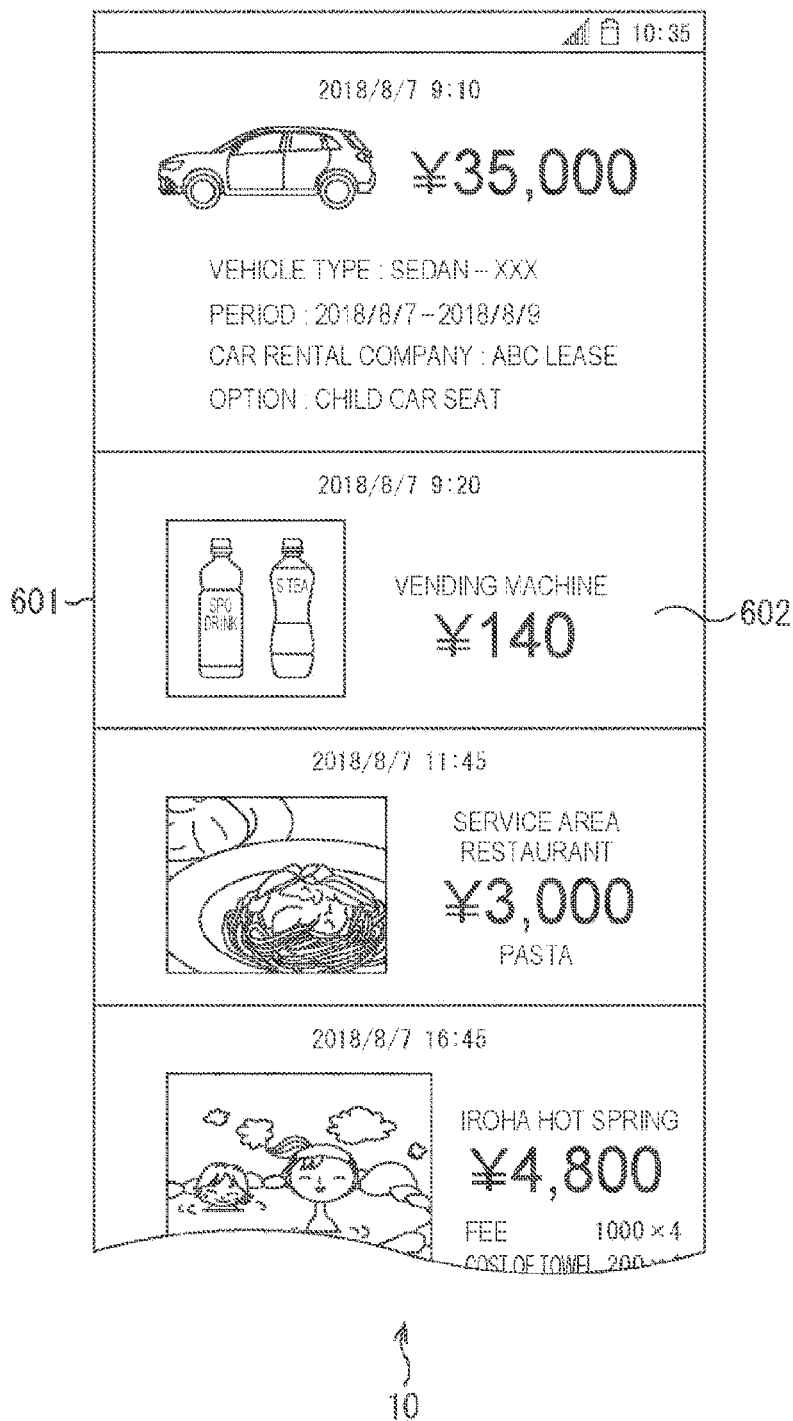
FIG. 32 is a view illustrating a first example of a user's rental car detail screen.
Figure 33:
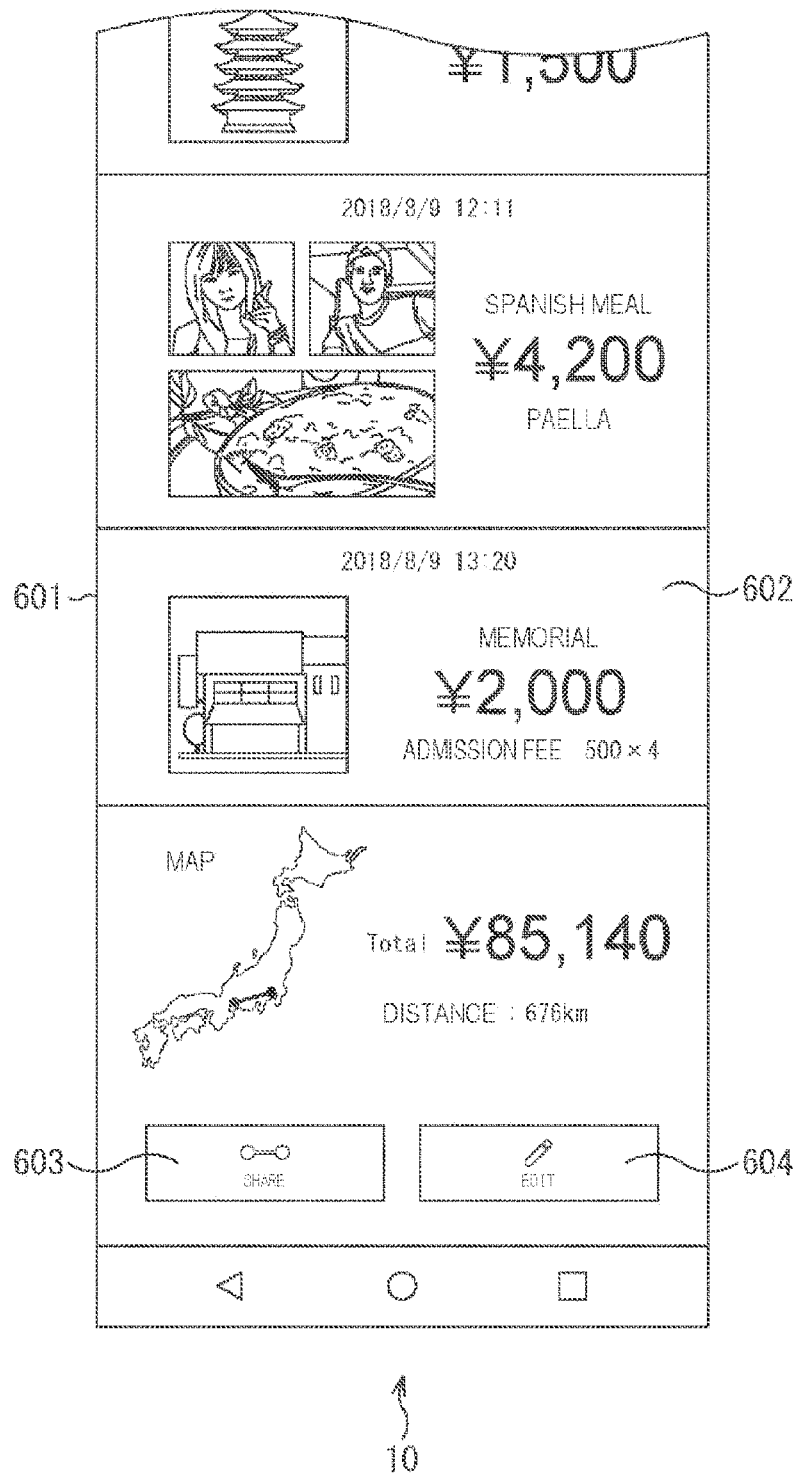
FIG. 33 is a view illustrating a second example of a user's rental car detail screen.

FIG. 32 and FIG. 33 illustrate examples of a user's rental car detail screen 601 to be displayed at (the display unit 112 of) the touch panel 102 of the mobile terminal 10.

Deposit and withdrawal information of the user when the user has used the rental car in the past and related information thereof are displayed in a form of a receipt in the user's rental car detail screen 601 (FIG. 32, FIG. 33). That is, in FIG. 32 and FIG. 33, a rental car information display region 602 continues like a long receipt, and all the information can be displayed by the whole of the screen being scrolled in response to flick operation in a vertical direction.

For example, deposit and withdrawal information such as cost of the rental car (35,000 yens), cost of a drink (140 yens), cost of a lunch (3,000 yens), a charge of a spa (4,800 yens), . . . , cost of souvenirs (1,500 yens), cost of a lunch (4,200 yens) and an admission fee (2,000 yens) is displayed in chronological order along with related information such as information of the rental car and images of meals and the spa (captured images or images which are publicly available) in the rental car information display region 602 as a total amount (85,140 yens) of money spent when the user has hired the rental car on Aug. 7, 2018 and breakdown thereof.

Here, for example, related information of the deposit and withdrawal information which is cost of the rental car, can include information such as a vehicle type (sedan—xxx), a rental period (from Aug. 7, 2018 to Aug. 9, 2018), a car rental company (ABC Lease) and option (such as, for example, a child car seat).

Note that a share button 603 for sharing information with other users such as friends, and an edit button 604 for editing the information are displayed in the user's rental car detail screen 601, so that it is possible to share and edit information of the user, for example, in unit of a vehicle rented. Further, information such as a travel distance and a route of the rental car may be displayed in the rental car information display region 602 as the related information.

Figure 34:
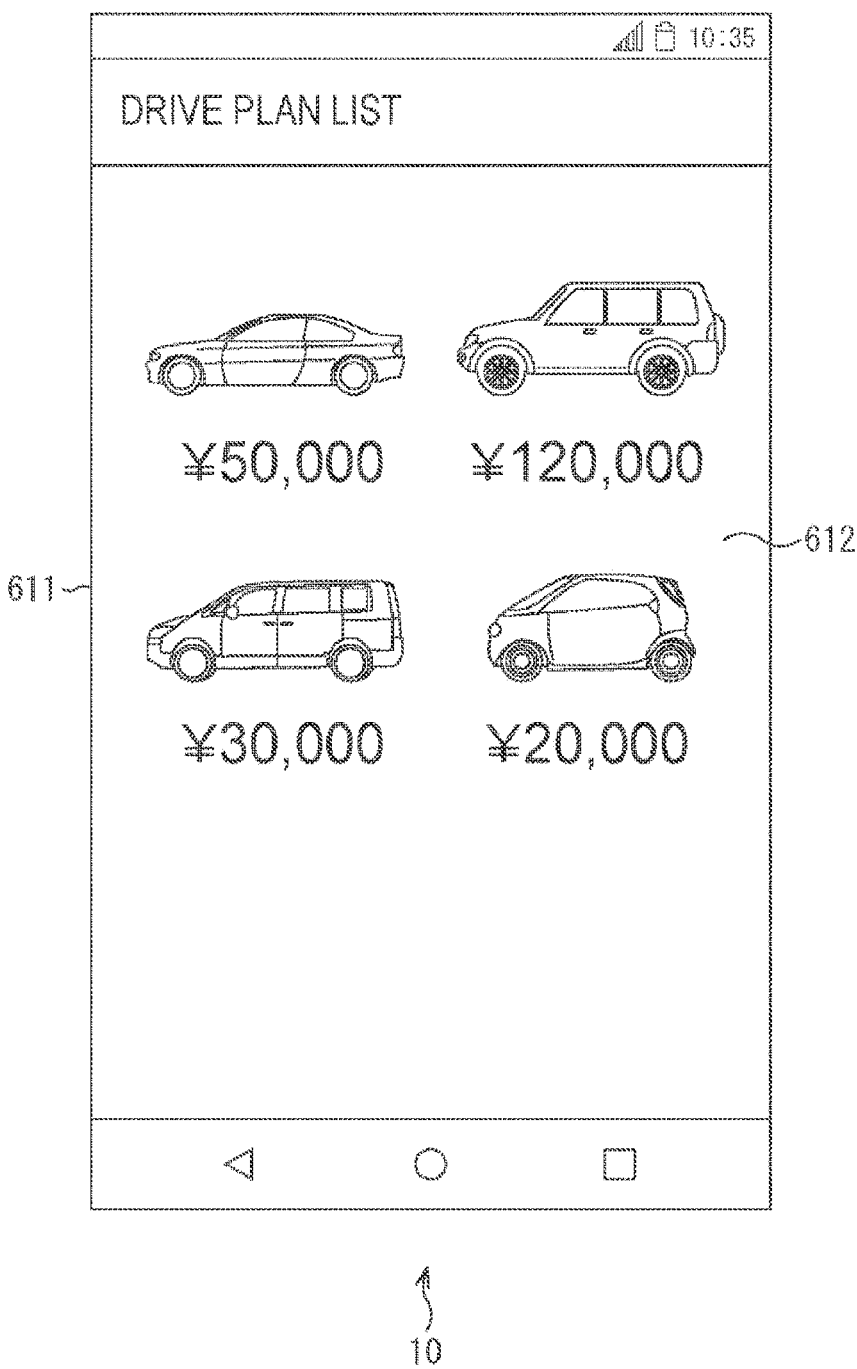
FIG. 34 is a view illustrating an example of an others' rental car shared screen.

Further, by causing the others' rental car shared screen 611 illustrated in FIG. 34 to be displayed, the user can select a vehicle type from drive plans shared by others and can reserve a rental car for a car rental company around the user. Four pieces of shared information (for example, information regarding vehicle types and fees) are displayed in the shared list region 612 on the others' rental car shared screen 611.

Figure 35:
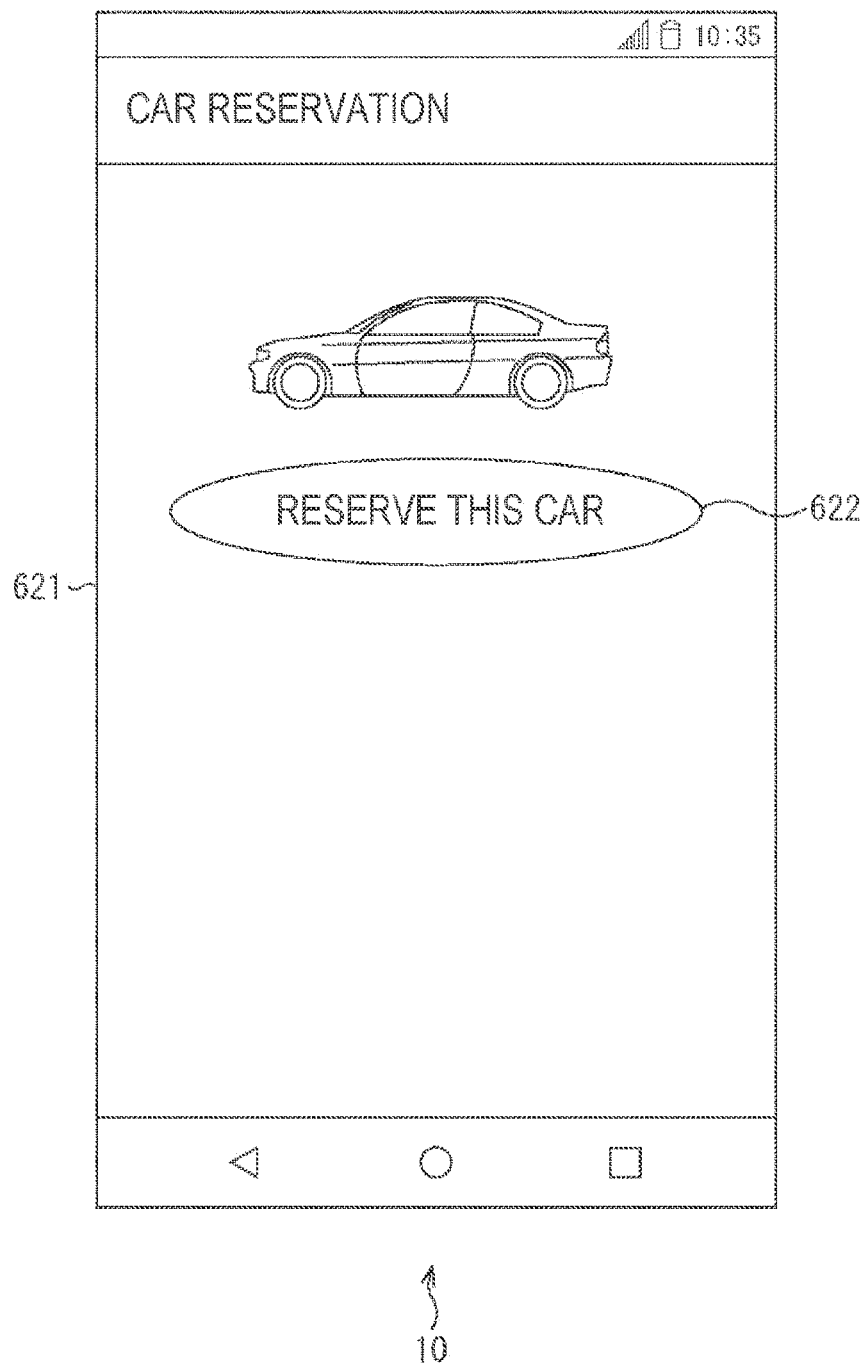
FIG. 35 is a view illustrating an example of a rental car reservation screen.

In a case where one piece of shared information (for example, an upper left car) is selected from the four pieces of shared information and tapped on the others' rental car shared screen 611, a rental car reservation screen 621 illustrated in FIG. 35 is displayed. Then, in a case where a reserve button 622 is tapped on the rental car reservation screen 621, the selected rental car (for example, the upper left car) is reserved at the car rental company around the user.

The third embodiment has been described above. The third embodiment has proposed a system which allows the user to recall cost of the rental car in association with the expenses during rental later by recording deposits and withdrawals and experiences regarding the rental car such as cost of the rental car and expenses during rental along with information such as images by utilizing the rental car account service.

Note that while the user's rental car hiring list function has been mainly described above among the main functions of the rental car account application, the rental car account application has the account management function in a similar manner to the travel account service described above. Thus, the user opens a dedicated account and receives issuance of a rental car account service card 11 which is a service card 11 of the rental car account service to utilize the rental car account service.

The user then, for example, saves cost necessary during hiring the rental car in the account until a day on which the user utilizes the rental car and makes settlement for various kinds of cost using the rental car account service card 11 while utilizing the rental car. Note that also here, the mobile terminal 10 possessed by the user may have a built-in settlement function of the rental car account service card 11.

Note that while a case has been described in the third embodiment where a rental car is utilized as the rental car account service, the present technology can be also applied to car sharing as car sharing account service.

4. Fourth Embodiment

By the way, other service which can be provided by the service providing system 1 in FIG. 1 further includes wedding account service. This wedding account service is service which allows the user to confirm preparation for the wedding until the wedding day, cost, breakdown thereof, and the like.

Thus, detailed operation of application of the wedding account service (hereinafter, referred to as wedding account application) to be executed at the mobile terminal 10 will be described next with reference to FIG. 36 to FIG. 39. This wedding account application mainly has an account management function, a user's wedding list function and an others' wedding list function.

Figure 36:
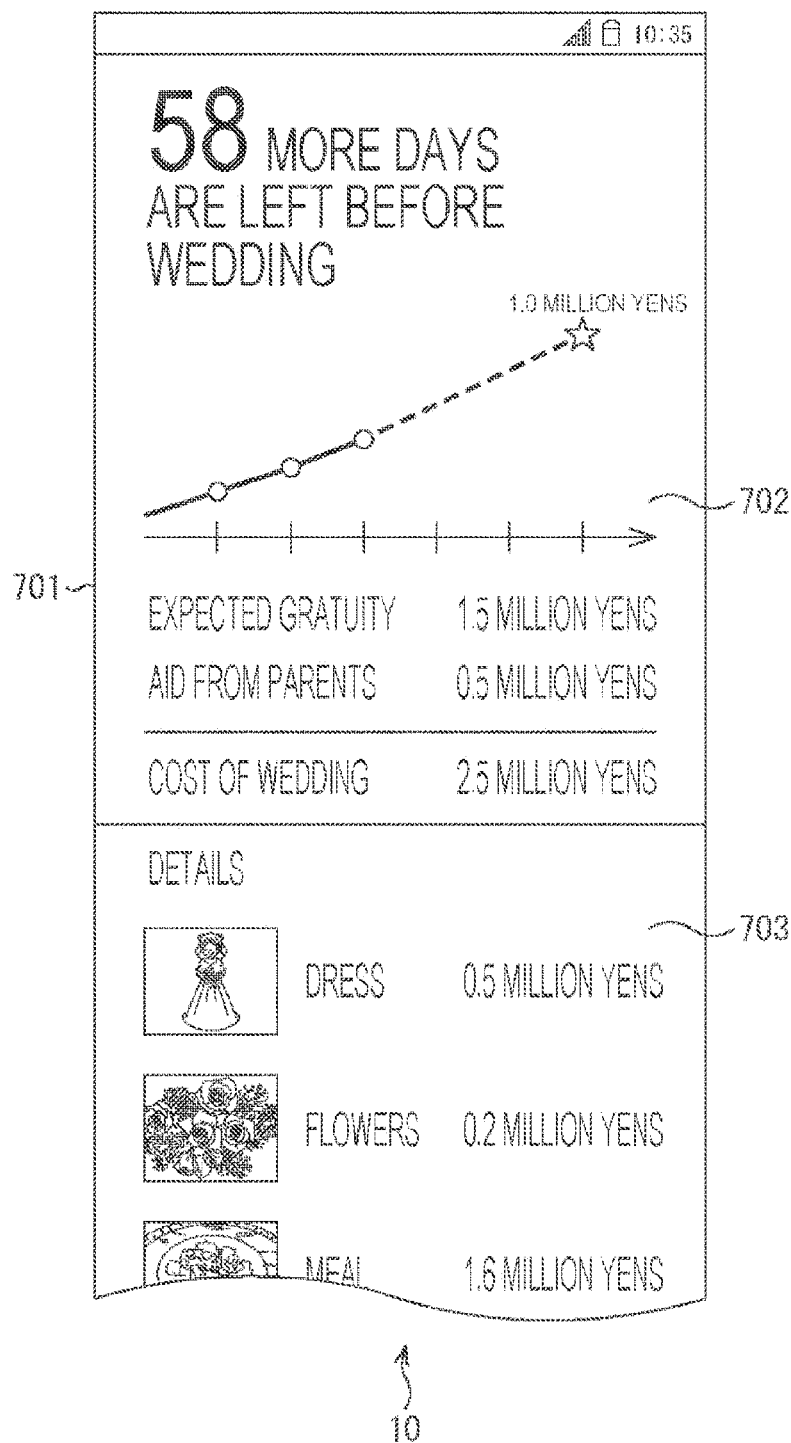
FIG. 36 is a view illustrating a first example of a user's wedding detail screen.
Figure 37:
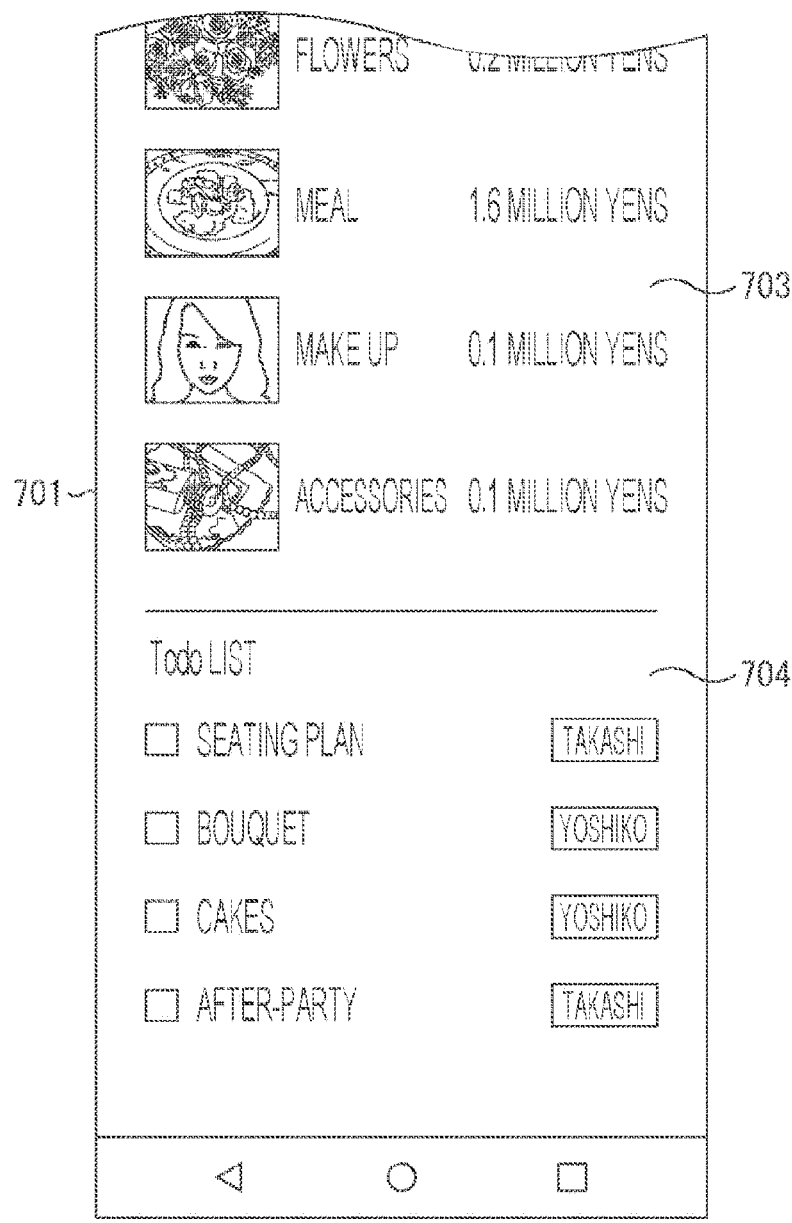
FIG. 37 is a view illustrating a second example of a user's wedding detail screen.

FIG. 36 and FIG. 37 illustrate examples of a user's wedding detail screen 701 to be displayed at (the display unit 112 of) the touch panel 102 of the mobile terminal 10.

The user's wedding detail screen 701 (FIG. 36, FIG. 37) includes, for example, three regions of an account management region 702, a detail display region 703 and a Todo list display region 704, and information including deposit and withdrawal information of the wedding and related information thereof is displayed in a form of a receipt. In FIG. 36 and FIG. 37, the account management region 702, the detail display region 703 and the Todo list display region 704 continue like a long receipt, and all the information can be displayed by the whole of the screen being scrolled in response to flick operation in a vertical direction.

For example, in the account management region 702, cost of the wedding (2.5 million yens) and an amount of money which covers the cost (gratuity: 1.5 million yens, aid: 0.5 million yens) are displayed, and a difference (about 0.5 million yens) becomes out-of-pocket cost. Consequently, while a target amount of money of wedding funds is set at 1 million yens in the account management region 702, a savings amount is less than half of the target amount at the present moment at which 58 more days are left before the wedding.

Further, deposit and withdrawal information such as cost of dresses (0.5 million yens), cost of flowers (0.2 million yens), cost of meals (1.6 million yens), cost of make-up (0.1 million yens) and cost of accessories (0.1 million yens) is displayed (in chronological order) along with related information such as images (such as, for example, captured images and images which are publicly available) of dresses, and the like, in the detail display region 703 as details (breakdown) of the cost of the wedding (2.5 million yens). Further, information regarding a seating plan, a bouquet, cakes, an after-party, and the like, is displayed in the Todo list display region 704 along with checkboxes and name of the friends who are in charge as a list of things to do for the wedding.

By displaying the funds plan and images of the wedding in association with items in the user's wedding detail screen 701, the user can confirm the funds plan and the images in association with these items.

Figure 38:
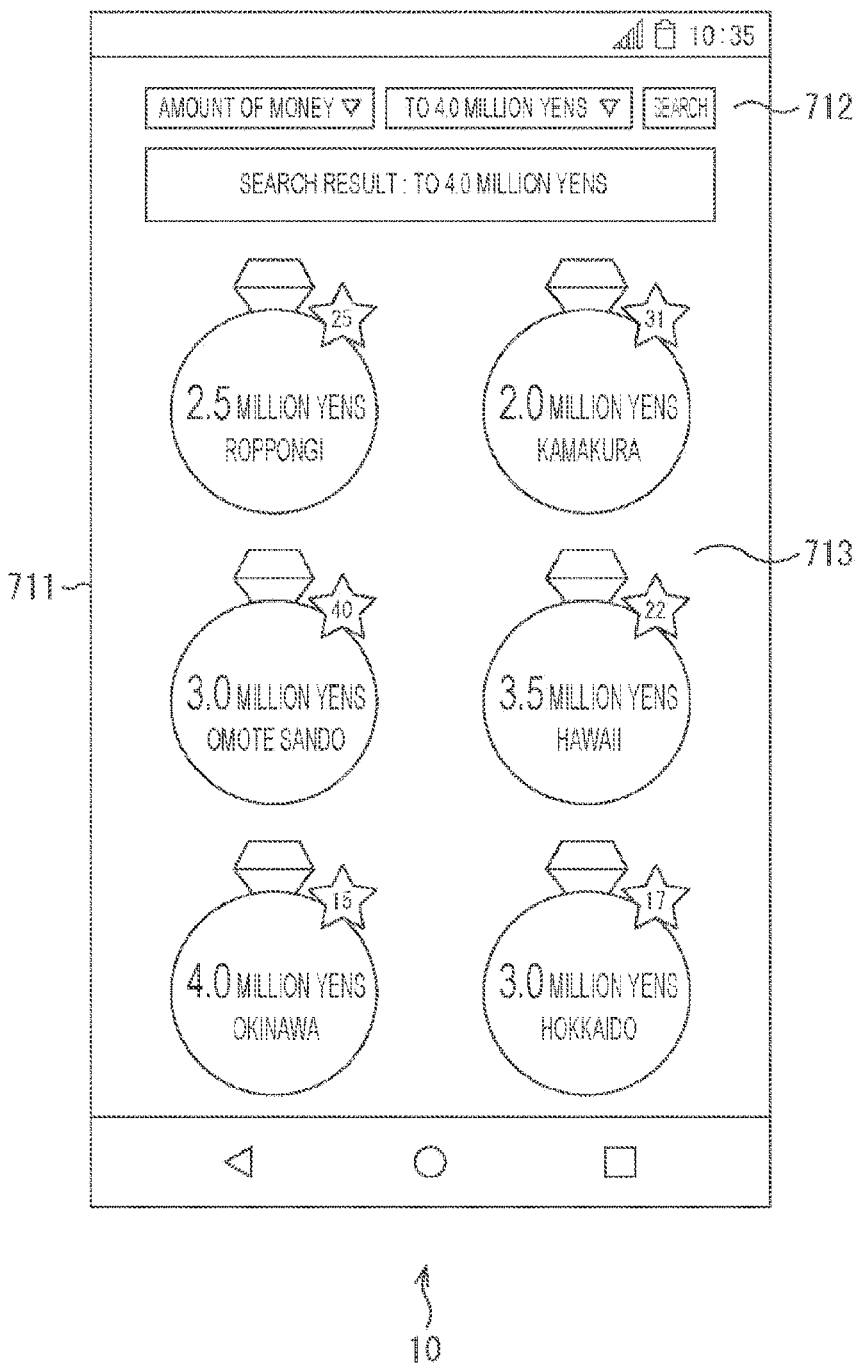
FIG. 38 is a view illustrating an example of a wedding list search screen.

FIG. 38 illustrates an example of a wedding list search screen 711 to be displayed at (the display unit 112 of) the touch panel 102 of the mobile terminal 10.

In FIG. 38, the wedding list search screen 711 includes two regions of a search condition input region 712 and a search result display region 713.

The search condition input region 712 is a region for inputting a search condition for searching others' wedding lists. For example, in a case where an amount of money equal to or less than 4.0 million yens is input as the search condition and a search button is tapped, a search result in accordance with the search condition is displayed in the search result display region 713.

In FIG. 38, a plurality of icons of money bags corresponding to others' wedding lists is displayed in the search result display region 713 as the search result in accordance with the search condition of equal to or less than 4.0 million yens. On these others' money bags, information such as cost and place of the weddings is displayed. Further, bookmarks are superimposed on the money bags, and a larger number on a star-shaped mark indicates that the travel is more popular.

For example, an upper right money bag in the search result display region 713 indicates a wedding at Kamakura which has costed 2 million yens and is registered as bookmarks by 31 users. Note that while not illustrated, information such as time schedule of the wedding and hashtags may be displayed on the money bag.

Figure 39:
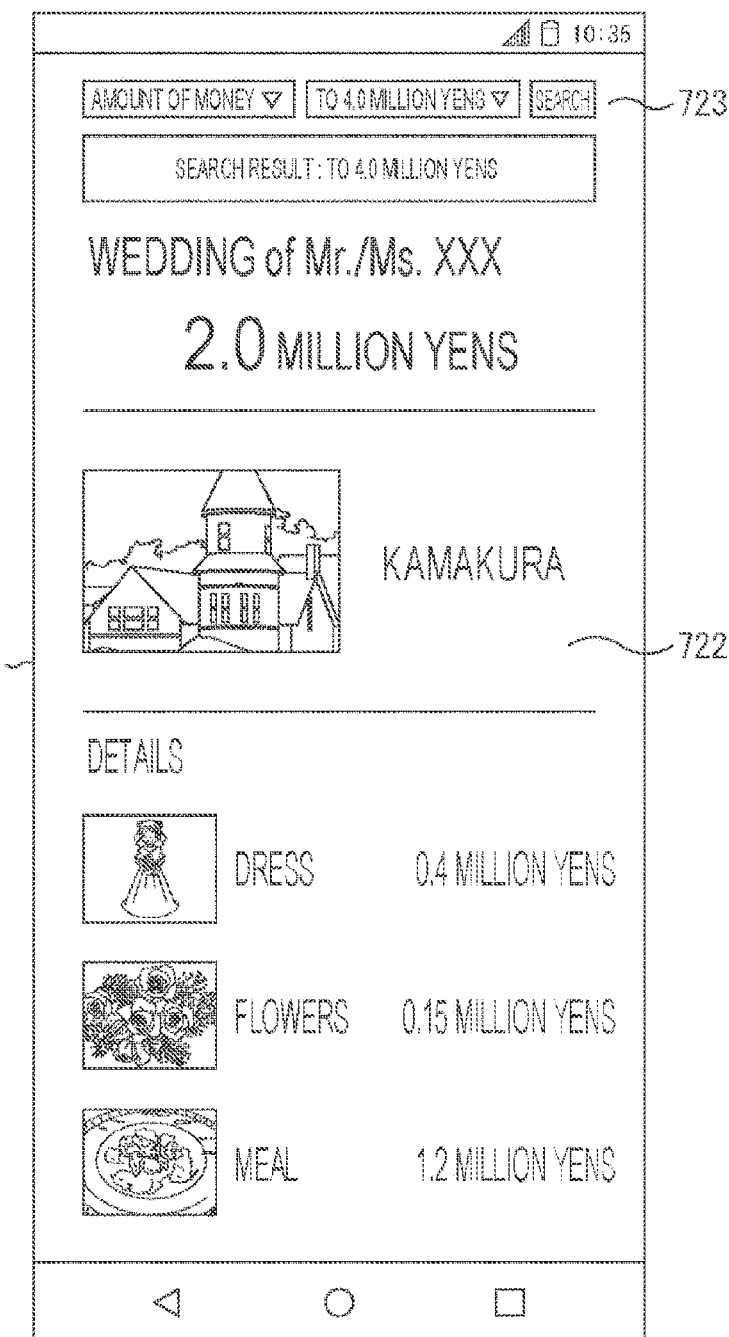
FIG. 39 is a view illustrating an example of an other's wedding detail screen.

In this event, in a case where one money bag (upper right money bag) is selected from a plurality of money bags displayed in the search result display region 713 and tapped, the other's wedding detail screen 721 illustrated in FIG. 39 is displayed, so that the user can refer to detailed information regarding the other's wedding. More specifically, deposit and withdrawal information such as, for example, cost of dresses (0.4 million yens), cost of flowers (0.15 million yens) and cost of meals (1.2 million yens) is displayed (in chronological order) along with related information such as images (such as, for example, captured images and images which are publicly available) of the dresses, and the like, in the wedding information display region 722 as cost (2 million yens) of the wedding of Mr./Ms. xxx and details (breakdown) thereof.

Further, a location (Kamakura) of the wedding and images thereof (such as, for example, captured images and images which are publicly available) are displayed in the wedding information display region 722 as the related information.

Note that, while not illustrated, deposit and withdrawal information such as details (breakdown) of cost of the wedding and related information thereof are displayed in a form of a receipt in the wedding information display region 722 by the whole of the screen being scrolled in a vertical direction in response to flick operation in a vertical direction in a similar manner to the above-described case. Further, in a case where the other's wedding is not the travel the user desires to refer to after confirming content of the other's wedding, the user can search a desired other's wedding list again by inputting a desired search condition again in the search condition input region 723 and flicking the search button.

In this manner, the user can confirm the funds plan and content of the wedding shared by the other person on the other's wedding detail screen 721 and can use the information as a reference for the wedding of the user.

The fourth embodiment has been described above. The fourth embodiment has proposed a system which allows the user to confirm preparation for the wedding until the wedding day, cost, breakdown thereof, and the like, by utilizing the wedding account service.

Note that while an account management function of the wedding account application has not been described in detail above, the wedding account application has an account management function similar to that of the travel account service described above. Thus, the user opens a dedicated account and receives issuance of a wedding account service card 11 which is a service card 11 of the wedding account service to utilize the wedding account service.

The user then, for example, saves cost necessary for the wedding in the account until the wedding day (or until all settlement is completed) and makes settlement for cost of the wedding using the wedding account service card 11. Note that also here, the mobile terminal 10 possessed by the user may have a built-in settlement function of the wedding account service card 11.

(Flow of Processing of Respective Apparatuses)

An example of processing to be performed at respective apparatuses which constitute the service providing system 1 will be described next with reference to the flowchart in FIG. 40.

Figure 40:
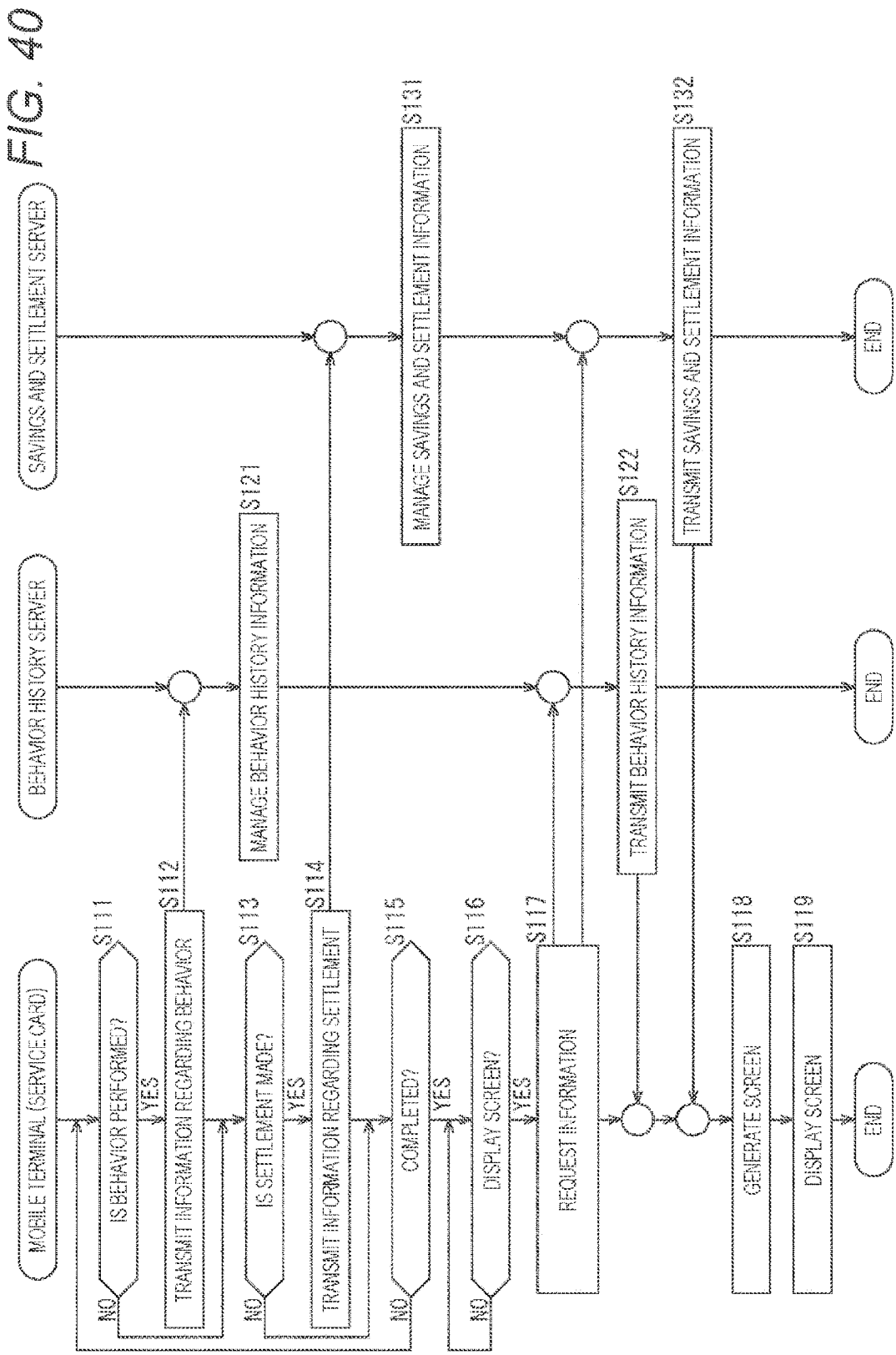
FIG. 40 is a flowchart for explaining an example of processing to be performed at respective apparatuses which constitute the service providing system.

In FIG. 40, processing from step S111 to step S119 is executed by the mobile terminal 10 or the service card 11 such as the travel account service card 11. Further, processing in step S121 and step S122 is executed by the behavior history server 20, and processing in step S131 and step S132 is executed by the savings and settlement server 30.

When the user performs various kinds of behavior (S111: Yes), the mobile terminal 10 transmits information (log information) relating to the behavior to the behavior history server 20 via the network 40 (S112). In response to this, the behavior history server 20 receives the information transmitted from the mobile terminal 10 and manages the information as behavior history information for each user (S121).

Here, the behavior history information includes, for example, various kinds of information regarding behavior of the user, such as captured images and position information. Note that while the behavior history information may be managed on the mobile terminal 10 side and may be held in the memory 101, the behavior history information of a plurality of users who utilizes the service can be managed in a concentrated manner by being managed on the server side. Further, behavior of each user can be identified by settlement of the user.

Further, when the user purchases an item, has a meal, and makes settlement (S113: Yes), for example, information regarding settlement in accordance with information of the service card 11 read with a dedicated settlement terminal provided at a store is transmitted to the savings and settlement server 30 via the network 40 (S114). In response to this, the savings and settlement server 30 receives the information transmitted from the mobile terminal 10 and manages the information as savings and settlement information for each user (S131).

Here, the savings and settlement information includes savings information such as a savings amount of the account of the user and settlement information such as information regarding settlement when the user purchases an item using the service card 11. Note that in a case where the mobile terminal 10 has a built-in function of the service card 11, for example, information regarding settlement is transmitted to the savings and settlement server 30 by the mobile terminal 10 being waved over the dedicated settlement terminal upon settlement.

In determination processing in step S115, whether recording of the user's trip is completed by, for example, a finish button of the travel account application being operated is determined. Then, in a case where it is determined that recording of the user's trip is not completed (S115: No), the processing returns to step S111, the above-described processing from step S111 to step S115 is repeated, and the behavior history information in accordance with the behavior of the user and the savings and settlement information regarding savings or settlement of the user are updated as appropriate.

Thereafter, in a case where it is determined that recording of the user's trip is completed (S115: Yes), the processing proceeds to step S116. In determination processing in step S116, for example, the travel account application is started at the mobile terminal 10, and whether or not to display a predetermined screen such as the user's trip detail screen 351 (such as FIG. 11 to FIG. 13) is determined. Then, in a case where it is determined to display the predetermined screen (S116: Yes), the processing proceeds to step S117.

In step S117, (the communication unit 105 of) the mobile terminal 10 requests information to the behavior history server 20 and the savings and settlement server 30 via the network 40. By this means, at the mobile terminal 10, the behavior history information acquiring unit 121 acquires the behavior history information transmitted from the behavior history server 20 via the network 40 (S122), and the savings and settlement information acquiring unit 122 acquires the savings and settlement information transmitted from the savings and settlement server 30 via the network 40 (S123).

In step S118, the screen generating unit 123 of the mobile terminal 10 generates a predetermined screen on which deposit and withdrawal information regarding deposits and withdrawals at an event and related information of the deposit and withdrawal information are displayed in chronological order for each event on the basis of the behavior history information acquired by the behavior history information acquiring unit 121 and the savings and settlement information acquired by the savings and settlement information acquiring unit 122.

In step S119, the display control unit 124 of the mobile terminal 10 displays a predetermined screen generated by the screen generating unit 123 at the display unit 112 of the touch panel 102.

Here, as the predetermined screen to be displayed by application such as the travel account application, the user's trip detail screen 351 (such as FIG. 11 to FIG. 13) on which deposit and withdrawal information regarding deposits and withdrawals in an event (such as, for example, a total amount of cost of the travel, cost of an airplane ticket, cost of a rental car, an admission fee, cost of meals, cost of a hotel and cost of souvenirs) and related information thereof (such as, for example, captured images, images which are publicly available, captured moving images and moving images which are publicly available, departure and arrival time and seat number of a vehicle, name of a facility, name of purchased items, name of dishes and information regarding discount service) are displayed in chronological order in a form of a strip for each event (for example, a travel such as a travel to Hokkaido), is generated and displayed at the display unit 112.

The flow of the processing to be performed at the respective apparatuses which constitute the service providing system 1 has been described above.

5. Modified Examples (Example of Web Application)

While a case has been described above where application such as the travel account application is designed such that various kinds of processing are performed and various kinds of screens are displayed by the processing unit 100 performing computation processing at the mobile terminal 10, that is, the application is so-called native application, the application may be designed as so-called web application in which a browser is started at the mobile terminal 10 and various kinds of screens generated on the server side are displayed.

A case will be therefore described next with reference to FIG. 41 and FIG. 42 where the application such as the travel account application is web application.

Figure 41:
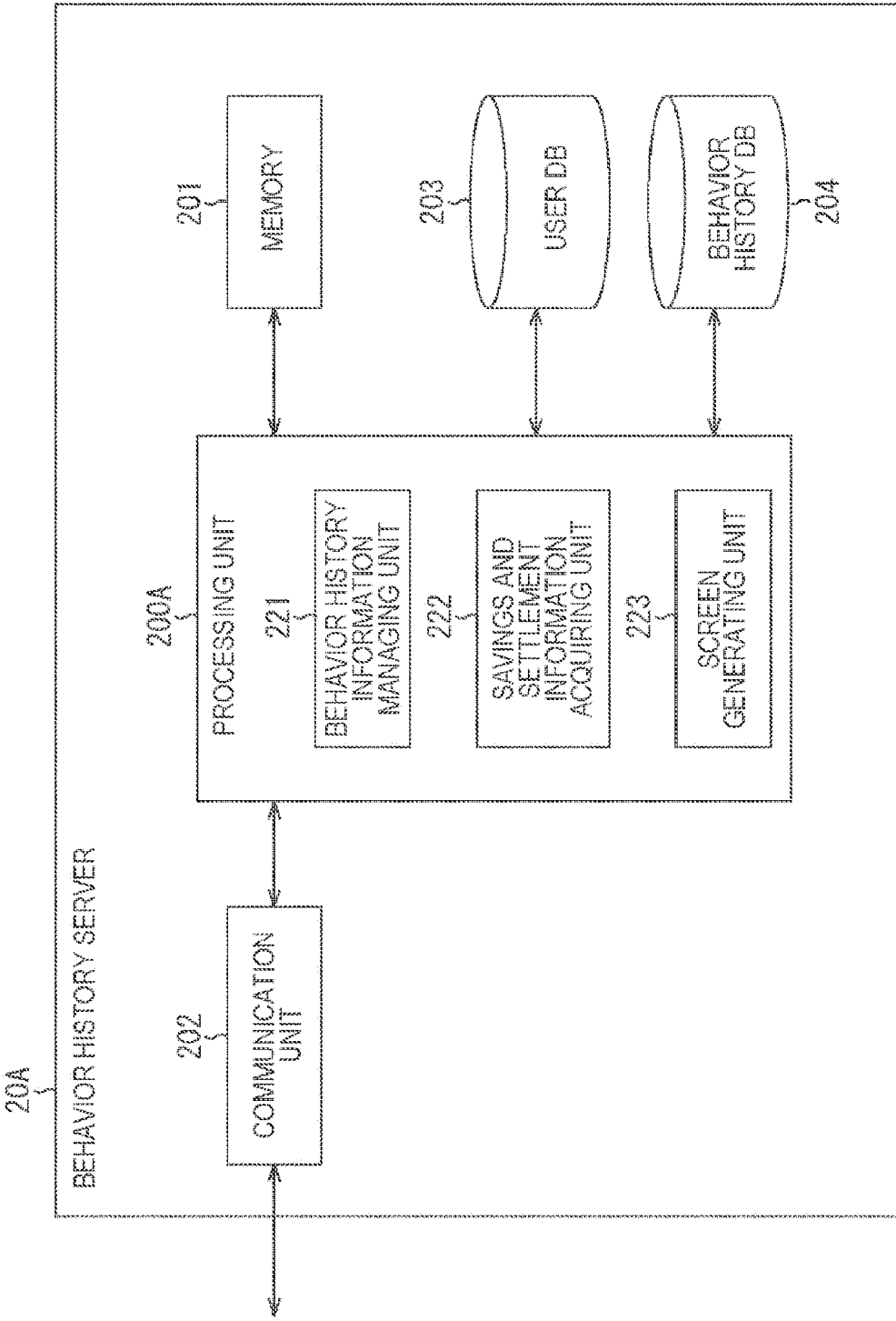
FIG. 41 is a block diagram illustrating another example of the configuration of the behavior history server.

FIG. 41 is a block diagram illustrating another example of the configuration of the behavior history server 20 in FIG. 1.

A behavior history server 20A in FIG. 41 is different from the behavior history server 20 illustrated in FIG. 3 in that a processing unit 200A is provided in place of the processing unit 200. The processing unit 200A includes a savings and settlement information acquiring unit 222 and a screen generating unit 223 in addition to the behavior history information managing unit 221.

The behavior history information managing unit 221 manages the behavior history information for each user. The behavior history information managing unit 221 supplies the behavior history information under management to the screen generating unit 223.

The savings and settlement information acquiring unit 222 acquires the savings and settlement information from the savings and settlement server 30 via the network 40 by controlling the communication unit 202. The savings and settlement information acquiring unit 222 supplies the acquired savings and settlement information to the screen generating unit 223.

The screen generating unit 223 generates screen information to display a predetermined screen on which deposit and withdrawal information regarding deposits and withdrawals at an event and related information of the deposit and withdrawal information are displayed in chronological order for each event on the basis of the behavior history information supplied from the behavior history information managing unit 221 and the savings and settlement information supplied from the savings and settlement information acquiring unit 222. The communication unit 202 transmits the generated screen information to the mobile terminal 10 via the network 40.

Note that in FIG. 41, configurations of the memory 201, the communication unit 202, the user DB 203 and the behavior history DB 204 are similar to the above-described configurations illustrated in FIG. 3, and thus, description will be omitted here.

Another example of processing to be performed at respective apparatuses (including the behavior history server 20A in FIG. 41) which constitute the service providing system 1 will be described next with reference to the flowchart in FIG. 42.

Figure 42:
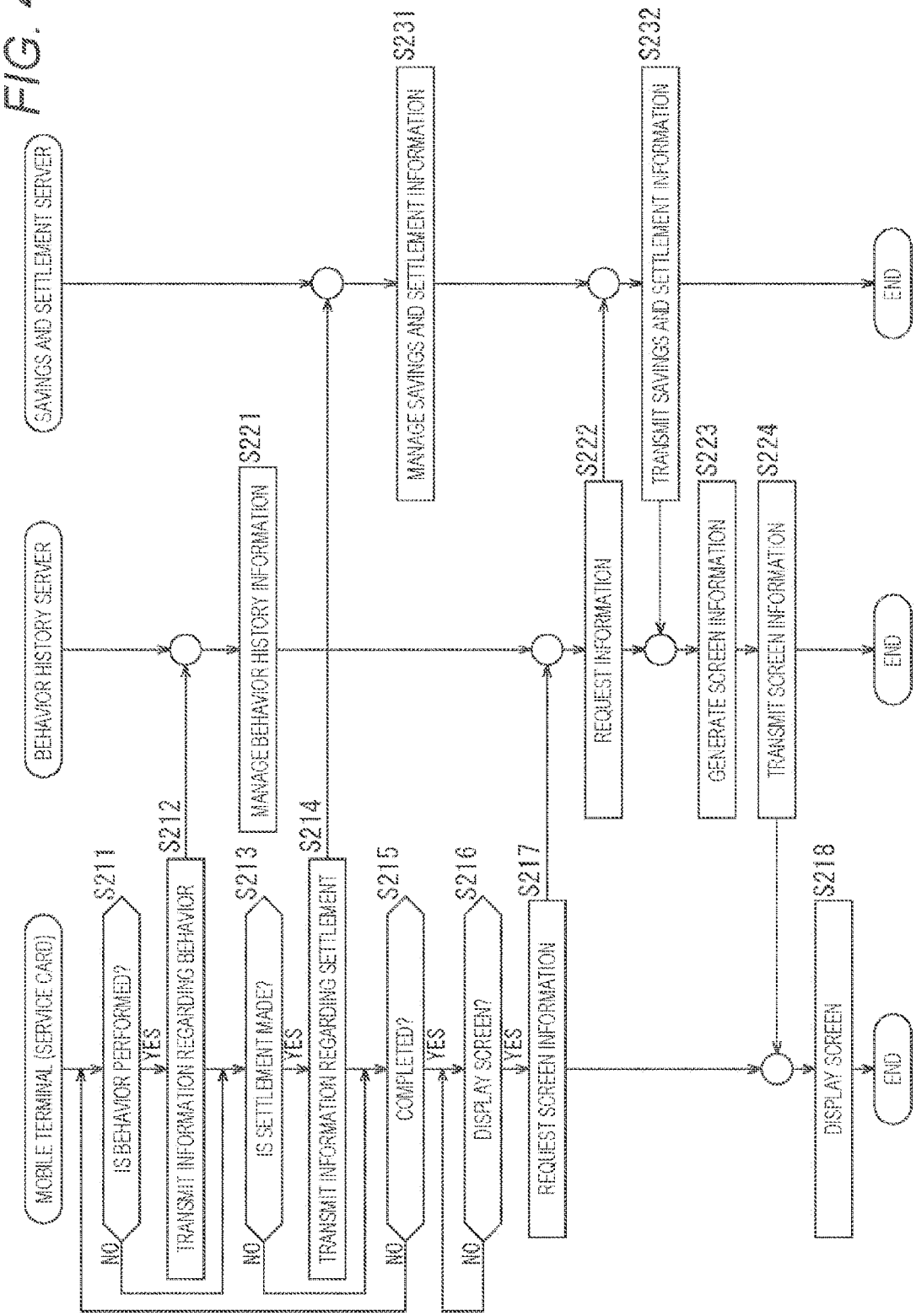
FIG. 42 is a flowchart for explaining another example of processing to be performed at the respective apparatuses which constitute the service providing system.

In FIG. 42, processing from step S211 to step S218 is executed by the mobile terminal 10 or the service card 11 such as the travel account service card. Further, step S221 to step S224 are executed by the behavior history server 20, and processing in step S231 and step S232 is executed by the savings and settlement server 30.

In step S211 to step S215, step S221 and step S231, the behavior history server 20A manages the behavior history information in accordance with behavior of the user who possesses the mobile terminal 10, and the savings and settlement server 30 manages the savings and settlement information including the settlement information regarding settlement of the user who uses the service card 11 until recording of the user's trip is completed in a similar manner to step S111 to step S115, step S121 and step S131 in FIG. 40.

In step S216, in a similar manner to step S116 in FIG. 40, for example, the browser is started at the mobile terminal 10, and whether or not to display a predetermined screen such as the user's trip detail screen 351 (such as FIG. 11 to FIG. 13) is determined. Then, in a case where it is determined to display the predetermined screen (S216: Yes), the processing proceeds to step S217.

In step S217, (the communication unit 105 of) the mobile terminal 10 requests screen information to be displayed on a browser to the behavior history server 20 via the network 40. In response to this, the behavior history server 20 requests information to the savings and settlement server 30 via the network 40 on the basis of the request from the mobile terminal 10. By this means, at the behavior history server 20, the behavior history information managing unit 221 acquires the behavior history information to be managed by the behavior history information managing unit 221 and the savings and settlement information acquiring unit 222 acquires the savings and settlement information transmitted from the savings and settlement server 30 via the network 40 (S232).

In step S223, the screen generating unit 223 of the behavior history server 20 generates a predetermined screen on which deposit and withdrawal information regarding deposits and withdrawals at an event and related information of the deposit and withdrawal information are displayed in chronological order for each event on the basis of the behavior history information acquired by the behavior history information managing unit 221 and the savings and settlement information acquired by the savings and settlement information acquiring unit 222.

In step S224, the communication unit 202 of the behavior history server 20 transmits the screen information generated by the screen generating unit 223 to the mobile terminal 10 via the network 40. This screen information is received by the communication unit 105 of the mobile terminal 10.

In step S218, the display control unit 124 of the mobile terminal 10 displays the predetermined screen at the display unit 112 of the touch panel 102 on the basis of the screen information received by the communication unit 105.

Here, as the predetermined screen to be displayed by a browser, the user's trip detail screen 351 (such as FIG. 11 to FIG. 13) on which deposit and withdrawal information regarding deposits and withdrawals in an event (such as, for example, cost of meals and cost of a hotel) and related information thereof (such as, for example, captured images and captured moving images, and name of purchased items) are displayed in chronological order in a form of a strip for each event (for example, a travel such as a travel to Hokkaido), is generated and displayed at the display unit 112.

The flow of the processing to be performed at the respective apparatuses which constitute the service providing system 1 has been described above.

(Examples of Other Service)

While service of a travel, a live (music live), a rental car or a wedding has been described above as service to be provided by the service providing system 1, these kinds of service is an example, and the service providing system 1 can provide other service.

Such other service can include, for example, service for an adult to study abroad or go to a graduate school, service for acquiring qualifications, service for purchasing a car, service for searching for accommodation and moving, service of a company's internal business trip management system, service for managing daily energy bill and cost of foods, and the like.

More specifically, in the service for an adult to study abroad, go to a graduate school or acquire qualifications, for example, cost of a preparatory school or a cram school is large in addition to cost for entrance, and thus, the service allows the user to manage the cost in a dedicated account. Further, application of the service can leave academic history of the user, for example, by displaying history of effort of the user or a published paper. Note that the service can be coordinated with a scholarship received by the user.

Further, in the service for purchasing a car, for example, service which leaves history of visits to a car dealer and allows the visits to be converted into points which can be used upon purchase of a car can be assumed. Further, in service for searching for accommodation and moving, for example, service which can allow the user to refer to information of other users can be assumed because it is difficult for the user to imagine budgets of the user and livelihood at the budgets.

Further, in the service of a company's internal business trip management system, service which records information of cost of airplane tickets, meals, transportation, and the like during the business trip can be assumed because it costs a lot of money for an overseas business trip and it is troublesome to settle the cost of the business trip after returning from the business trip, for example. Further, as a result of history of business trips of employees being sequentially accumulated as data (big data), an enterprise side can, for example, search for the lowest cost of business trips, which leads to reduction in cost of business trips. Meanwhile, it can be expected by a bank side that more accounts are open by enterprises utilizing the service.

In the service for managing a daily energy bill and cost of foods, service which manages daily cost which is loosely spent by the user can be assumed. Specifically, in application of the service, cost such as an energy bill and cost of foods is evaluated for each month, and, for example, an opportunity of a "little luxury" or "better life" such as foods which can be purchased at a high-end supermarket and meals at a hotel can be proposed, for example, in a month in which the energy bill, the cost of food, and the like, are low.

By utilizing the service provided by the service providing system 1 in this manner, the user has advantages of, for example, enjoying preparation for funds, having an experience which cannot be had when the user makes settlement by cash when the user spends the funds, and enjoying recordings of utilizing the funds. Meanwhile, the bank side has advantages of acquiring a new customer because the user opens an account dedicated for the service. Further, it is possible to further increase a possibility of acquiring a new customer because a psychological barrier for starting utilization of the service is lower if the user starts utilization of the service with friends.

(Another Modified Examples)

Note that the above-described service such as the travel account service can include service for addressing a case where, for example, the user overspends during the travel. Further, the application such as the travel account application may adjust a portion of the target amount of money, for example, by displaying only a portion of an amount of money which the user actually possesses when the application provides the account management function. As this adjustment method, for example, a method in which partitions are provided in one account of a certain user, or a method in which 50,000 yens are set as the target amount of money although the user actually has 200,000 yens can be assumed. Note that, for example, even in a case where the user actually has only 0 yen, the application such as the travel account application can lead the user to taking out small loans and can also manage repayment of the loans.

Further, the above-described service such as the travel account service can provide service points to the user who subscribes the service or can discount an amount of money upon settlement of items, meals, and the like, in a case where predetermined conditions are satisfied. In other words, a service provider side can perform business using data by acquiring data of consumption behavior including captured images, and the like, of the user who subscribes the service, and thus, the service provider gives back to the user with points, discounts, and the like.

Still further, the above-described service such as the travel account service can appropriately manage personal information of the user who subscribes the service. In other words, for example, information of the user is not released to other users unless the user operates the share button 354 on the user's trip detail screen 351 (FIG. 11, FIG. 13), so that it is possible to prevent the information from expanding to a range which the user does not intend. Further, the user who subscribes the service can set a user account or nickname, so that it is possible to assure anonymity by, for example, displaying nickname in place of real name on the application such as the travel account application. Meanwhile, the service provider side can provide incentives to a user (popular user) who actively releases information.

While a case has been described above where the application such as the travel account application is executed by the mobile terminal 10 such as a smartphone, these kinds of application may be executed at a fixed terminal such as, for example, a personal computer.

Note that in the present specification, "tap operation" refers to operation of tapping a desired region on the touch panel 102 of the mobile terminal 10 with the finger, or the like, of the user. Further, the "flick operation" refers to operation of putting the finger of the user in a desired region on the touch panel 102 of the mobile terminal 10 and slides the finger upward or downward.

6. Configuration of Computer

Figure 43:
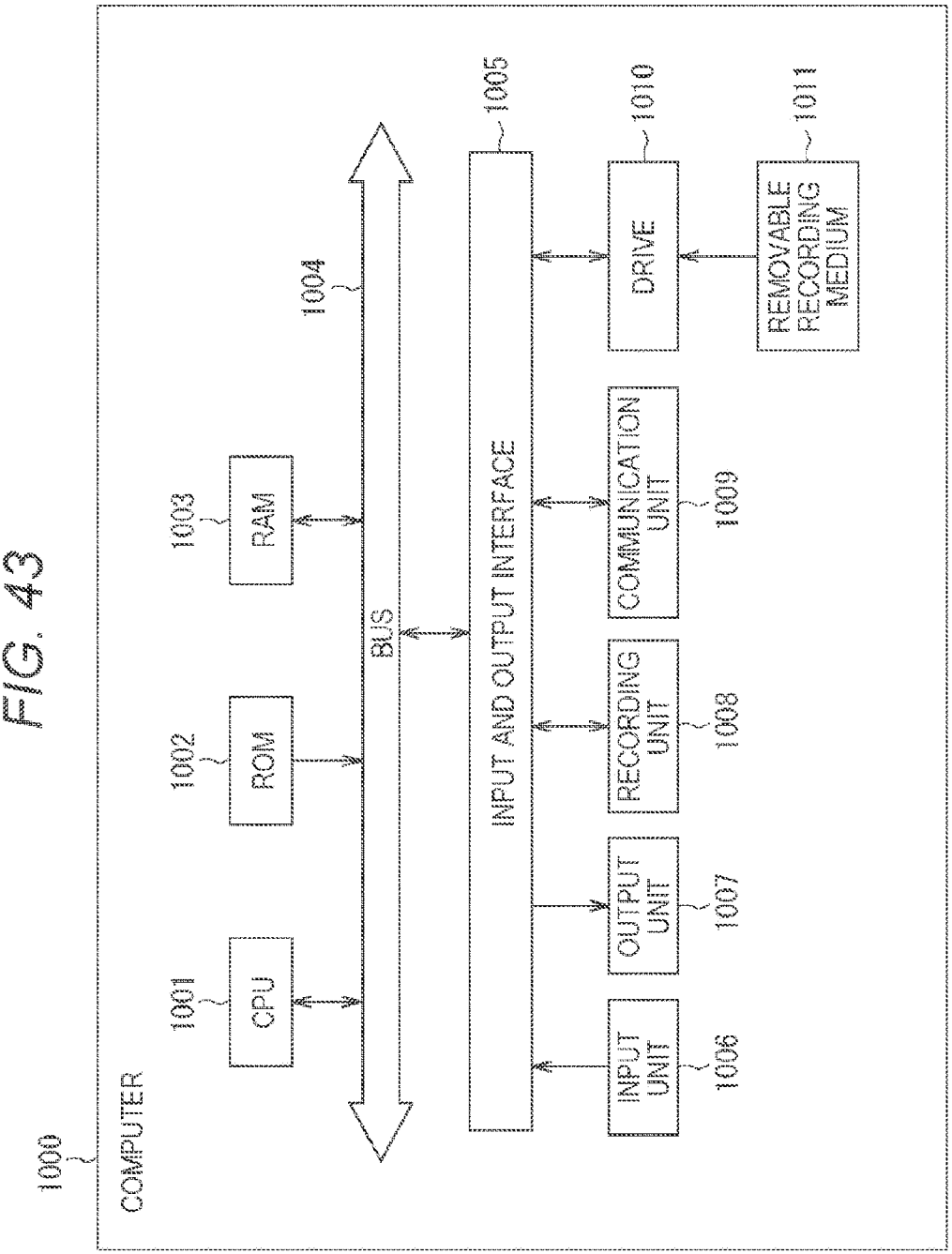
FIG. 43 is a diagram illustrating a configuration example of a computer.

The above-described series of processes (e.g., processing performed at the respective apparatus illustrated in FIG. 40 or FIG. 42) may be executed by hardware or software. In a case in which the series of processes is executed by software, a program including the software is installed on each computer. FIG. 43 is a block diagram illustrating an example of a hardware configuration of a computer in which the above-described series of processes is executed by the program.

In a computer 1000, a central processing unit (CPU) 1001, a read-only memory (ROM) 1002, and a random access memory (RAM) 1003 are connected to each other by a bus 1004. Further, an input/output interface 1005 is connected to the bus 1004. An input unit 1006, an output unit 1007, a recording unit 1008, a communication unit 1009, and a drive 1010 are connected to the input/output interface 1005.

A microphone, a keyboard, a mouse, or the like is used as the input unit 1006. A speaker, a display, or the like is used as the output unit 1007. The recording unit 1008 includes a hard disk, a non-volatile memory, and the like. The communication unit 1009 includes a network interface, and the like. The drive 1010 drives a removable recording medium 1011 such as a magnetic disk, an optical disc, a magneto-optical disk, and a semiconductor memory.

In the computer 1000 that has the above-described configuration, the CPU 1001 executes the above-described series of processes by loading a program recorded on the ROM 1002 or the recording unit 1008 to the RAM 1003 via the input/output interface 1005 and the bus 1004 and executing the program.

For example, programs to be executed by the computer 1000 (CPU 1001) can be recorded and provided in the removable recording medium 1011, which is a packaged medium or the like. In addition, the program can be supplied via a wired or wireless transmission medium such as a local area network, the Internet, or digital broadcasting.

In the computer 1000, by mounting the removable recording medium 1011 onto the drive 1010, programs can be installed into the recording unit 1008 via the input/output interface 1005. In addition, the program can be received by the communication unit 1009 via a wired or wireless transmission medium and can be installed on the recording unit 1008. In addition, programs can be installed in advance into the ROM 1002 or the recording unit 1008.

Here, in the present specification, processes executed by the computer in accordance with the program may not necessarily be executed chronologically in the order described as a flowchart. That is, the processes executed by the computer in accordance with the program also include processes executed in parallel or individually (for example, parallel processes or processes by objects). In addition, the program may be processed by one computer (processor) or may be distributed and processed by a plurality of computers.

Note that the embodiments of the present technology are not limited to the above-described embodiments, and various changes can be made within a scope not deviating from the gist of the present technology. For example, while in the above-described first to fourth embodiments (including the modified examples), it is assumed that application for managing an event such as a travel is started by being triggered by opening a bank account, to allow the user to save the target amount of money to be used at an event such as a travel using a bank account which has already been open, it is also possible to employ a mechanism in which application of managing savings in a similar manner to a simple time deposit account so that the user cannot easily withdraw cash for other cost, for example, is plugged in the savings and settlement server 30.

In addition, each step of the speech dialogue processing of the respective apparatuses illustrated in FIG. 40 or FIG. 42 can be executed by a plurality of devices in a shared manner, in addition to being executed by one device. In addition, in a case where a single step includes a plurality of processes, the plurality of processes included in the single step can be executed by a single device or shared and executed by a plurality of devices.

Additionally, the present technology may be configured as below.

(1)

An information processing apparatus including:

a display control unit configured to perform control to display deposit and withdrawal information regarding a deposit and a withdrawal at an event and related information relating to the deposit and the withdrawal in chronological order for each event on the basis of savings and settlement information regarding savings or settlement of a user and behavior history information in accordance with behavior of the user.

(2)

The information processing apparatus according to (1), in which the display control unit displays the deposit and withdrawal information and the related information in chronological order in a form of a strip.

(3)

The information processing apparatus according to (1) or (2), in which the related information includes at least one of settlement related information relating to settlement, event related information relating to the event, date and time related information relating to date and time, location related information relating to a location or transportation related information relating to transportation.

(4)

The information processing apparatus according to (3), in which the display control unit displays the related information using text, an image, a moving image or combination thereof.

(5)

The information processing apparatus according to any one of (1) to (4), in which a plurality of users belonging to a same group is able to participate in the event, and the display control unit displays the deposit and withdrawal information and the related information in chronological order for each of the plurality of users.

(6)

The information processing apparatus according to (5), in which the deposit and withdrawal information includes common withdrawal information common among the plurality of users and unique withdrawal information unique for each of the plurality of users.

(7)

The information processing apparatus according to (6), in which the common withdrawal information includes bill sharing information regarding an amount of money shared by dividing a total amount among the plurality of users.

(8)

The information processing apparatus according to (5), in which the display control unit displays the deposit and withdrawal information and the related information of other users within a same group in chronological order for a user belonging to a predetermined group.

(9)

The information processing apparatus according to any one of (1) to (8), in which the deposit and withdrawal information and the related information are editable.

(10)

The information processing apparatus according to any one of (1) to (9), in which the deposit and withdrawal information and the related information are shareable with other users for each of the event.

(11)

The information processing apparatus according to (10), in which the deposit and withdrawal information and the related information of the other users are searchable for each of the event.

(12)

The information processing apparatus according to any one of (1) to (11), in which behavior of the user is identifiable through the settlement.

(13)

The information processing apparatus according to (12), in which the event is different for each service to be provided, and the settlement is made at a dedicated account of the user who subscribes the service.

(14)

The information processing apparatus according to (13), in which the service includes service of a travel, a music live, a rental car or a wedding.

(15)

The information processing apparatus according to any one of (1) to (14), further including:

a display unit, in which the display control unit displays the deposit and withdrawal information and the related information on the display unit in chronological order in a form of a strip, and in a case where all of the deposit and withdrawal information and the related information are not displayable within a screen of the display unit, makes all the information displayable in response to operation by the user.

(16)

An information processing method including:

by an information processing apparatus, performing control to display deposit and withdrawal information regarding a deposit and a withdrawal at an event and related information relating to the deposit and the withdrawal for each event in chronological order on the basis of savings and settlement information regarding savings or settlement of a user and behavior history information in accordance with behavior of the user.

(17)

A program for causing a computer to function as:

a display control unit configured to perform control to display deposit and withdrawal information regarding a deposit and a withdrawal at an event and related information relating to the deposit and the withdrawal in chronological order for each event on the basis of savings and settlement information regarding savings or settlement of a user and behavior history information in accordance with behavior of the user.

(18)

An information processing apparatus including:

a generating unit configured to generate display information which displays deposit and withdrawal information regarding a deposit and a withdrawal at an event and related information relating to the deposit and the withdrawal for each event in chronological order on the basis of savings and settlement information regarding savings or settlement of a user and behavior history information in accordance with behavior of the user; and a transmitting unit configured to transmit the generated display information to other information processing apparatuses.

(19)

An information processing method including:

by an information processing apparatus, generating display information which displays deposit and withdrawal information regarding a deposit and a withdrawal at an event and related information relating to the deposit and the withdrawal for each event in chronological order on the basis of savings and settlement information regarding savings or settlement of a user and behavior history information in accordance with behavior of the user; and transmitting the generated display information to other information processing apparatuses.

(20)

A program for causing a computer to function as:

a generating unit configured to generate display information which displays deposit and withdrawal information regarding a deposit and a withdrawal at an event and related information relating to the deposit and the withdrawal for each event in chronological order on the basis of savings and settlement information regarding savings or settlement of a user and behavior history information in accordance with behavior of the user; and a transmitting unit configured to transmit the generated display information to other information processing apparatuses.

REFERENCE SIGNS LIST

1 Service providing system
10, 10-1 to 10-N Mobile terminal
11, 11-1 to 11-N Service card
20, 20A Behavior history server
30 Settlement server
40 Network
100 Processing unit
101 Memory
102 Touch panel
103 Camera
104 Sensor
105 Communication unit
106 Proximity communication unit
107 Microphone
108 Speaker
109 Power supply unit
111 Touch sensor
112 Display unit
121 Behavior history information acquiring unit
122 Savings and settlement information acquiring unit
123 Screen generating unit
124 Display control unit
200, 200A Processing unit
201 Memory
202 Communication unit
203 User DB
204 Behavior history DB
221 Behavior history information acquiring unit
222 Savings and settlement information acquiring unit
223 Screen generating unit
1000 Computer
1001 CPU

The invention claimed is:

1. An information processing apparatus, comprising:

a display device; and a central processing unit (CPU) configured to:

acquire savings and settlement information associated with a user saving amount;

acquire user behavior history information associated with user behavior;

generate display information that includes:

first deposit and withdrawal information regarding a deposit amount and a withdrawal amount at an event, and first related information related to the deposit amount and the withdrawal amount, wherein
the first deposit and withdrawal information and the first related information are in a chronological order in the display information for the event, and
the display information is generated based on the acquired savings and settlement information and the acquired user behavior history information;
control the display device to display a first icon, a second icon, and the generated display information, wherein
the first icon corresponds to the first deposit and withdrawal information and the first related information of the event,
the second icon corresponds to second deposit and withdrawal information and second related information of the event,
the second related information is related to the second deposit and withdrawal information, and
each of the second deposit and withdrawal information and the second related information is different from the first deposit and withdrawal information and the first related information;
receive a first operation on the second icon; and
control, based on the received first operation on the second icon, the display device to switch the display of the first deposit and withdrawal information and the first related information to display of the second deposit and withdrawal information and the second related information of the event.

2. The information processing apparatus according to claim 1, wherein the CPU is further configured to control the display device to display the first deposit and withdrawal information and the first related information in the chronological order in a strip.

3. The information processing apparatus according to claim 2, wherein the first related information includes at least one of settlement related information related to settlement, event related information related to the event, date and time related information related to date and time, location related information related to a location, or transportation related information related to transportation.

4. The information processing apparatus according to claim 3, wherein each of the first related information and the second related information includes at least one of a text, an image, a moving image, or a combination of the text, the image, and the moving image.

5. The information processing apparatus according to claim 2,
in a case where entirety of the first deposit and withdrawal information and the first related information is not displayable within a screen of the display device, the CPU is further configured to control the display device to display the entirety of the first deposit and withdrawal information and the first related information based on a user operation.

6. The information processing apparatus according to claim 1, wherein
a plurality of users belonging to the same group is able to participate in the event, and
the CPU is further configured to control the display device to display third deposit and withdrawal information and third related information in the chronological order for each user of the plurality of users.

7. The information processing apparatus according to claim 6, wherein the first deposit and withdrawal information includes:
common withdrawal information common among the plurality of users, and
unique withdrawal information unique for each user of the plurality of users.

8. The information processing apparatus according to claim 7, wherein the common withdrawal information includes bill sharing information regarding an amount of money shared by division of a total HI amount among the plurality of users.

9. The information processing apparatus according to claim 6, wherein
the CPU is further configured to control the display device to display the third deposit and withdrawal information and the third related information of a set of users within the same group in the chronological order for a user, of the plurality of users, belonging to a determined group, and
the user is different from the set of users.

10. The information processing apparatus according to claim 1, wherein the first deposit and withdrawal information and the first related information are editable.

11. The information processing apparatus according to claim 1, wherein the first deposit and withdrawal information and the first related information are shareable with a plurality of users for ach of the event.

12. The information processing apparatus according to claim 11, wherein
each of the first deposit and withdrawal information and the first related information corresponds to a first user of the plurality of users, and
third deposit and withdrawal information and third related information of a second user of the plurality of users are searchable for the event.

13. The information processing apparatus according to claim 1, wherein the user behavior is identifiable based on user settlement.

14. The information processing apparatus according to claim 13, wherein
the event is different for each service of a plurality of services,
the user settlement corresponds to an account of a user who subscribes to a service of the plurality of services, and
the service corresponds to the event.

15. The information processing apparatus according to claim 14, wherein the service includes service of one of a travel event, a music live, a rental car, or a wedding event.

16. The information processing apparatus according to claim 1, wherein
the information processing apparatus corresponds to a first user of a plurality of users associated with the event, and
the CPU is further configured to:
control the display device to display a third icon corresponding to a second user of the plurality of users;
receive a second operation on the third icon; and
control the display device to display third deposit and withdrawal information of the second user at the event and third related information of the second user at the event, wherein
the third deposit and withdrawal information is associated with a deposit amount and a withdrawal amount of the second user at the event, and the third related information is related to the deposit amount and the withdrawal amount of the third deposit and withdrawal information.

17. An information processing method, comprising:
in an information processing apparatus that includes a display device,
acquiring savings and settlement information associated with a user saving amount;
acquiring user behavior history information associated with user behavior;
generating display information that includes:
first deposit and withdrawal information regarding a deposit amount and a withdrawal amount at an event, and
first related information related to the deposit amount and the withdrawal amount for the event, wherein
the first deposit and withdrawal information and the first related information are in a chronological order in the display information, and
the display information is generated based on the acquired savings and settlement information and the acquired user behavior history information;
controlling the display device to display a first icon, a second icon, and the generated display information, wherein
the first icon corresponds to the first deposit and withdrawal information and the first related information of the event,
the second icon corresponds to second deposit and withdrawal information and second related information of the event,
the second related information is related to the second deposit and withdrawal information, and
each of the second deposit and withdrawal information and the second related information is different from the first deposit and withdrawal information and the first related information;
receiving an operation on the second icon; and
controlling, based on the received operation on the second icon, the display device to switch the display of the first deposit and withdrawal information and the first related information to display of the second deposit and withdrawal information and the second related information of the event.

18. A non-transitory computer-readable medium having stored thereon, computer-executable instructions which, when executed by a processor, cause the processor to execute operations, the operations comprising:
acquiring savings and settlement information associated with a user saving amount;
acquiring user behavior history information associated with user behavior;
generating display information that includes:
first deposit and withdrawal information regarding a deposit amount and a withdrawal amount at an event, and
first related information related to the deposit amount and the withdrawal amount, wherein
the first deposit and withdrawal information and the first related information are in a chronological order in the display information for the event, and
the display information is generated based on the acquired savings and settlement information and the acquired user behavior history information;
controlling a display device to display a first icon, a second icon, and the generated display information, wherein
the first icon corresponds to the first deposit and withdrawal information and the first related information of the event,
the second icon corresponds to second deposit and withdrawal information and second related information of the event,
the second related information is related to the second deposit and withdrawal information, and
each of the second deposit and withdrawal information and the second related information is different from the first deposit and withdrawal information and the first related information;
receiving an operation on the second icon; and
controlling, based on the received operation on the second icon, the display device to switch the display of the first deposit and withdrawal information and the first related information to display of the second deposit and withdrawal information and the second related information of the event.

19. A first information processing apparatus, comprising:
a central processing unit (CPU) configured to:
acquire savings and settlement information associated with a user saving amount;
acquire user behavior history information associated with user behavior;
generate display information that includes:
first deposit and withdrawal information regarding a deposit amount and a withdrawal amount at an event,
first related information related to the deposit amount and the withdrawal amount for the event, wherein
the first deposit and withdrawal information and the first related information are in a chronological order in the display information, and
the display information is generated based on the acquired savings and settlement information and the acquired user behavior history information;
first icon information corresponding to a first icon;
second icon information corresponding to a second icon, wherein
the first icon corresponds to the first deposit and withdrawal information and the first related information,
the second icon corresponds to second deposit and withdrawal information and second related information,
the second related information is related to the second deposit and withdrawal information, and
each of the second deposit and withdrawal information and the second related information is different from the first deposit and withdrawal information and the first related information; and
control transmission of generated display information to a second information processing apparatus, wherein the second information processing apparatus:
controls a display device to display the display information transmitted by the first information processing apparatus,
receives an operation on the second icon, and controls, based on the received operation on the second icon, the display device to switch display of the first deposit and withdrawal information and the first related information to display of the second deposit and withdrawal information and the second related information of the event.

20. An information processing method, comprising:
in a first information processing apparatus:
acquiring savings and settlement information associated with a user saving amount;
acquiring user behavior history information associated with user behavior;
generating display information that includes:
first deposit and withdrawal information regarding a deposit amount and a withdrawal amount at an event,
first related information related to the deposit amount and the withdrawal amount for the event, wherein
the first deposit and withdrawal information and the first related information are in a chronological order in the display information, and
the display information is generated based on the acquired savings and settlement information and the acquired user behavior history information;
first icon information corresponding to a first icon;
second icon information corresponding to a second icon, wherein
the first icon corresponds to the first deposit and withdrawal information and the first related information,
the second icon corresponds to second deposit and withdrawal information and second related information,
the second related information is related to the second deposit and withdrawal information, and
each of the second deposit and withdrawal information and the second related information is different from the first deposit and withdrawal information and the first related information; and
controlling transmission of the generated display information to a second information processing apparatus, wherein the second information processing apparatus:
controls a display device to display the display information transmitted by the first information processing apparatus,
receives an operation on the second icon, and
controls, based on the received operation on the second icon, the display device to switch display of the first deposit and withdrawal information and the first related information to display of the second deposit and withdrawal information and the second related information of the event.

21. A non-transitory computer-readable medium having stored thereon, computer-executable instructions which, when executed by a processor of a first information processing apparatus, cause the processor to execute operations, the operations comprising:
acquiring savings and settlement information associated with a user saving amount;
acquiring user behavior history information associated with user behavior;
generating display information that includes:
first deposit and withdrawal information regarding a deposit amount and a withdrawal amount at an event,
first related information related to the deposit amount and the withdrawal amount for the event, wherein
the first deposit and withdrawal information and the first related information are in a chronological order in the display information, and
the display information is generated based on the acquired savings and settlement information and the acquired user behavior history information;
first icon information corresponding to a first icon;
second icon information corresponding to a second icon, wherein
the first icon corresponds to the first deposit and withdrawal information and the first related information,
the second icon corresponds to second deposit and withdrawal information and second related information,
the second related information is related to the second deposit and withdrawal information, and
each of the second deposit and withdrawal information and the second related information is different from the first deposit and withdrawal information and the first related information; and
controlling transmission of the generated display information to a second information processing apparatus, wherein the second information processing apparatus:
controls a display device to display the display information transmitted by the first information processing apparatus,
receives an operation on the second icon, and
controls, based on the received operation on the second icon, the display device to switch display of the first deposit and withdrawal information and the first related information to display of the second deposit and withdrawal information and the second related information of the event.

* * * * *